Aug. 4, 1970 R. W. MURPHY 3,522,597
EXECUTION PLOTTER
Filed Nov. 19, 1965 30 Sheets-Sheet 17

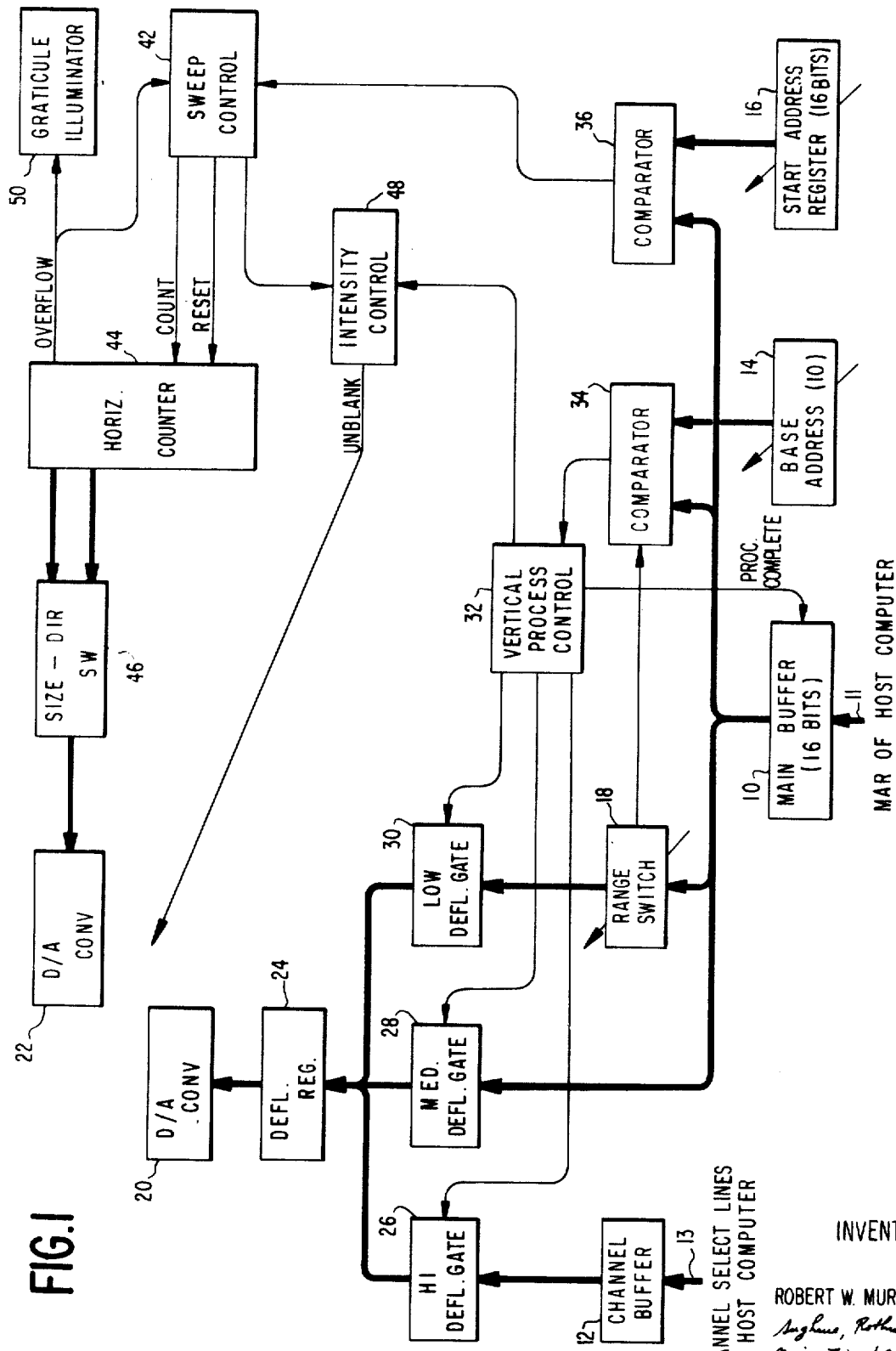

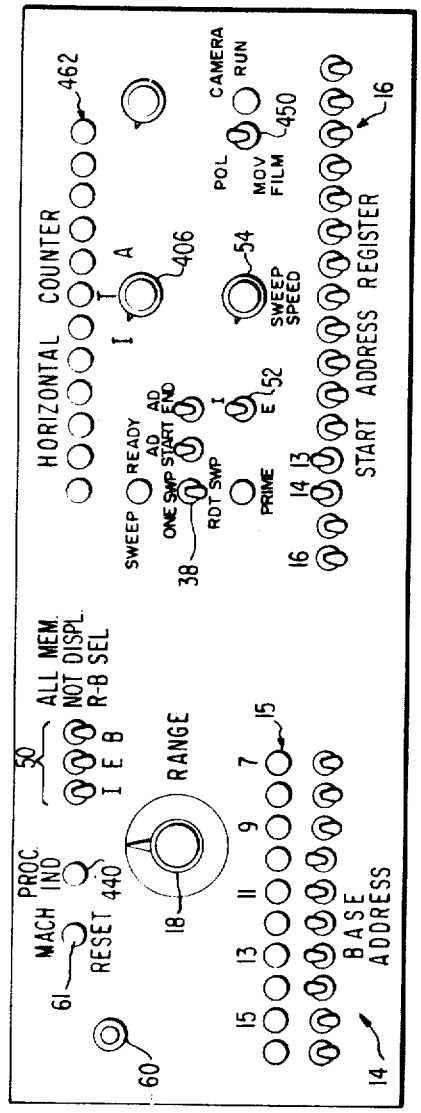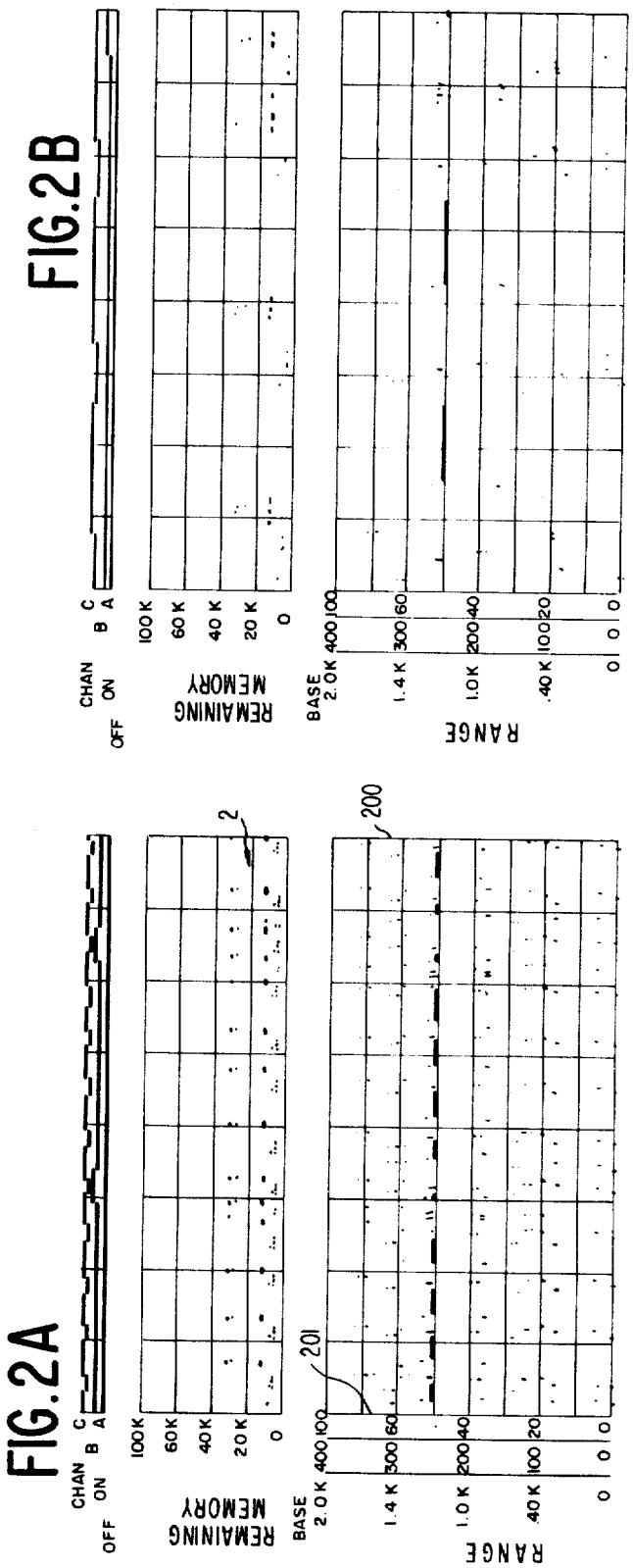

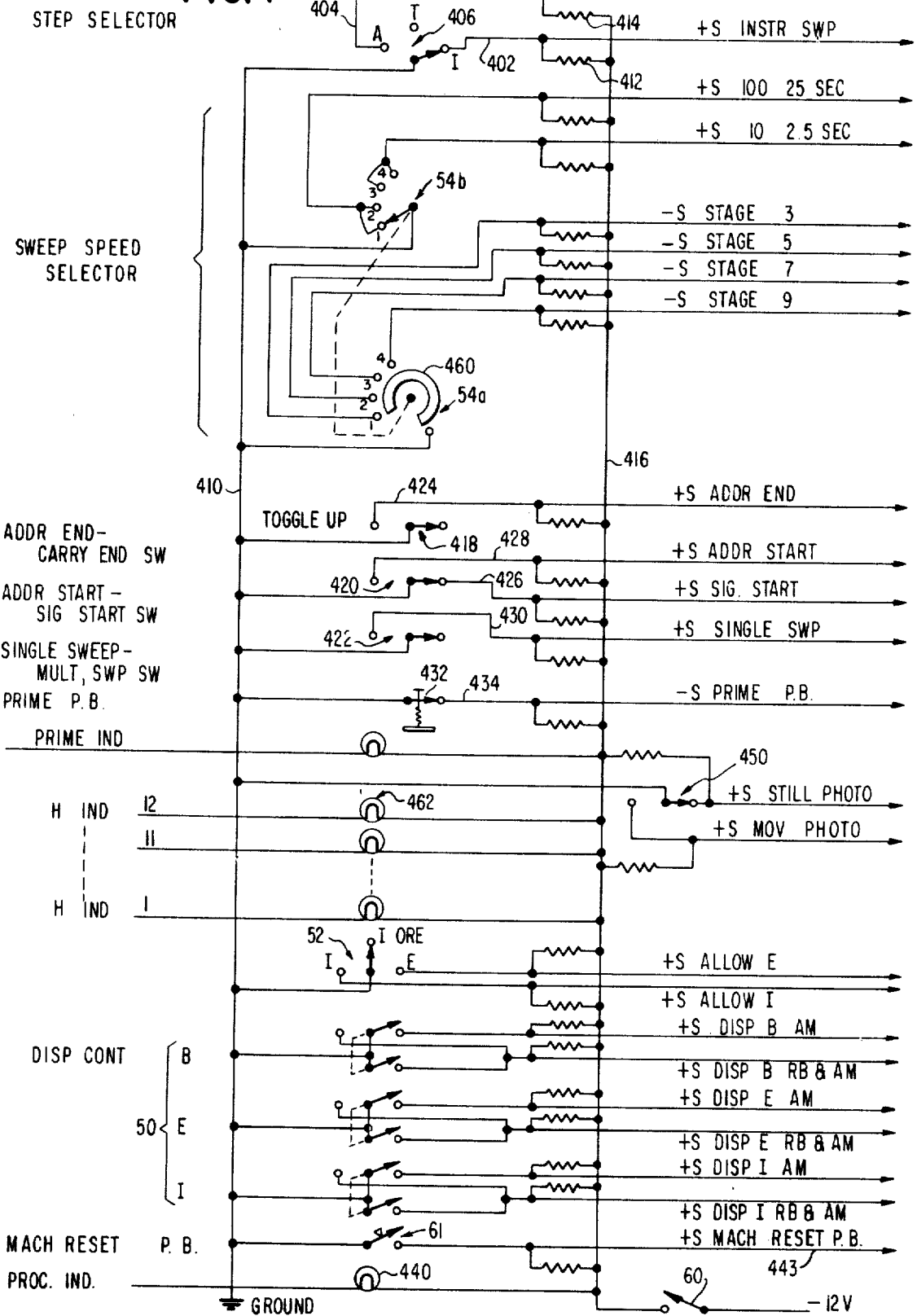

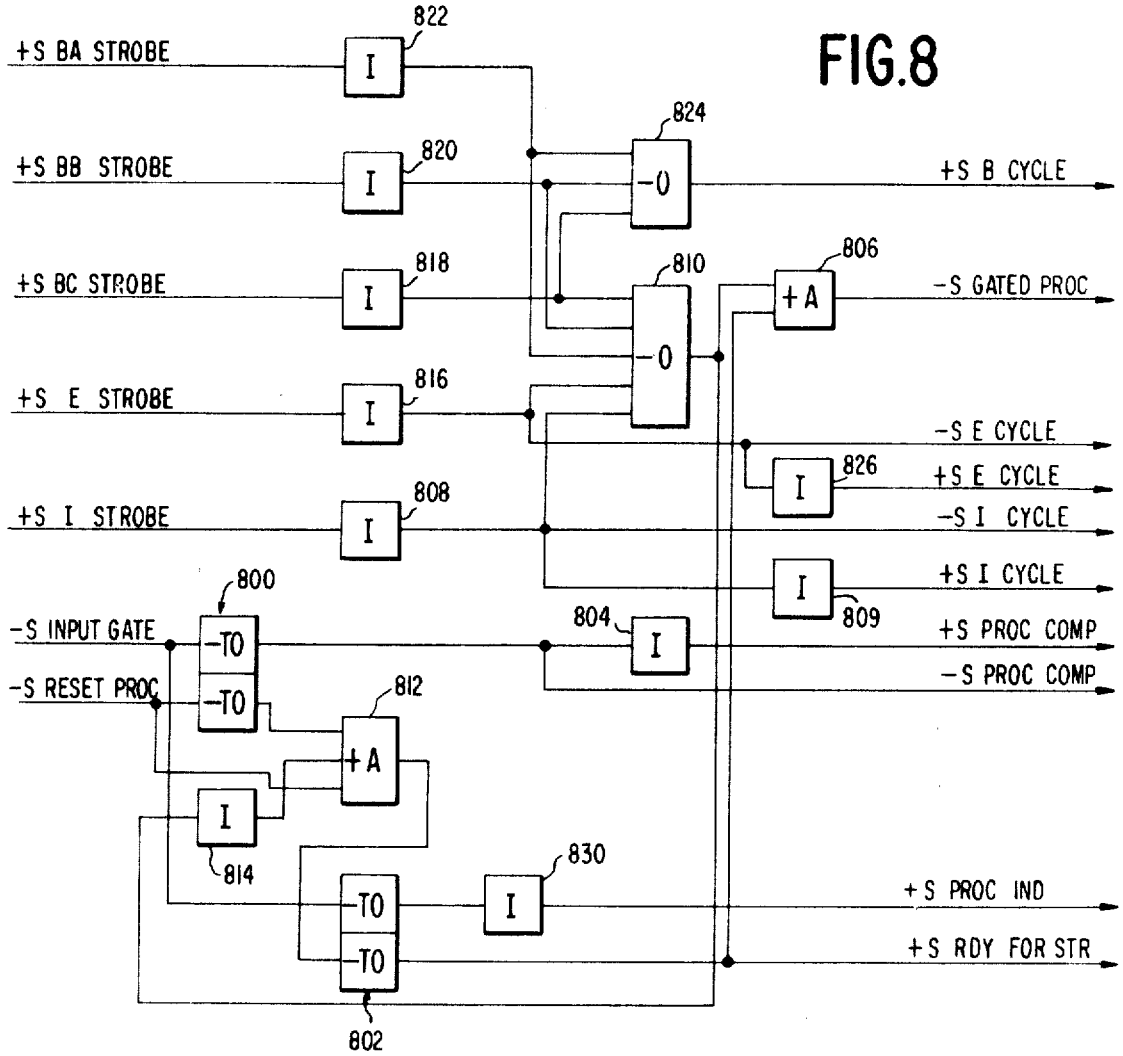

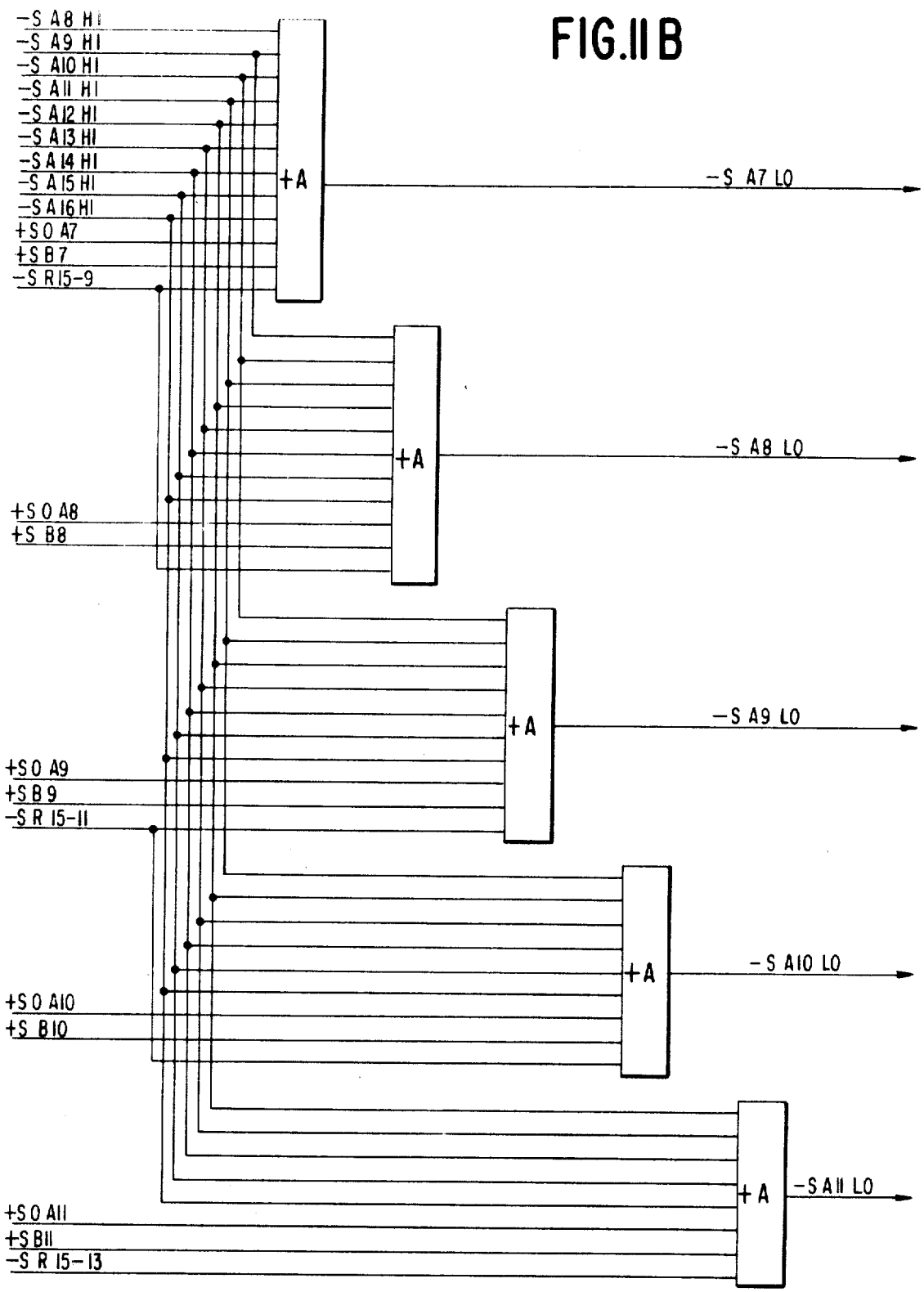

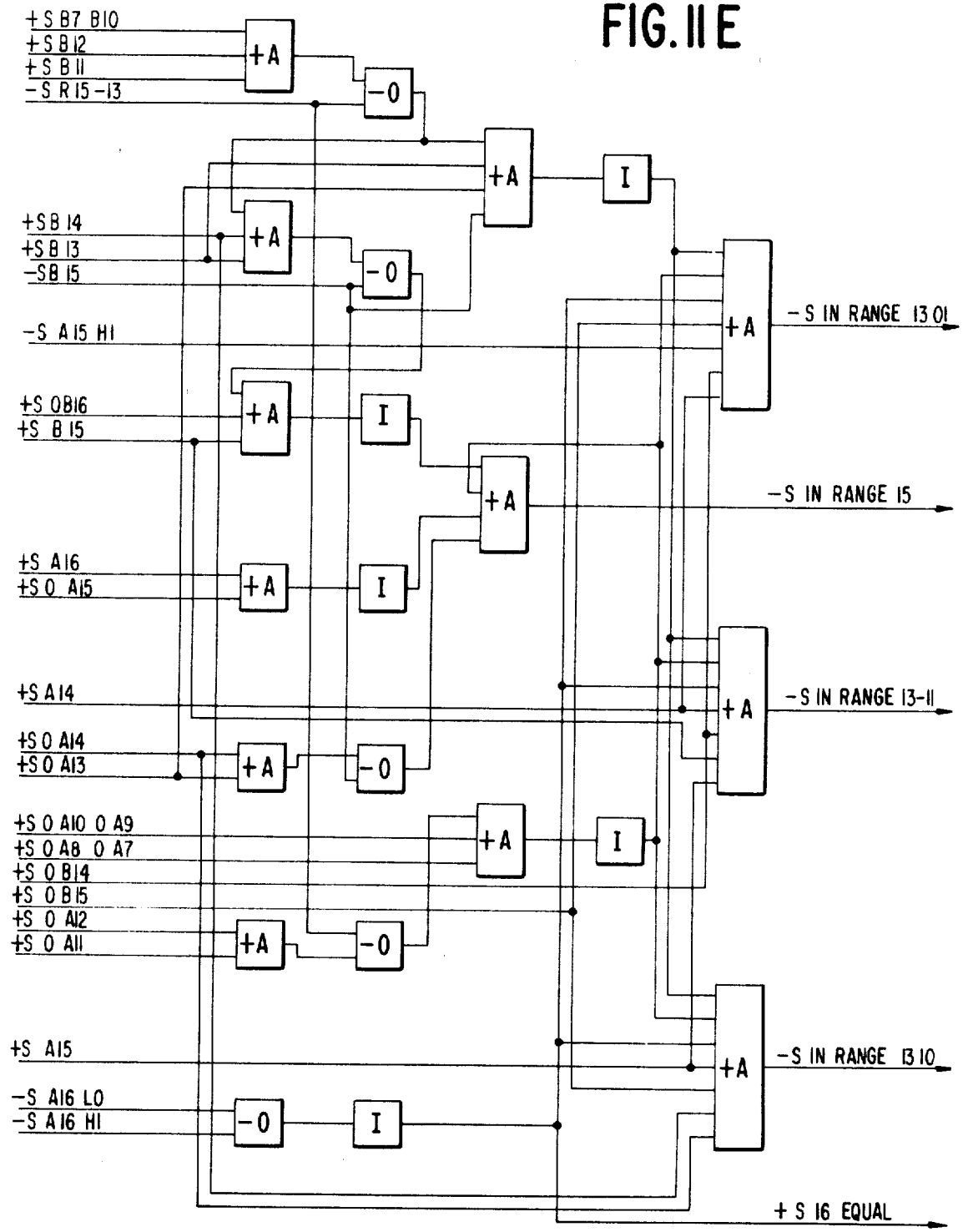
FIG. IIE

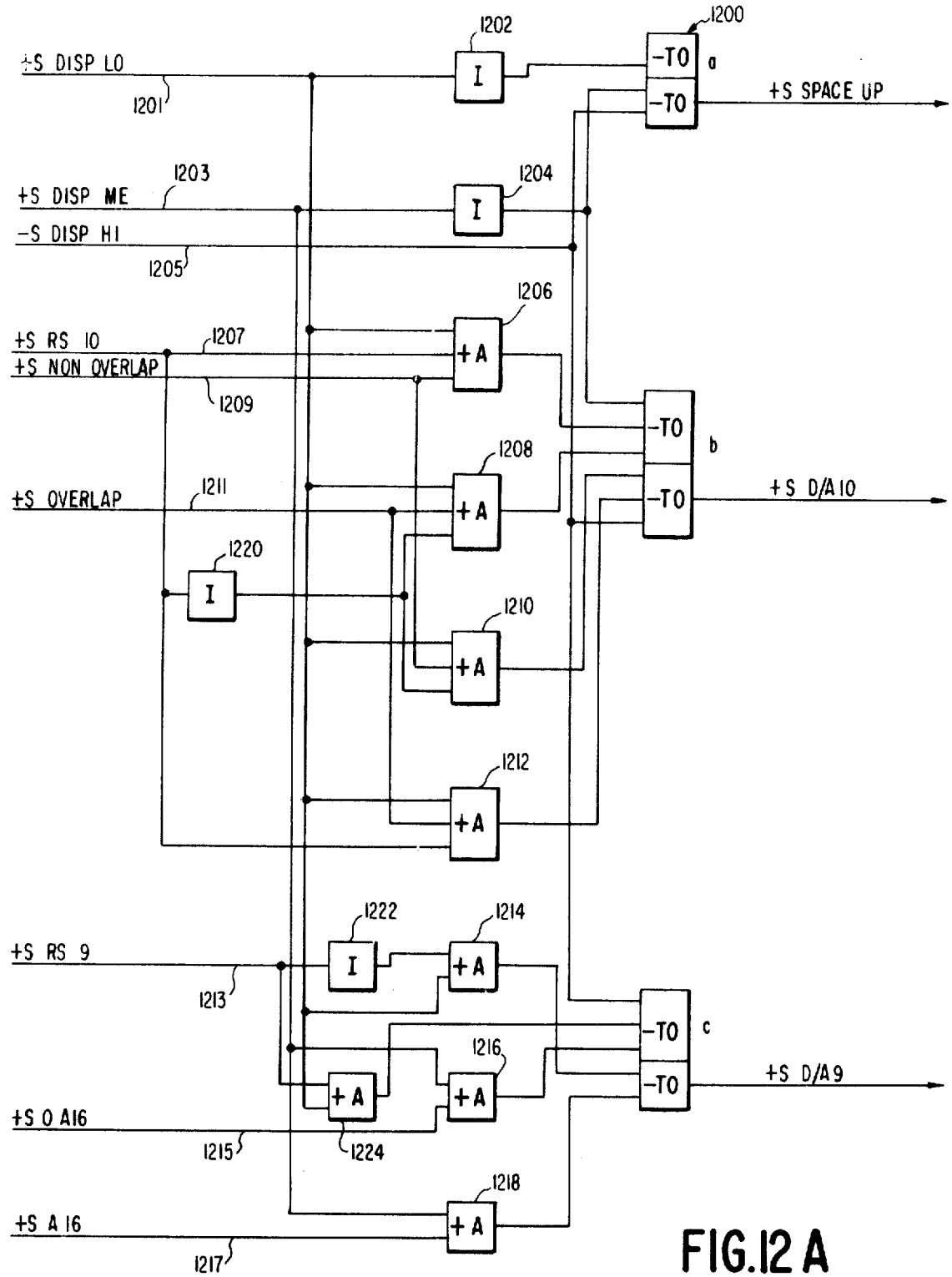

FIG. 12B

Aug. 4, 1970  R. W. MURPHY  3,522,597
EXECUTION PLOTTER
Filed Nov. 19, 1965  30 Sheets-Sheet 19

Aug. 4, 1970   R. W. MURPHY   3,522,597
EXECUTION PLOTTER
Filed Nov. 19, 1965   30 Sheets-Sheet 22

Aug. 4, 1970  R. W. MURPHY  3,522,597
EXECUTION PLOTTER
Filed Nov. 19, 1965  30 Sheets-Sheet 25

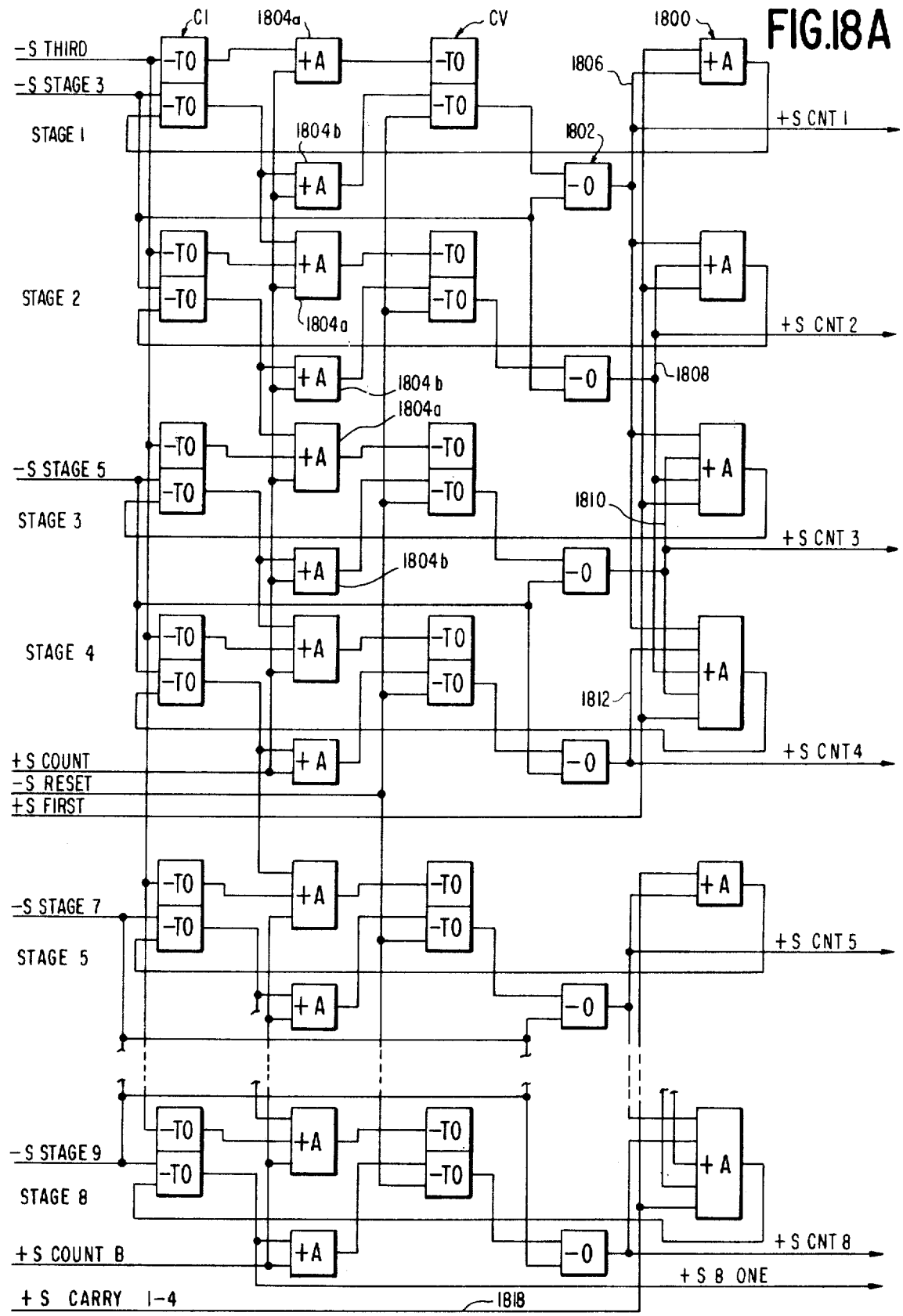

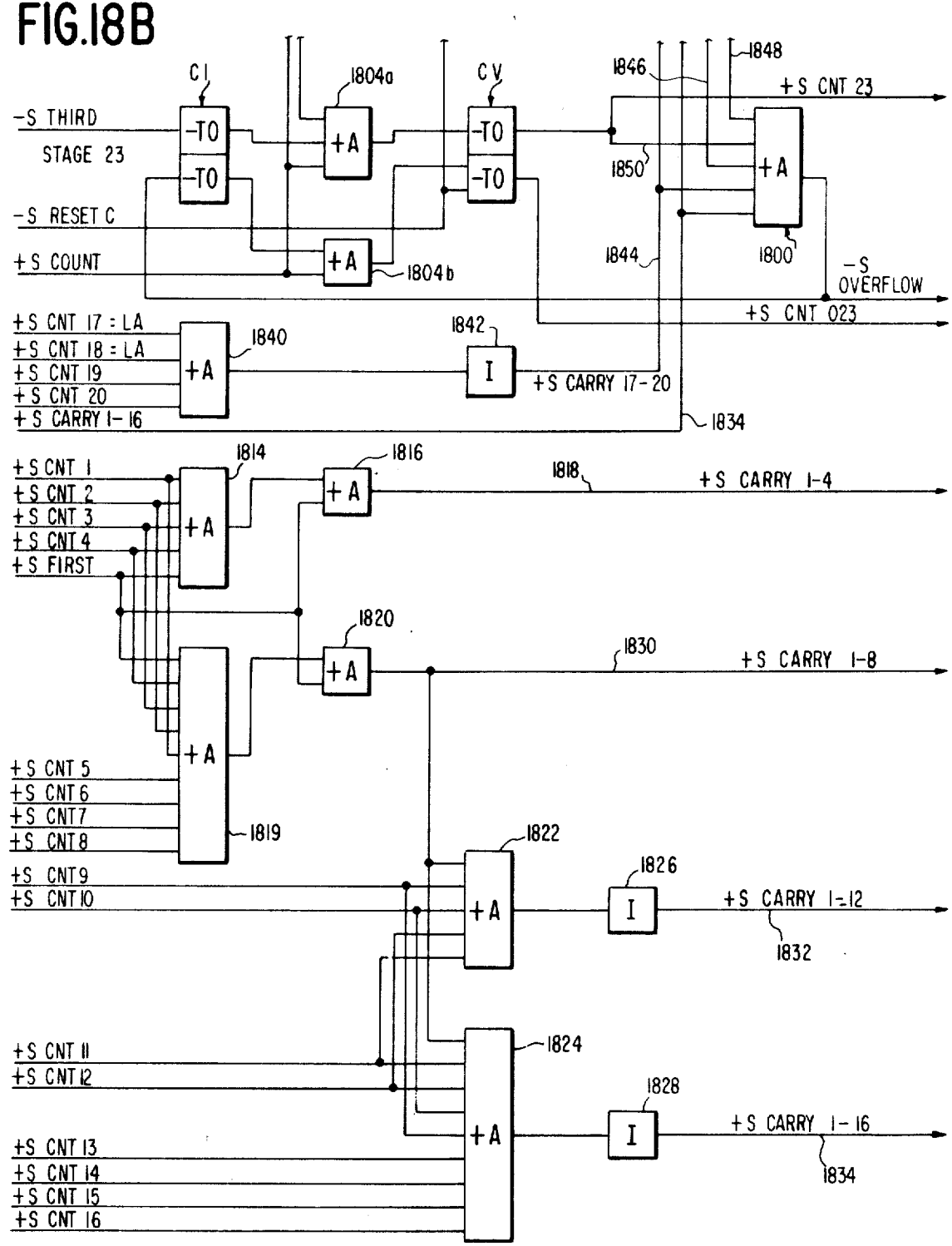

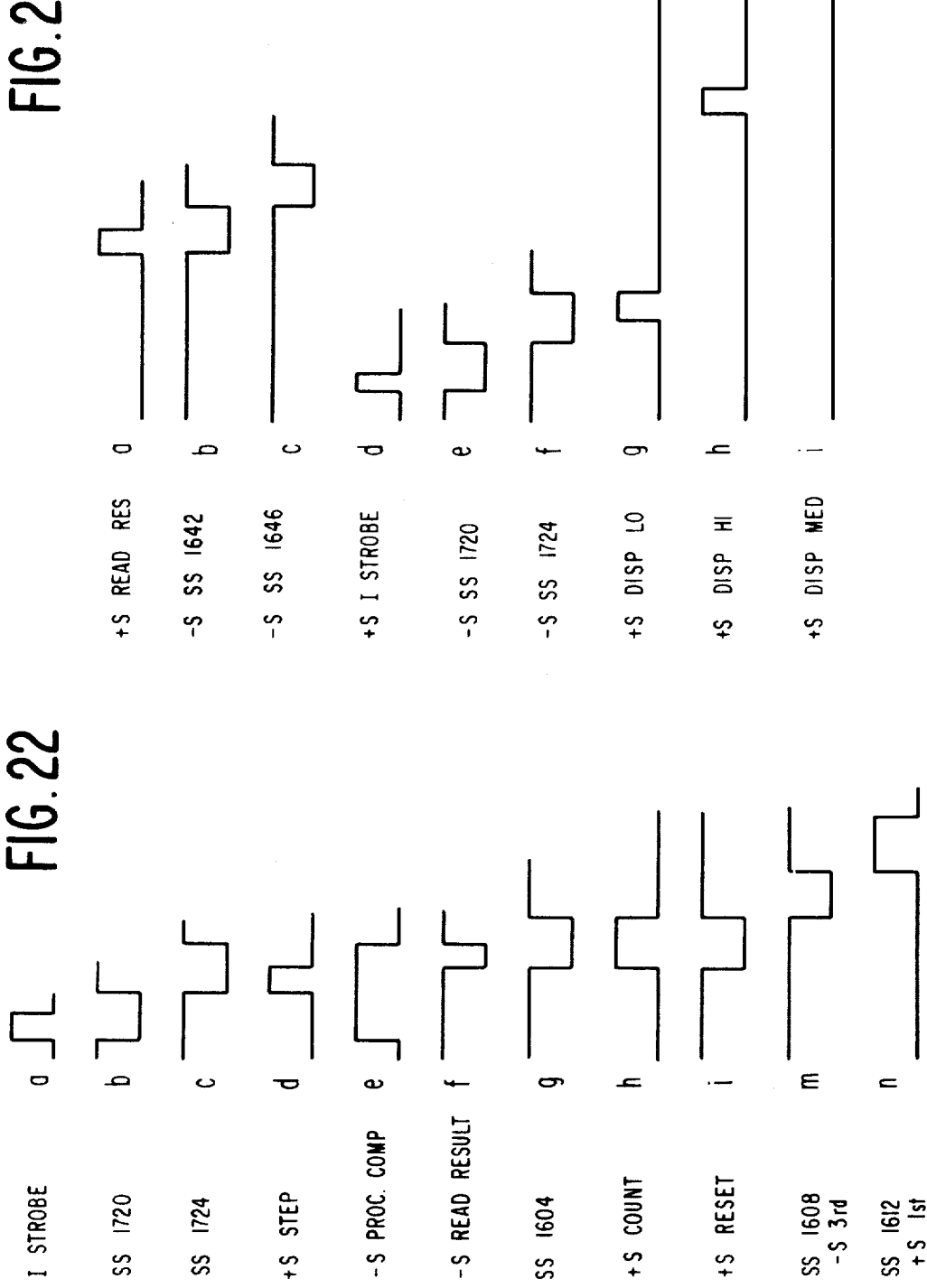

United States Patent Office 3,522,597
Patented Aug. 4, 1970

3,522,597
EXECUTION PLOTTER
Robert W. Murphy, Poughkeepsie, N.Y., assignor to International Business Machines Corporation, Armonk, N.Y., a corporation of New York
Filed Nov. 19, 1965, Ser. No. 510,447
Int. Cl. G06g 7/48
U.S. Cl. 340—324                                                    36 Claims

ABSTRACT OF THE DISCLOSURE

An Execution Plotter coupled to a computer generates, on a cathode ray tube, a trace composed of points which represent, by their vertical positions, the different items of information of the program actually executed and, by their horizontal positions, the times of execution of these items. A selected portion of a program can be shown in detail on one part of the screen, while other portions are shown more generally in another part. The activity of different channels can be displayed on still another part of the screen. It is possible, for example, to detect failure of execution of a program segment, to recognize inefficiencies of a program, or to compare a block diagram inferred from the program actually executed with the planned block diagram.

---

This invention relates to a method and means for observing the execution of a computer program, without interfering with the action of the computer, in order to reveal inefficiencies or errors in the program, computer errors, or any other departure from the intended operation.

When a computer program has first been set up it may contain hidden faults of structure or efficiency, or even errors in branching instructions. The detection of these faults would be very difficult using ordinary means at the disposal of the operator.

It is a general object of the invention to provide means for direct observation of the performance of the computer program and for making a record of it.

In accordance with the invention a device, which may be called an Execution Plotter, is attached to a host computer, and as each instruction of a program is executed, it displays a point on a cathode ray tube oscilloscope to represent, vertically, the memory location from which the instruction was fetched, and, horizontally, the time of execution. A graphical trace is thus obtained containing patterns which are readily interpreted in terms of the structure and efficiency of the program.

Graphical identifications of active memory locations date back to the use of cathode ray tube memories, and observations of them have some time been used for investigating program performance. It is a feature of the present invention however, that these identifications are plotted against a second variable, most significantly a time or sequence base. Other features relate to ways and means for controlling the display to provide information about a program or machine performance not hitherto obtainable.

A particular object of the invention is to display a selected portion of the program in detail, while showing other portions more generally; for example, to show a magnified image of the computer program execution concerning a particular group of addresses. These addresses may be of instructions, operands, or input/output words, or any combination of these three types.

Another object is to show, on a smaller scale, in combination with the above-mentioned magnified image, a representation of address activity in the rest of the computer memory.

Still another object is to provide for a representation of channel status information, coordinated with the other displays mentioned above.

A computer program may have varies kinds of deficiencies. It may contain some logical error which will prevent the program from producing the intended result. Or, it may fail to utilize the computer time efficiently, because the capabilities of the computer for overlapped operations are not being adequately utilized.

In accordance with the invention, the execution of the computer program is displayed on the screen of the cathode ray tube of an oscilloscope, the different items of information in the program being reflected in the vertical positions of spots on the screen, which are separated by horizontal sweep means driven by a time base, or a functional base, such as a computer cycle, an instruction cycle, or any other strobing means. All practical programs will show a generally rising trace, simply because the instruction counter of the computer is unidirectional. On the other hand, most of the valuable abilities of stored program machines will show up as local or short-term departures from the monotonic nature of the trace. These abilities are made use of by branches, loops, and sub-programs which have characteristic traces and which represent certain kinds of efficiencies, as in program space, ease of use, or flexibility.

Some of the inefficiencies of programs will also be shown by characteristic patterns, particularly mismatches in the timing of I/O with respect to the program, and also poor program space allocation. In general, the display will allow making at least a rough approximation to the identity and importance of these things as a guide to improvement. The first task here is to determine what patterns might appear, and the probable causes of the patterns in terms of program characteristics.

By way of illustration of some of the programed effects which can be revealed by an Execution Plotter, in accordance with the invention, a simple program was set up for execution by a computer of a problem involving the generation of two matrices of numbers obtained by the center-squaring process and then multiplying the matrices together. The Execution Plotter first revealed that the generation of the two matrices worked satisfactorily, the plot showing the expected pattern: a four circuit loop for the first matrix (2 x 2), and a second four circuit loop for the second matrix. Following the generation, the program went into the actual matrix multiplication. After the multiplication the program should have terminated, or else have used a sense switch to revert to the preliminary routine and regenerated the operand matrices. It was observed instead, first, that the multiplication did not complete, but was tied up in indefinite loops; second, that within the multiplication a nest of three loops was being executed; and, third, that the ratio of circuits for inner, middle and outer executed loops was 6:3:1.

A check of the displayed addresses showed that the planned block-diagram was being followed, except for the completion exit, although the ratio of circuits was obviously wrong for 2 x 2 matrices. This pin-pointed the trouble to be in the use of a computer register which should have controlled the exit from the multiplication phase of the program. The programming error was then found to be in the identification of the register.

When the program was corrected and rerun the pattern showed that the exit was being taken as planned and that the proper ratios of program segment executions were being obtained. However, the execution plot showed that there was a suspicious asymmetry in the sequence of segments. That the middle loop was being executed three times in succession, then the outer loop once, then the middle loop only once again before phase exit.

The branch from middle to outer loop was controlled by a conditional transfer testing a variable address. The 3-then-1 sequence rather than a 2-then-2 sequence indicated that there was a second programming error in stating the comparison address used in the test. This was corrected and the final program gave an Execution Plot which had the correct patterns.

From experience with the Execution Plotter, some generalized debugging techniques can be inferred:

(1) It is possible to infer the block diagram of the program actually executed from the Execution Plot and compare it to the planned block diagram;

(2) It is possible to distinguish whether a branch is never taken, sometimes taken, or always taken;

(3) It is possible to determine frequencies of the actual executions of program segments, and, thus, check indexing for address alternation;

(4) It is possible to check sequences of two or more program segments, whether or not they are in a loop structure.

In a preferred form of the invention the operator's panel has means to control the type of action so that the sweep of the oscilloscope can be single or multiple and, in either case, can be made to start at a selected address, or to end at a selected address, or both.

Accordingly, it is an object of the invention to provide a method and means of the type described, offering considerable flexibility of the mode of operation. In line with this object a preferred form of the invention enables the operator to observe the computer program in action and to adjust the panel settings in response to the patterns revealed, to provide for scrutiny of suspicious portions of the program. The panel has means to adjust the magnification of the display of the portion of the program selected for detailed inspection. In general, the controls select the information displayed, the scales of the coordinates, and the conditions of making the display.

The apparatus is preferably arranged so that an enlarged pattern produced from a selected group of addresses will appear on one part of the screen, say the lower half, while the remainder of the program will show up on a reduced scale in another portion of the screen, say the middle portion, and channel status or other information will show on still a thrid portion of the screen, for example, the top portion.

Further objects and advantages of the invention will appear from a detailed description of one apparatus embodying the invention and capable of carrying out the process of the invention, as shown in the accompanying drawing.

FIG. 1 is a block diagram of the entire system of an Execution Plotter embodying the invention.

FIGS. 2A and 2B are facsimiles of two patterns produced by the Execution Plotter, on different horizontal scales.

FIG. 3 is a face view of the operator's panel.

FIG. 4 is a wiring diagram of circuits on the back of the operator's panel relating principally to the sweep control.

FIG. 8 is a block diagram of the strobe inputs and lock-out means.

FIG. 9 is a block diagram of the process timing circuit.

FIGS. 12A–12E are block diagrams of the deflection register.

FIGS. 18A and 18B constitute an abbreviated block diagram of the horizontal counter.

Figure 19:
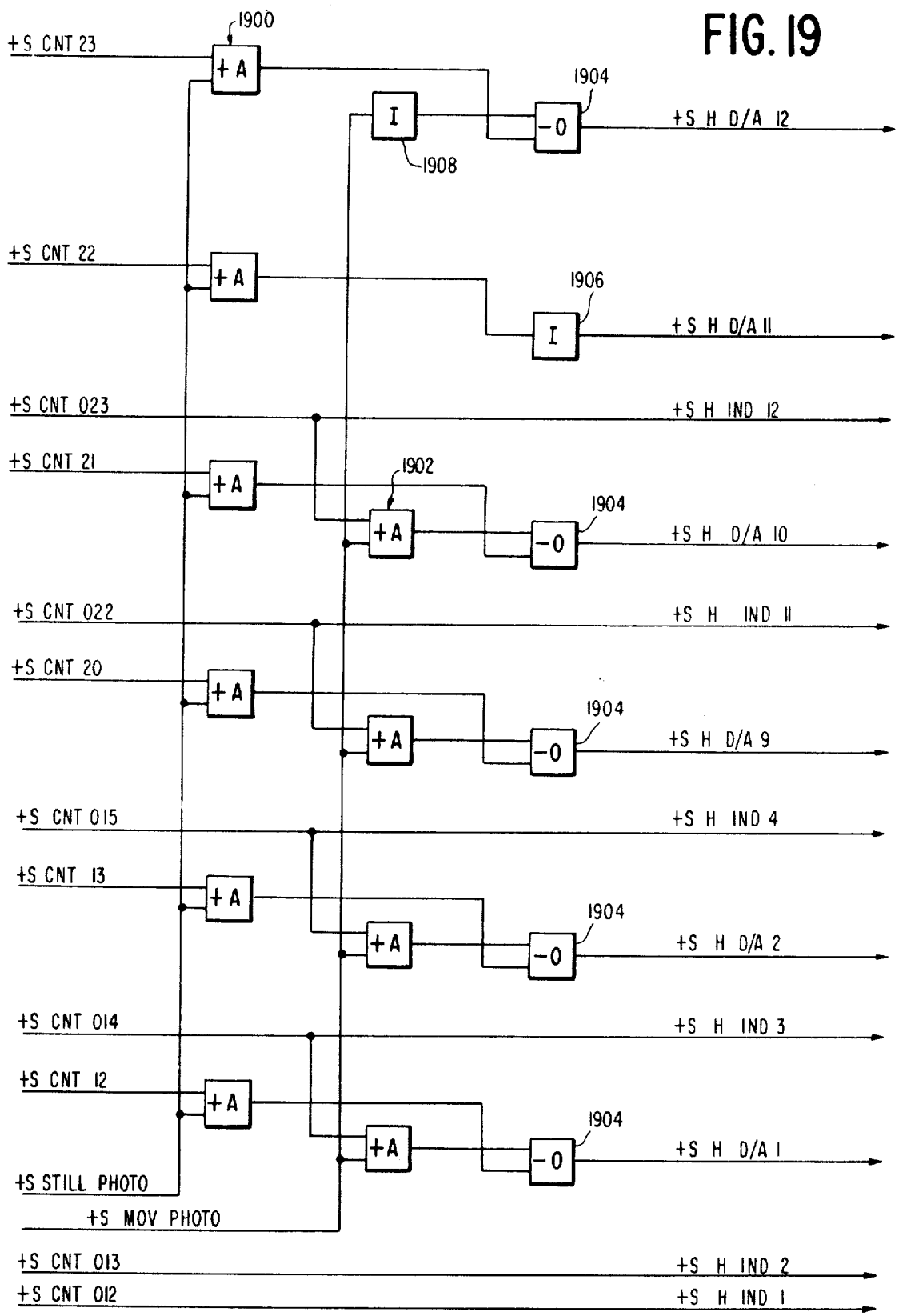

FIG. 19 is a partial block diagram of the size switch and driver circuit for the horizontal digital/analog converter.

Figure 20:
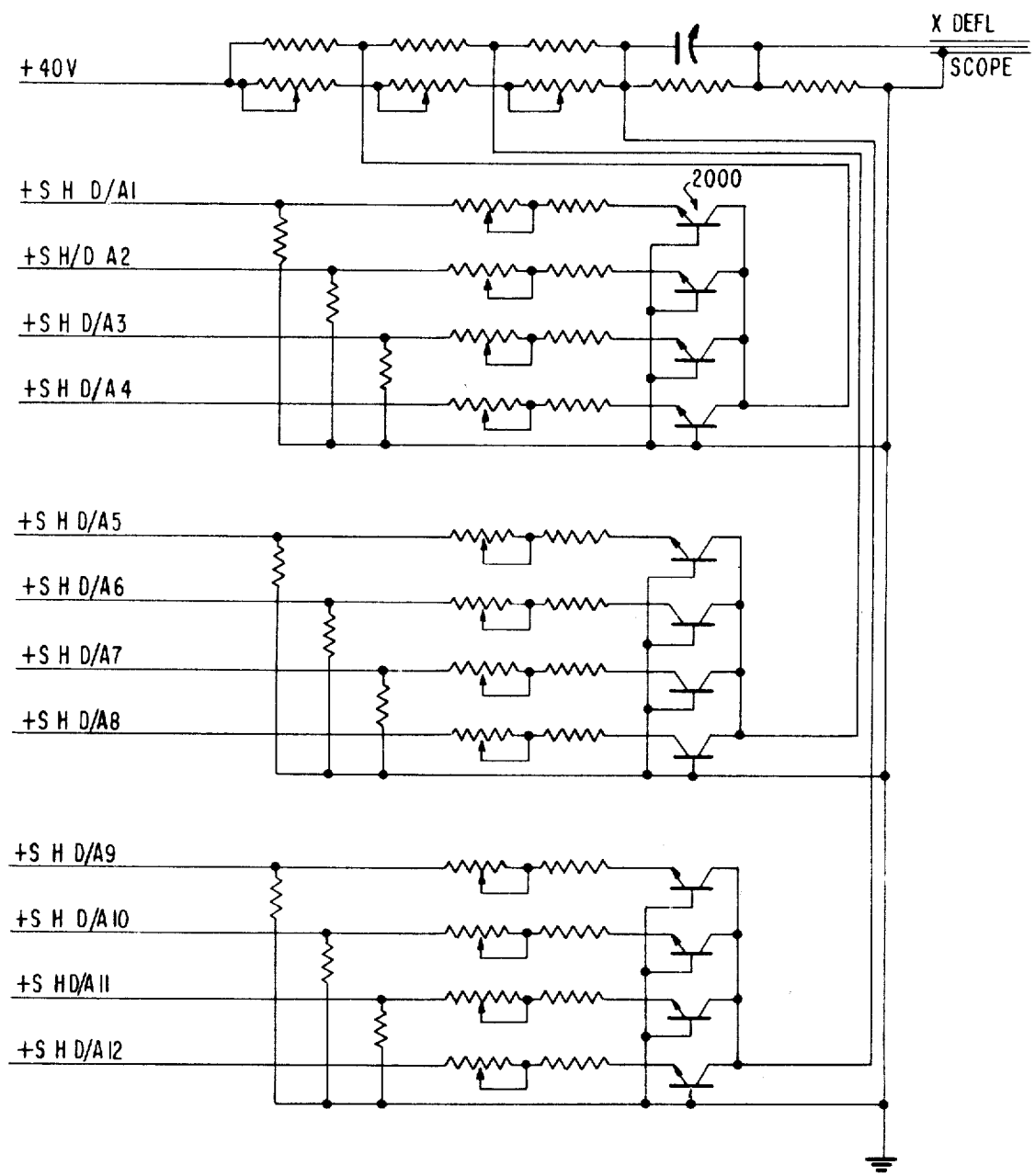

FIG. 20 is a wiring diagram of the horizontal digital/analog converter.

Figure 21:
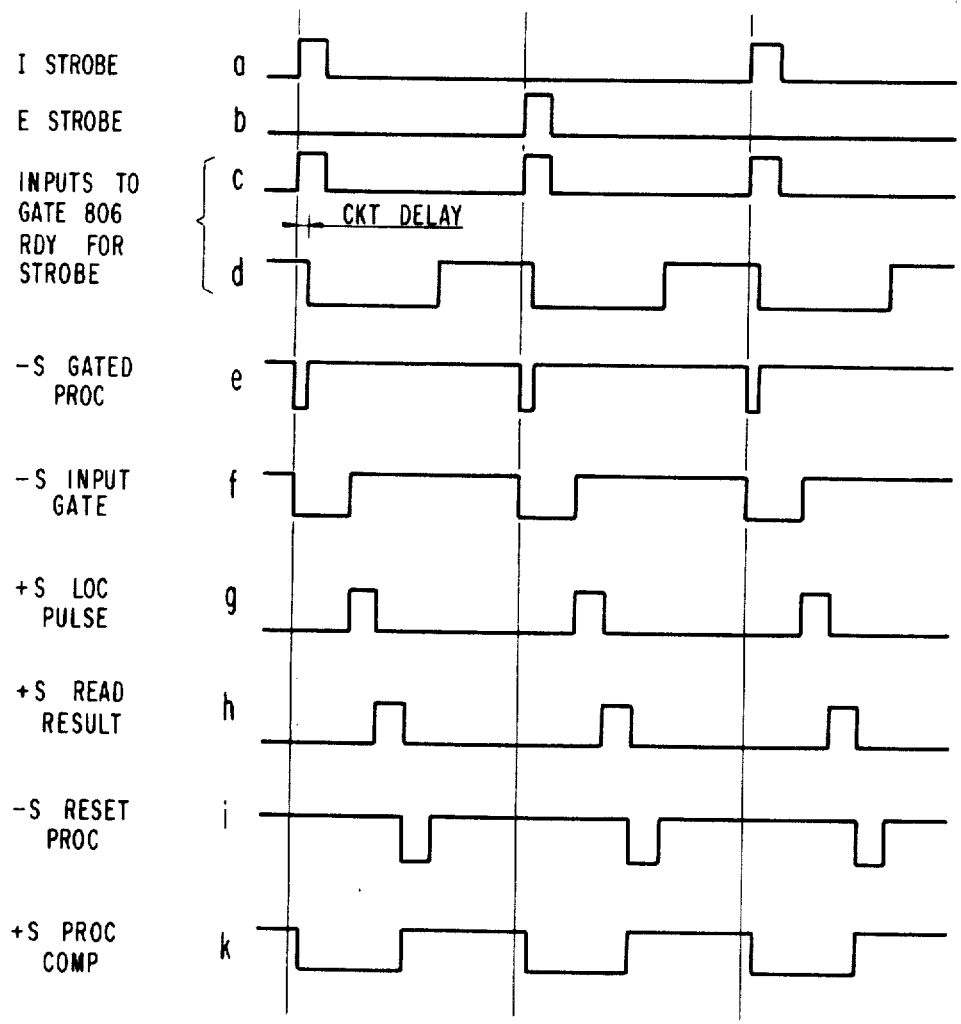

FIGS. 21, 22 and 23 are wave diagrams.

GENERAL DESCRIPTION OF ONE EMBODIMENT

An Execution Plotter shown in the drawing, which has been chosen as an illustrative embodiment of the invention, comprises an oscilloscope and circuits to control the vertical and horizontal deflection of the beam of its cathode ray tube (CRT). The circuits include means for connecting them with a computer, for transmission of outputs from the main memory of the computer and other outputs representing channel information and strobe pulses designating different types of cycles successively taking place in the computer. The general purpose of the Execution Plotter is to display on the screen of the CRT a trace which is produced by:

(1) A step-by-step horizontal displacement of the beam, for a chosen period of time, number of steps, or portion of a program; and (2) A concurrent vertical displacement of the beam proportional to actual magnitude of successive addresses, data values, or any other varying values; or to positions arbitrarily chosen to represent different channel statuses, etc. The addresses may be instruction addresses, execution addresses, or any others.

The addresses to be displayed may cover a wide range of numbers, which are to be visibly differentiated by vertical positions within the height of the CRT screen, the positions being determined by conversion of digital inputs in a vertical digital to analog (D/A) converter. Since it may be desirable to examine more closely a portion of a program operating within a certain range of addresses, the apparatus provides for an engaged display of this portion of the entire address set of the computer memory. In the embodiment to be described this enlarged display is combined with a smaller scale display of all program addresses falling outside of the particular range selected for enlargement. The smaller scale program representation is thrown onto a different area of the screen, so that its information is coordinated horizontally with that on the larger scale showing, to reveal the entire program.

FIGS. 2A and 2B show actual patterns on the screen of the CRT, that of FIG. 2B being a horizontal expansion of a portion of the pattern shown in FIG. 2A. Approximately the lower half of the screen area, identified as the LO area, displays a record on a rather large scale of the execution of a portion of a program confined within certain address limits. Above this is a section identified as MED, which displays the execution of the program in respect to the addresses falling outside of the selected group. This showing is on a scale reduced from that of the LO area. Note that it includes a horizontal gap 2 corresponding to the portion of the program displayed in the LO section. As the top of the screen is an area labeled HI, showing traces representing the activity of three channels, A, B, and C.

FIG. 2B will be recognized as a horizontal expansion of a part of the pattern shown in FIG. 2A, produced by increasing the scanning rate, in a manner to be described later.

The addresses displayed in the LO area of the screen will be referred to as IN RANGE addresses. Out-of-range addresses are those which may be either below or above the IN RANGE addresses. Those which are below the selected range will be identified by a BELOW BASE signal, which will directly cause them to be thrown onto the MED portion of the screen. The BELOW BASE signal can be easily generated by comparing the address to be displayed with a BASE ADDRESS setup on the operator's panel. The addresses which are above the selected range are identified by an ABOVE APEX signal. This signal is the result of coordination of two variables, one being the adjustable BASE ADDRESS, the other being the scale chosen, to be referred to herein as the RANGE which is also set up on the operator's panel.

In any processing cycle in which there is no address to be displayed a channel status sample is taken and a spot generated in the HI portion of the screen. In the illustrative embodiment provision is made for sampling the on or off condition of three channels in succession, each during a processing cycle when no address is to be displayed. In this way a channel record can be made concurrently with the address pattern record.

Horizontal sweep

In synchronism with the processing cycles determining the vertical beam position, the beam is stepped horizontally in response to any chosen one of a number of different conditions or control means. In the illustrative embodiment the horizontal step may take place in response to either an Instruction Strobe (I STROBE), or an All Cycles Strobe (A STROBE), or to a clock pulse from any one of four oscillators, only two of which are shown. It is evident that either of the first two strobes will time the horizontal stepping to the functions of the computer, while the clock pulses will time the horizontal stepping to a chosen time base.

The horizontal position of the beam at any instant is determined by the condition of a horizontal counter, which condition is transferred to a horizontal D/A converter. In the illustrative embodiment this D/A converter responds to only a selected range of higher order positions of a twenty-three position horizontal counter. The condition of the horizontal D/A converter therefore does not necessarily respond to every count pulse entering the horizontal counter. Whether it does or not is dependent upon setting means which can modify the scaling factor of the horizontal counter by eliminating a selected number of lower stages of the counter. The latter adjustment is particularly useful when one of the oscillators is being used to advance the counter, where it serves to provide additional control over the stepping rate of the CRT beam.

The beam sweep can be started by any one of the various control pulses, such as a processing timing pulse, a clock pulse from one of the oscillators, or the occurrence of a start address in the main buffer.

In one form of operation, once a sweep has been started, the vertical display of addresses will take place and continue indefinitely. At the end of a sweep the horizontal counter is reset and the next sweep follows automatically, being started by the next strobe or oscillator pulse. During the sweep a process timing pulse, called Read Result (READ RES), synchronizes the stepping of the horizontal counter with the entry of new data into a buffer called a DEFLECTION REGISTER which control the vertical D/A converted. Thus the horizontal and vertical D/A converters, if they are both to change, will reach their new values approximately simultaneously. The horizontal counter need not be stepped for every vertical display, or it may be stepped without new vertical data. In this second case, no UNBLANK signal occurs.

At the end of the sweep when the counter is full, an overflow signal resets the sweep control to the stop condition and modifies the counter input so that on the next processing cycle the counter will receive a RESET pulse and will be reset thereby, and the COUNT pulse, which normally advances the counter, will be inhibited. The RESET pulse has the same timing as the normal COUNT pulse and therefore occurs at the same time as the transfer of the next address into the deflection register and thereby the vertical D/A converter. Accordingly, the next unblanking signal reveals the new address in the 0 position of the sweep. In effect, the counter has been stepped from the full position to the reset position as one step, similar to any forward step during the sweep. After the RESET pulse is past a delayed pulse restores the normal input to the counter, so that the next processing cycle will cause the counter to step forward, the reset input being inhibited.

If the ADDRESS START SWITCH 34 is set to the down position, the counter will continue to receive RESET pulses and the UNBLANK signal will be inhibited until a particular address appears in the main buffer. One more reset will be given, and UNBLANK will cause the first display at the 0 position of the horizontal counter. The sweep will then continue as described above, and will be restarted whenever the address appears.

If the ADDRESS END SWITCH is down, the reset pulse will occur as soon as the particular address occurs, generally before the overflow signal occurs. This will reset the counter immediately causing that address to be displayed at the start of the sweep (0 position of the counter). The sweep will continue.

Instead of repetitive sweeping, as described, the circuit can be set up for a single sweep operation. The single sweep can be made to start when a particular address appears in the main buffer, or it can be made to end when a particular address appears, or both. In the last mentioned case the display will show a complete program sequence from the time when a particular address appears in the main buffer until that address reappears.

DESCRIPTION OF THE GENERAL BLOCK DIAGRAM

Now, turning to the general block diagram, FIG. 1, of an Execution Plotter constructed in accordance with the invention, a main buffer 10, of sixteen-bit capacity, is connected by a cable 11 to the main address register (MAR) of a host computer, and a channel buffer 12 is connected by a cable 13 to the channel status lines of the computer. Connections to the vertical process control and the sweep control are also made to sources of the various strobes in the computer. The operator's panel (FIG. 3) of the Execution Plotter includes a BASE ADDRESS register 14, in the form of a set of ten toggle switches, a START ADDRESS register 16 comprising sixteen toggle switches, a RANGE SWITCH 18, and various other setting, control and indicating means to be referred to later. The beam position is controlled by two D/A converters, 20 and 22 (FIG. 1), the former determining the vertical deflection and the latter controlling the horizontal sweep.

The D/A converter 20 receives its digital signals from a deflection register 24, which responds selectively to three different gating means 26, 28, and 30, called, respectively, Hi. Defl. Gate, Med. Defl. Gate, and Low Defl. Gate. The selective operation of the deflection gates is governed by circuits represented by a Vertical Process Control block 32, which is itself controlled by a Comparator 34, in which the comparisons, previously generally described, of addresses successively appearing in the main buffer are made, for determining the section of the screen on which each address is to be displayed. The Comparator 34 receives inputs from the ten positions of the base address register 14 and inputs from certain positions of the main buffer 10, as determined by the setting of the range switch 18.

The Vertical Process Control circuits 32 selectively open one of the three deflection gates. If the Hi. Defl. flecting signal equal to the sum of its inputs, as shown in the following Table I:

TABLE I

| VERT D/A Conv. & Defl. Reg. | DISP LO | | DISP ME | | DISP HI | |
|---|---|---|---|---|---|---|
| SPACE UP | | 0 | | 1 | | 1 |
| D/A: | | | | | | |
| 10 | Range Switch | 10 | | 0 | | 1 |
| 9 | | 9 | Input Buf | 16 | | 0 |
| 8 | | 8 | | 15 | | 1 |
| 7 | | 7 | | 14 | Chan. Buf | 3 |
| 6 | | 6 | | 13 | | 2 |
| 5 | | 5 | | 12 | | 1 |
| 4 | | 4 | | 11 | | 0 |
| 3 | | 3 | | 10 | | 0 |
| 2 | | 2 | | 9 | | 0 |
| 1 | | 1 | | 8 | | 0 |

Gate 26 is opened the deflection register will take a setting from pedestal signals issued from the Vertical Process Control 32 and channel signals derived from the channel buffer 12. If the Vertical Process Control conditions the Med. Defl. Gate 28, the deflection register 24 takes a setting directly from the nine highest positions of the main buffer 10 and a SPACE UP signal from the Vertical Process Control 32. If the Vertical Process Control conditions the Low Defl. Gate 30, the deflection register 24 takes a setting from the range switch 18, the outputs of which are dependent upon the position of the range switch and the states of certain bit positions of the main buffer 10, the particular bit positions which are effective being determined by the setting of the range switch.

The horizontal sweep is executed by a horizontal counter 44 operating through size-switch means 46, upon the D/A converter 22, the size-switch means being manually controlled to shift the connections between the horizontal counter and the D/A converter.

One way to initiate a sweep is by throwing the "ADDR START" switch to the down position in FIG. 3 and setting up on the row of toggle switches constituting the START ADDRESS register the address at which the sweep is to start. As the computer program progresses and addresses successively appear in the main buffer 10, they are compared in Comparator 36 with the address in the START ADDRESS register. An ADDRESS EQUAL signal initiates the sweep, which may continue until the horizontal counter generates an overflow signal and resets to 0. The position of a switch 38 determines whether sweeping will continue or stop. In the up position of the switch sweeping will be repeated; in the down position it will stop. The sweep can be made to terminate at a particular address by setting the switch 38 in the up position and the ADDRESS END in the down position. With this setting the generation of an ADDRESS EQUAL signal will cause the sweep to stop and the horizontal counter to reset. A block 42 labeled "Sweep Control" identifies circuits and switches controlling the sweep, as briefly described above and as will be described in more detail subsequently.

One other block shown in FIG. 1 is block 48, labeled "Intensity Control," which issues an UNBLANK signal after each change of the vertical D/A converter 20, during the sweep and at a time when, if there is to be any change of the horizontal D/A converter during the same processing cycle, it will have been completed and the D/A converters will have settled.

RANGE/BASE CONTROL

Before proceeding with the detailed description of the circuit an explanation will be given of the RANGE/BASE control logic. The D/A converter 20 may be of conventional form, such as one to be described later. It has the capability of receiving any one or more of eleven inputs from the deflection register 24 and delivering to the vertical deflection means of the CRT an analog de- As shown in Table I, the outputs generated by the ten stages D/A 10, 9 . . . 1 provide deflections in binary geometric progression: one unit, one-half unit, one-quarter unit . . . . The eleventh stage of the converter, called SPACE UP, provides an upward deflection of about 2¼ units. The next column to the right of Table I indicates that when (as a result of the various checks made by the Vertical Process Control 32) a DISP LO signal is generated to condition the Low Defl. Gate 30, the range switch 18 is coupled to the deflection register 24 bit-by-bit in positions 10, 9 . . . 1 of the deflection register. A 1 in any of the ten output bit positions of the range switch (derived from the main buffer in a manner to be described) will cause the D/A converter to issue a voltage increment of magnitude corresponding to the order of that output bit position of the range switch. That is, an output from range switch bit position 10 will cause the D/A converter to issue a one unit increment, an output from range switch position 9 a one-half unit increment, etc. No signal will be sent from the vertical process control 32 to the SPACE UP stage of the D/A converter when the Low Defl. Gate 30 is active, heretofore the display will be in the low section of the CRT screen.

The primary function of the range switch 18 is to select for connection to the different stages of the deflection register 24, a certain group of not more than ten adjacent positions of the main buffer or address register 10. In this illustrative example the range switch has five different settings, identified in Table II below as R15, R13, R11, R9 and R7, corresponding to respective horizontal rows of Table II.

TABLE II

| | 16 | Address Bits | | | | 1 | Range-Octal Addresses |
|---|---|---|---|---|---|---|---|
| R15 | X | YYY | YYY | YYY | YZZ | ZZZ | 100,000 |
| R13 | X | XXX | YYY | YYY | YYY | ZZZ | 20,000 |
| R11 | X | XXX | XYY | YYY | YYY | YYZ | 4,000 |
| R9 | X | XXX | XXX | YYY | YYY | YYY | 1,000 |
| R7 | X | XXX | XXX | XXY | YYY | YYY | 200 |

The address bit positions identified by the letters Y are the ones connected through the range switch to the several stages of the deflection register. As shown in the table and in FIG. 5A, in setting R15 of the range switch the highest position of the deflection register is connected to address bit 15, the other nine stages of the deflection register being connected to successively lower address bit positions. With the range switch in setting R13 the connections are shifted two positions to the right from setting R15, the highest position of the deflection register being connected to address bit 13. In each other setting of the range switch the highest stages of the deflection register is connected to the correspondingly numbered address bit position.

It is evident from the table that the turning of the range switch has the effect of changing the scale of the display. In setting R7 the address bit position 7 has the same effect as address bit 15 has in setting R15 of the range switch.

The address bits identified by the letters Z are ignored, since the ten bit maximum precision of the D/A stages cannot cope with them. The bit positions marked X and the highest order Y position are referred to the base Comparator 34, in a manner to be described presently.

The right hand column of Table II shows the ranges of octal addresses which can be accommodated in the various settings of the range switch, each octal position being represented by three binary address bit positions. The simplified tabulation in the right-hand column does not take account of the fact that in the practical embodiment the differentiation of addresses by some of the lowermost address bit positions does not occur.

Since it is possible to adjust the BASE address, as described generally above and as will be described in more detail later, it is possible to display on the enlarged scale in the lower portion of the CRT screen various groups of addresses for each setting of the range switch. For example, some of those groups can be displayed with range switch setting R13 are shown below in octal notation in Table III.

TABLE III

From 000000 to 017777
From 020000 to 037777
From 040000 to 057777
From 060000 to 077777
From 100000 to 117777
From 120000 to 137777
From 140000 to 157777
From 160000 to 177777

The different addresses represented by the right-hand octal digit would not, however, be differentiated.

RANGE SWITCH

A schematic circuit diagram of the range switch is shown in FIG. 4. The purpose of this switch is to connect stages 10–1 of the deflection register 24 to any one of five different sequences of address bits in the main buffer 10. In the position shown in the diagram, which is the R15 position, address bit 15 is connected to the range switch output position 10, as indicated by the notation at the upper left-hand portion of the diagram, +S0A15, and at the upper right +SRS10 (the significance of the symbol "+S" will be explained presently); address bit 14 is connected to range switch output terminal 9, as shown by the notation in the lower left portion of the diagram +S0A14, and at the lower right +SRS9. Proceeding through the diagram it will be seen that in this setting of the switch the output terminal +SRS1 is connected to address bit position 6, as indicated by the notation +S0A6. Thus, in this position of the range switch, address bit 0 A15 to 0 A6 are connected to respective range switch outputs RS10–RS1. (For the purpose of the present explanation a notation such as "0 A15" may be taken to signify merely bit position 15.) These outputs of the range switch go to the deflection register, as shown in FIGS. 1 and 12A–D and as indicated in Table II by the row of letters Y.

In setting R13 of the range switch address bit 13 is connected to range switch output RS10; in setting R11 of the range switch address bit 11 is connected to output RS10, etc. At the lower end of the scale the steps are similar, except that in range switch setting R9 output RS1 is connected to ground and in setting R7 outputs RS1, RS2, and RS3 are connected to ground. Comparing the diagram with Table II, it will be seen that the letters Y in the diagram show the address bits which are connected to the ten outputs of the range switch, in its various settings, and the diagram conforms to the fact that in setting R9 one of the address bits is ineffective and in setting R7 three of them are ignored.

BASE COMPARISON

At the beginning of an address display cycle, as will be described in detail later, certain address bits are compared with corresponding bit positions of the base address setup on the row of toggle switches 14 (FIGS. 1 and 3).

Figure 6:
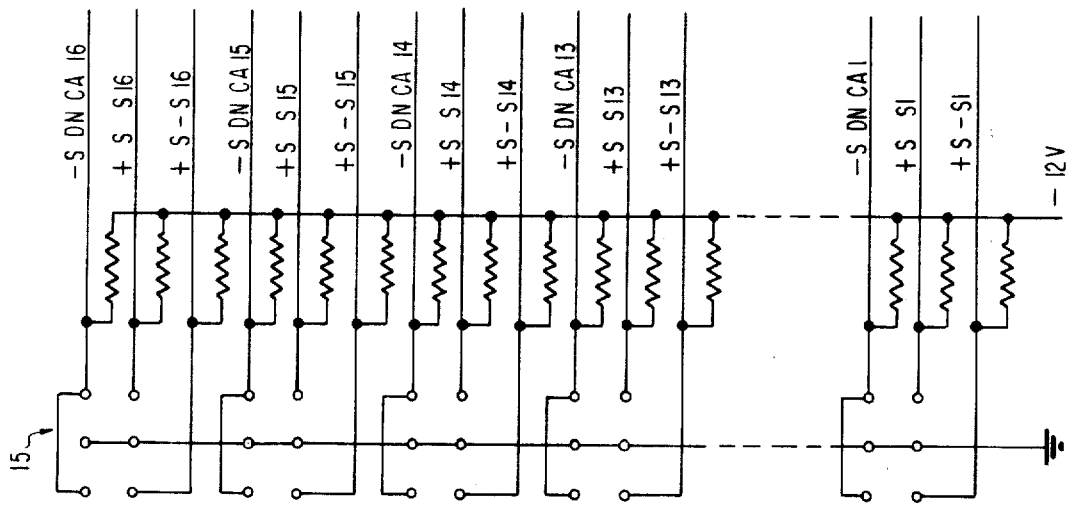
FIG. 6 is a wiring diagram relating to the start address switches.

The base comparing circuits are shown in FIG. 6, but before describing these circuits in detail an explanation of the logic of base comparison will be given. The logic of the circuitry in FIGS. 11A–H causes the comparison to be effectively made between the base address and the group of address bits consisting of those marked X in Table II, for the particular range, and the highest order Y bit, the number of bits compared increasing as the setting of the range switch is shifted from R15 to R7. It is not necessary to test any position below the highest order Y bit in each range, because if that bit position and all higher positions are low, the address will be low, even if all the lower order bit positions contain a 1. Thus, the number of positions to be tested for low is determined by the setting of the range switch. Also, the choice of base addresses is limited to addresses which are multiples of one-half of the range selected by the range switch setting. In range 13, for example, the number of octal addresses displayable is 20,000 (Table II), therefore the lowest base number above 0 (which can be selected) is 10,000, which is represented by a 1 in position 13. (The rule for selection of base addresses was an arbitrary choice for the particular Execution Plotter being described.)

The bit comparisons are made by means of AND circuits, the comparison for "low" being made by looking for a 0 address bit together with a 1 base bit in a particular position, and for "high" by a 1 address bit and a 0 base bit. Each bit comparator also has brought into it the results of the opposite comparisons in higher order bits. For example, if bit 13 is high there will be no "low" (LO) indication for any of the bits 12–7, even if one of these contain a 0 address bit paired with a 1 base bit. However, in the absence of inhibition from higher order "high" (HI) signals a LO signal will produce a BELOW BASE output.

A HI signal for any compared bit position is brought together in an AND circuit with an IN RANGE input which is produced whenever the input buffer address is between the BASE and BASE-PLUS-RANGE addresses; and ABOVE APEX signal will issue in the absence of any IN RANGE condition. The two sets of bit comparators will produce either a HI or a LO result for every address unless the address is exactly equal to the base for the bits being compared. For certain settings of the BASE ADDRESS and RANGE SWITCH, these tests are all that are required. However, in some settings it is possible to have an OVERLAP condition, now to be described, which makes the comparison more complicated.

OVERLAP

Refer back to Table III and assume that, with a range setting of R13, a base address of #030,000, on the octal scale, is set up. A program segment contained in addresses 030000 to 041000 could not be displayed in one piece if only the settings shown in the table were available; two runs would have to be made to present the program. In order to overcome this limitation, a provision for overlapping displayable address regions is made.

A set of 20,000 addresses, starting at 030000 and going to 047777 would have the bit patterns:

Bit 16   13                    1  16   13                   1
    0, 01 1, 000, 000, 000, 000−  0, 10 0, 111, 111, 111, 111

The bits between the vertical markers would go to the D/A stages, but in order to preserve the correct order of presentation on the CRT, bit 13 would have to be inverted. Otherwise, this bit would cause the lowest address to be displayed halfway up the LO region, and the highest address would be just below the halfway deflection, because with range setting R13 address bit position A13 is connected to D/A stage 10, which causes a deflection of one unit.

In general, inversion of this bit for R13 takes place whenever the BASE ADDRESS contains a 1 bit in position 13. For other ranges a similar condition holds; if there is a 1 at the position corresponding to the highest address bit going to the D/A stage, this bit is inverted (OVERLAP condition). If the base contains a 0 at this position, no inversion is made (NON-OVERLAP condition). In addition to this inversion control, the BASE COMPARATORS must provide the proper comparisons for both OVERLAP and NON-OVERLAP conditions.

In addition to the ranges of addresses for a range switch setting R13, as shown in Table III, which all exemplify the NON-OVERLAP condition, there are other ranges of addresses, starting with different bases, pertaining to the overlap condition. These are all characterized by a 1 in bit 13 and are shown in the left column of Table IV.

TABLE IV

| B | | | A | |
|---|---|---|---|---|
| 16 13 | | | 16 13 | |
| 0001 | YYY | to | 0010 | YYY |
| 0011 | YYY | | 0100 | YYY |
| 0101 | YYY | | 0110 | YYY |
| 0111 | YYY | | 1000 | YYY |
| 1001 | YYY | | 1010 | YYY |
| 1011 | YYY | | 1100 | YYY |
| 1101 | YYY | | 1110 | YYY |

The right column of Table IV shows, aligned with the different base addresses, the corresponding highest address for bits 16-13, the lower order bits indicated by Y's being either 0 or 1.

V
TABLE OF "IN RANGE" BIT PATTERNS

|     | BASE |       |   |   |   |   |   | ACTUAL |       |    |   |   |   |   | IN RNG Design'tn |
|-----|------|-------|---|---|---|---|---|--------|-------|----|---|---|---|---|------------------|
|     | 15   | 13    | 11| 9 | 7 |   |   | 15     | 13    | 11 | 9 | 7 |   |   |                  |
| R15 | 0 1  | 1  1  | 1 1 | 1 1 | 1 1 | Y-- | | 0 0 | 0 0 | 0 0 | 0 0 | 0 0 | Y- | 15 |
|     | X 0 0| 1  1  | 1 1 | 1 1 | 1 1 | Y-- | | X 0 1 | 0 0 | 0 0 | 0 0 | 0 0 | Y- | 1301 |
| R13 | X· 0 1| 1  1 | 1 1 | 1 1 | 1 1 | Y-- | | X 1 0 | 0 0 | 0 0 | 0 0 | 0 0 | Y- | 1310 |
|     | X 1 0| 1  1  | 1 1 | 1 1 | 1 1 | Y-- | | X 1 1 | 0 0 | 0 0 | 0 0 | 0 0 | Y- | 1311 |
|     | X X X| 0  0  | 1 1 | 1 1 | 1 1 | Y-- | | X X X | 0 1 | 0 0 | 0 0 | 0 0 | Y- | 1101 |
| R11 | X X X| 0  1  | 1 1 | 1 1 | 1 1 | Y-- | | X X X | 1 0 | 0 0 | 0 0 | 0 0 | Y- | 1110 |
|     | X X X| 1  0  | 1 1 | 1 1 | 1 1 | Y-- | | X X X | 1 1 | 0 0 | 0 0 | 0 0 | Y- | 1111 |
|     | X X X| X  X  | 0 0 | 1 1 | 1 1 | Y-- | | X X X | X X  | 0 1 | 0 0 | 0 0 | Y- | 901 |
| R9  | X X X| X  X  | 0 1 | 1 1 | 1 1 | Y-- | | X X X | X X  | 1 0 | 0 0 | 0 0 | Y- | 910 |
|     | X X X| X  X  | 1 0 | 1 1 | 1 1 | Y-- | | X X X | X X  | 1 1 | 0 0 | 0 0 | Y- | 911 |
|     | X X X| X  X  | X X | 0 0 | 1 1 | Y-- | | X X X | X X  | X X | 0 1 | 0 0 | Y- | 701 |
| R7  | X X X| X  X  | X X | 0 1 | 1 1 | Y-- | | X X X | X X  | X X | 1 0 | 0 0 | Y- | 710 |
|     | X X X| X  X  | X X | 1 0 | 1 1 | Y-- | | X X X | X X  | X X | 1 1 | 0 0 | Y- | 711 |

Table V is a diagram of "IN RANGE" bit patterns relating to the IN RANGE signals generated in FIGS. 11E-H. The left hand array labeled "BASE" shows the possible base addresses for each range, while the right hand array labeled "ACTUAL" shows, row by row, the corresponding maximum "IN RANGE" address. For any given range setting the bit patterns above and to the left of the lines are looked for in both the BASE and the ACTUAL address. If both bit patterns on the same line of Table V are found, and if the BASE and the ACTUAL addresses were equal in the bit arrays marked X, the appropriate IN RANGE signal prevents an ABOVE APEX response. The notations Y -- indicate that the other bit positions may be either 1 or 0. In the extreme right hand column labeled IN RING Design'tn the left hand digits 15, 13 . . . 7 designate the range, while the right hand bits 01, 10, 11, 01, etc. designate the three different bit patterns in the two bit positions immediately to the left of the respective bit position corresponding to the range, in the "ACTUAL" array. That is, for range 13, bit positions 14 and 15 may have the patterns 01, 10, or 11. Each of these pertains to a different IN RANGE output in FIG. 11E, and the same holds true for the other ranges, R11–R7.

DETAILED CIRCUIT DESCRIPTION

The panel circuit controls

The functions of the illustrative Execution Plotter are controlled by a two level logic, the levels being symbolized as +S and —S, respectively; +S is ground voltage and —S is —12 volts. By way of illustration of the operation of these two levels, reference will be made to FIG. 4, showing panel switching circuits relating to the sweep control and indicator lamp circuits for the horizontal counter. At the top of the diagram are two outputs labeled +S ALL CYC SWP and +S INSTR SWP. These leads are connected to two different terminals, A and I, of a step selector switch 406 (see also FIG. 3). The arm 408 of the switch is connected to a ground lead 410 and the leads 402 and 404 are connected by respective resistors 412 and 414 to —12 v. lead 416. With the switch arm in the center position, T, both leads 402 and 404 are at —12 v. When the arm 408 is swung to either contact A or I the corresponding lead 402 or 404 is brought up to the +S level.

Passing over the speed selector switch, for the present, the next three switches, 418, 420, and 422, are the ADDR. END-CARRY END switch, the ADDR START-SIG START switch, and the SINGLE SWEEP-MULT SWEEP SWITCH, respectively. Switch 418 has only one contact with an output lead 424, to deliver the +S ADDR END signal when the switch is in its left-hand position; in the righthand position of the switch the lead 424 is at —S level. Switch 420 controls in a similar way two output leads 426 and 428 labeled +S ADDR START and +S SIG START, respectively. Switch 422, when in the left position, throws output lead 430 to the +S level, giving output +S SINGLE SWP. In the righthand position of switch 422 it allows the sweep to be repeated until stopped by other means.

Swith 432 is the PRIME P.B. (push-button) switch, which normaly connects the —S PRIME P.B. lead 434 to ground, establishing the +S level. When the switch is operated, lead 434 drops to the —12 v. level and conducts a —S PRIME P.B. pulse, which serves to set up the sweep controls for an address start, as will be described later. When the prime push-button is released it restores the +S level to lead 434. The description of the other items of FIG. 4 will be reserved until later.

The Execution Plotter is turned on by closing switch 60, which applies —12 v. between ground lead 410 and —12 v. lead 416. The same voltage levels are applied to other leads in the panel switch circuits and in the logic circuits to be described presently. Also, through switch means not shown, a +40 v. power supply will be extended across certain terminals of the horizontal and vertical D/A converters, as will appear in the subsequent description.

Figure 5B:
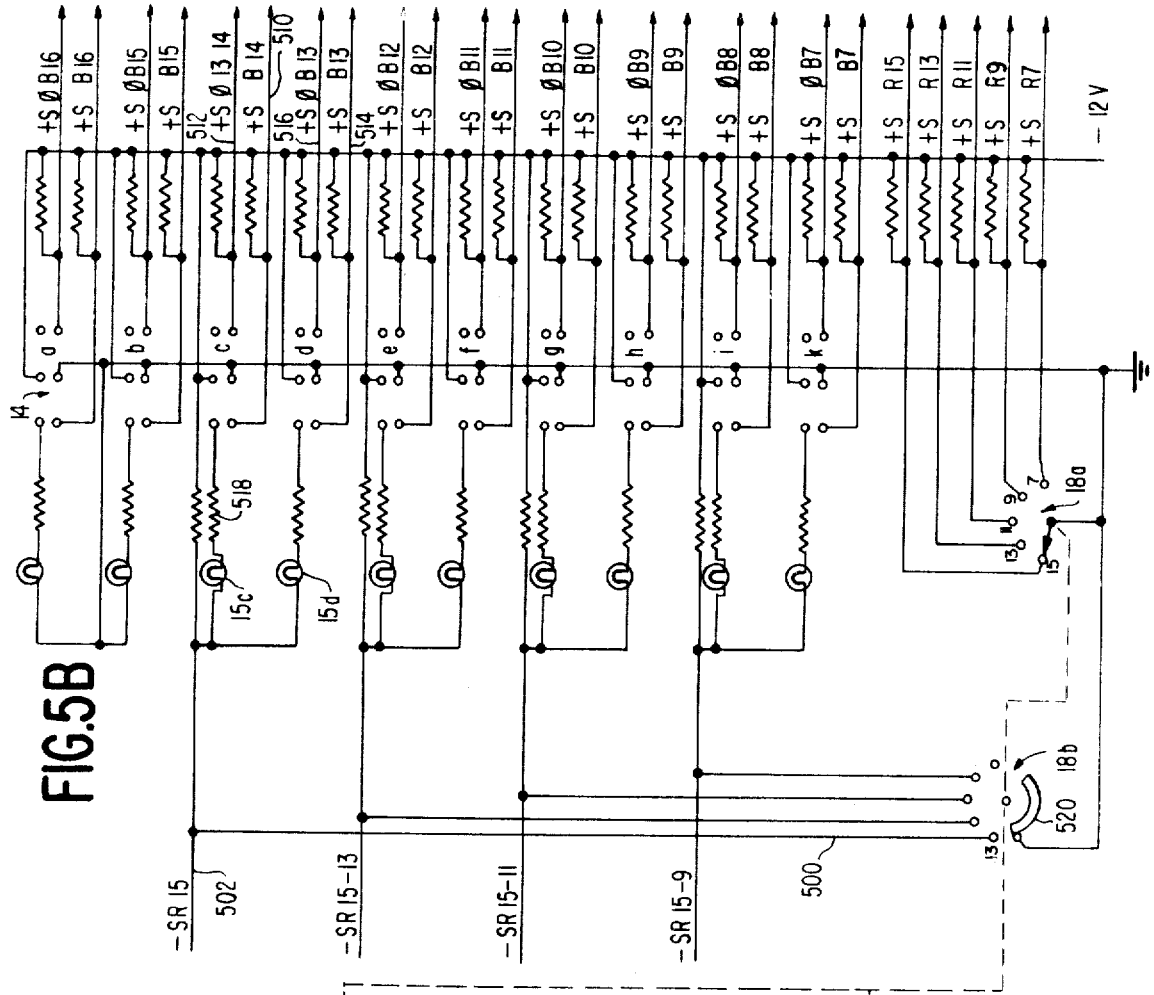
FIGS. 5A and 5B are wiring diagrams pertaining to the range switch and the base address switches.

With the range switch set at R13, for example, a +SR13 output will appear from section 18a of the switch (FIG. 5B). Also, the advance of section 18b of the switch by one position will extend the +S level through lead 500 to terminal 502, removing the normal —S level from this terminal. In the line of base address toggle switches 14 if the individual switches c and d are in their left positions and all of the other individual switches in their right positions, the +S output will appear on output leads 510 and 514, but not on leads 512 nor 516, indicating that the outputs in these two positions, 14 and 13, represent a 1 and not a 0. The upper arms (not shown) of switches c and d connect —12 v. to indicator lamps 15c and 15d, of the group 15 (FIG. 3), turning these lamps on. The circuit for lamp 15c extends from —12 v. through the upper switch arm, resistor 518, lamp 15c, lead 500, terminal R13 of switch section 18B, shorting segment 520, to ground. If any other base address switch below switch d were turned left to the 1 position the corresponding lamp would not go on, because the circuit would not be completed to ground through switch section 18B, indicating to the operator a base address setting inconsistent with the range switch setting.

Figure 5A:
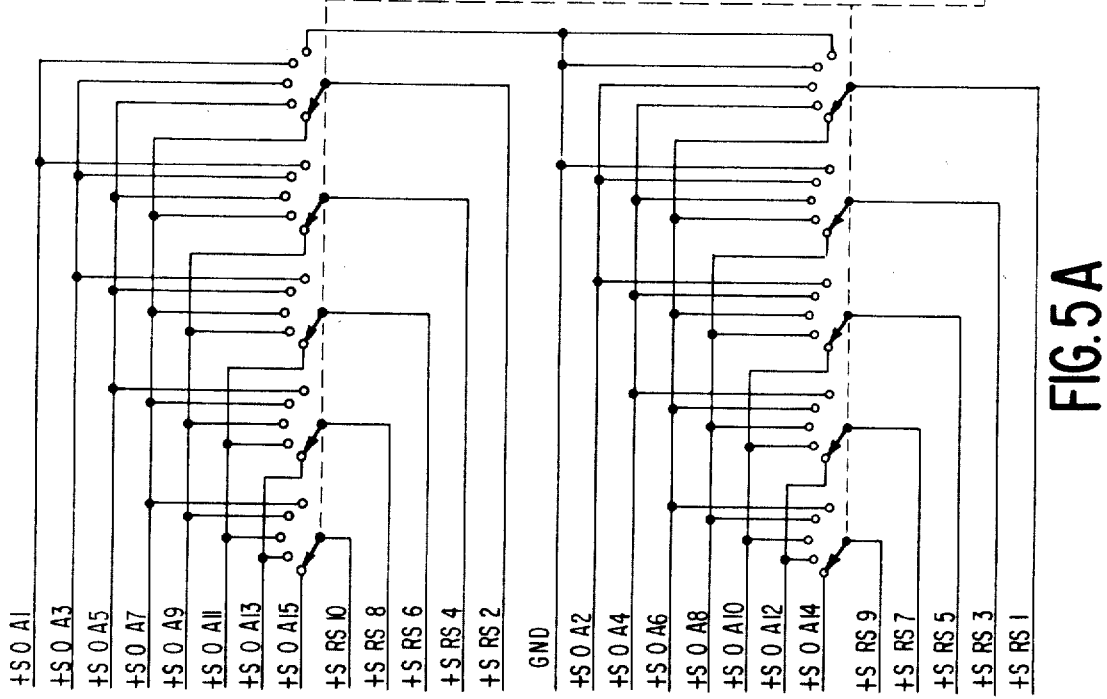

In FIG. 5A the setting of the range switch 18 to R13 connects main buffer output +S0A13 to range switch output terminal +SRS10; also main buffer output +S0A12 to range switch output +SRS9, etc. The range switch output terminals +SRS10–1 go to the deflection register, FIGS. 12A–E, where they are subject to controls previously referred to as LOW DEFL. GATE. When the DEFL. GATE circuits are on, the vertical D/A converter 20 responds bit-by-bit to the bit positions of the range switch.

A start address may be set up on start address register switches 16 (FIG. 3). If the 14 and 13 switches, for example, are set to the 1 position and the others to the 0 position, as seen in FIG. 6, switches 16c and d (bits 14 and 13) are thrown to the right and the other switches to the left. Only five of the sixteen switches are shown in FIG. 6. In the setting described the outputs +SS14 and +SS13 are effective, while in the other positions the +S0S16, +S0S15, etc. are effective. The address in the main buffer will therefore be equal to the start address switch setup only when it has 1's in bit positions 14 and 13 and 0's in all of the other bit positions. It is possible to set the start address switches of certain bits in the center position, so that it makes no difference whether the bit in the main buffer is 0 or 1. This would generally be the case in the lower order switches, if the operator is willing to have the sweep start occur when any address within a certain range appears. For any such switch in the center position the output —SDCCA1, etc. will be effective. The outputs from the start address switches go to the start address comparator 36, FIGS. 1 and 15; their operation in the comparator will be described later.

Main buffer control

Figure 7:
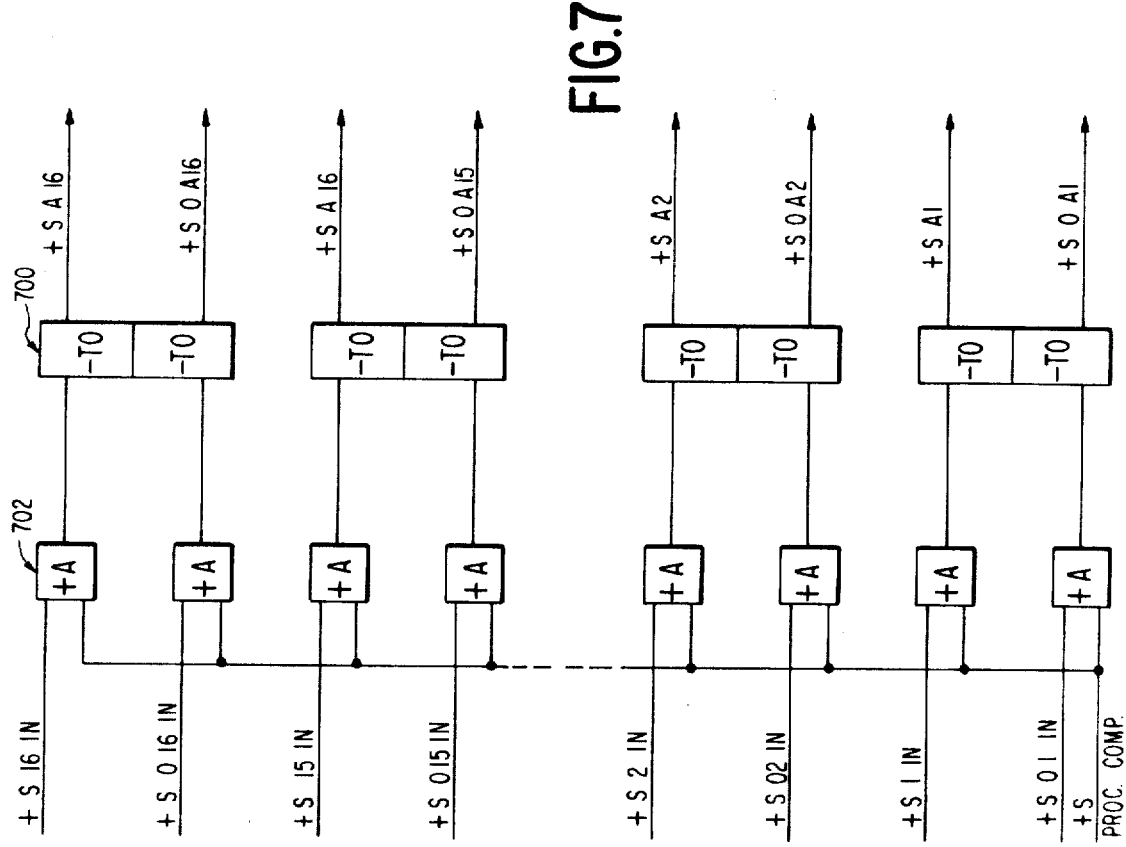
FIG. 7 is an abbreviated block diagram of the address input and buffer circuits.

The main address register (MAR) of the computer, as previously stated, is connected to the main buffer of the Execution Plotter through cable 11 at all times, except during processing cycles of the Execution Plotter. FIG. 7 shows a series of latches 700 (10 in FIG. 1) constituting the main buffer of the Execution Plotter. The latches are pairs of transistors cross-coupled in the usual manner, so that only one of each pair can be conducting at a time. A+SA16 output from the upper section of the uppermost latch 700 indicates a 1 in this stage, while a +S0A16 output from the lower section indicates a 0 in this stage of the main buffer. The cable shown at 11 in FIG. 1 is represented by input lines in FIG. 7, +S16IN, +S016IN, etc. in FIG. 7. These IN lines assume a means, not shown, for delivering +S outputs on either of two lines from each bit of the MAR, one line for a 1 condition and the other for a 0 condition. The IN lines have access to the stages 700 of the main buffer through AND gates 702 controlled by a timing pulse labeled +S PROC COMP. The timing pulse is present only between processing cycles; therefore, the main buffer is identical to the MAR setting between processing cycles in the Execution Plotter, but the previously set address is locked in as soon as a processing cycle begins, as will be explained presently.

The start of a processing cycle is controlled by the strobe input and lockout circuits shown in FIG. 8 and the execution of the processing cycle is carried out in response to timing pulses generated by the process timing circuit shown in FIG. 9. The circuits in these two figures interact in a way which will now be described.

A pair of latches 800 and 802 together determine whether the Execution Plotter is in a processing cycle, or is in a process complete state. In the latter state the circuit is awaiting a strobe from the computer to initiate a processing cycle. Once the cycle begins the circuit is unaffected by other strobes which may appear during the processing cycle.

Both latches 800 and 802 are in a reset condition, when the circuit is awaiting another strobe from the computer, as a result of a —S RESET PROC pulse received from Single Shot 914 of FIG. 9 at the end of the preceding processing cycle. The RESET PROC pulse is filtered through an AND circuit 812, to be described presently, to switch off latch 802. A —S PROC COMP output issues from the upper section of latch 800, which is conducting in the off condition, and a +S PROC COMP output is derived through an inverter 804. The latter +S output, just referred to above, conditions the AND gates 702 to allow the main buffer stages 700 to follow the respective bit positions of the MAR of the computer. From the bottom section of latch 802 issues a +S RDY FOR STR output, a branch from which primes strobe gate 806.

The processing cycle will be initiated by a —S GATED PROC pulse from strobe gate 806, upon receipt of any one of a number of strobes on the inputs shown at the upper left of FIG. 8. Any one of these +S strobes, inverted by the related inverter 808, 816, 818, 820, or 822, will switch OR gate 810, which will generate from strobe gate 806 and the —S GATED PROC pulse. In the illustrative circuit the B cycle strobes, A, B, or C, are combined in an OR circuit 824, to generate a single +S B CYCLE pulse. An I strobe will produce a —S I CYCLE pulse and, through inverter 810, a complementary +S pulse. Similarly, —S and +S E CYCLE pulses are generated in response to an E CYCLE strobe from the computer, with the intervention inverter 826 for the +S pulse.

PROCESS TIMING

The —S GATED PROC output from strobe gate 806 triggers SS (single shot) 900 (FIG. 9), initiating a —S INPUT GATE, which extends for the duration of the single shot time period. A complementary +S INPUT GATE is delivered from inverter 901. Now refer to the wave diagram, FIG. 21, for a review of the timing up to this point. Line a shows an I strobe rising at 0 time of the wave diagram. Line d shows the +S RDY FOR STR already up, while line c shows the upper input terminal of the strobe gate 806 receiving the +S input concurrently with the rise of the I strobe, generating the —S GATED PROC pulse, line e, and the —S INPUT GATE, line f. The —S INPUT GATE switches on latch 800 (FIG. 8) the output of the upper section going to +S and switching the +S PROC COMP, line k, and —S PROC COMP outputs to the opposite levels, indicating that the process cycle is not complete, but in operation. The dropping of the +S PROC COMP signal immediately locks the main buffer against further input from the MAR of the computer (see FIG. 7). The —S INPUT GATE also switches on latch 802, producing at its lower section output a —S level, which blocks strobe gate 806. Wave diagrams d and e show the termination of the +S RDY FOR STR and the —S GATED PROC. The shutting off of strobe gate 806 inhibits any other strobe from initiating a new processing cycle until the one now under way is completed.

Returning now to FIGS. 9 and 21, during the —S input gate the single shot 904 has been held off by a +S output from inverter 902. When the —S *input gate* terminates, 904 is triggered and generates the —S LOC (location) pulse and, through inverter 906, the +S LOC pulse, (line g). The function of the location pulse is to sample the base and base/range comparator circuits 34, shown more particularly in FIGS. 11A–H, and the start address comparator 36, shown in FIG. 15.

The trailing edge of the location pulse triggers SS908, producing the —S READ RESULT directly, and through inverter 910, the +S READ RESULT pulse, line h. One function of this pulse is to transfer the address in the main buffer 10 and the channel status in the channel buffer 12 to the deflection register 24, through either the Lo Defl. Gate 30, the Med. Defl. Gate 28, or the HI Defl. Gate 26, depending upon the result of the location pulse test just described. An additional function of the READ RESULT pulse is to enable a step of the horizontal counter.

The final pulse of the processing cycle is the +S RESET PROC pulse (FIG. 9 and FIG. 21, line i). This is initiated by the trailing edge of the READ RESULT pulse, which, through inverter 912, triggers SS914. The —S RESET PROC pulse is directly generated and, through inverter 916, the complementary +S RESET PROC pulse.

The —S RESET PROC pulse switches off trigger 800 (FIG. 8). The upper section of trigger 800 generates the normal +S and —S PROC COMP pulses, the former unblocking AND gates 702 of the main buffer, thereby placing it in communication with the MAR. The +S output from the lower section of trigger 800 primes AND circuit 812, but a branch to the lower terminal of this AND gate inhibits the gate until the end of the —S RESET PROC pulse. Also, any strobe which might be present at OR circuit 810 causes a —S pulse to be transmitted through inverter 814, during the existence of that strobe. At this time the strobe gate 806 is inhibited by a —S RDY FOR STR and does not initiate a new processing cycle. When both the —S RESET PROC pulse and the pulse through inverter 814 are terminated the AND gate 812 will switch and reverse latch 802, restoring the +S RDY FOR STR condition, and priming strobe gate 806.

BASE AND BASE/RANGE TEST

Figure 11:
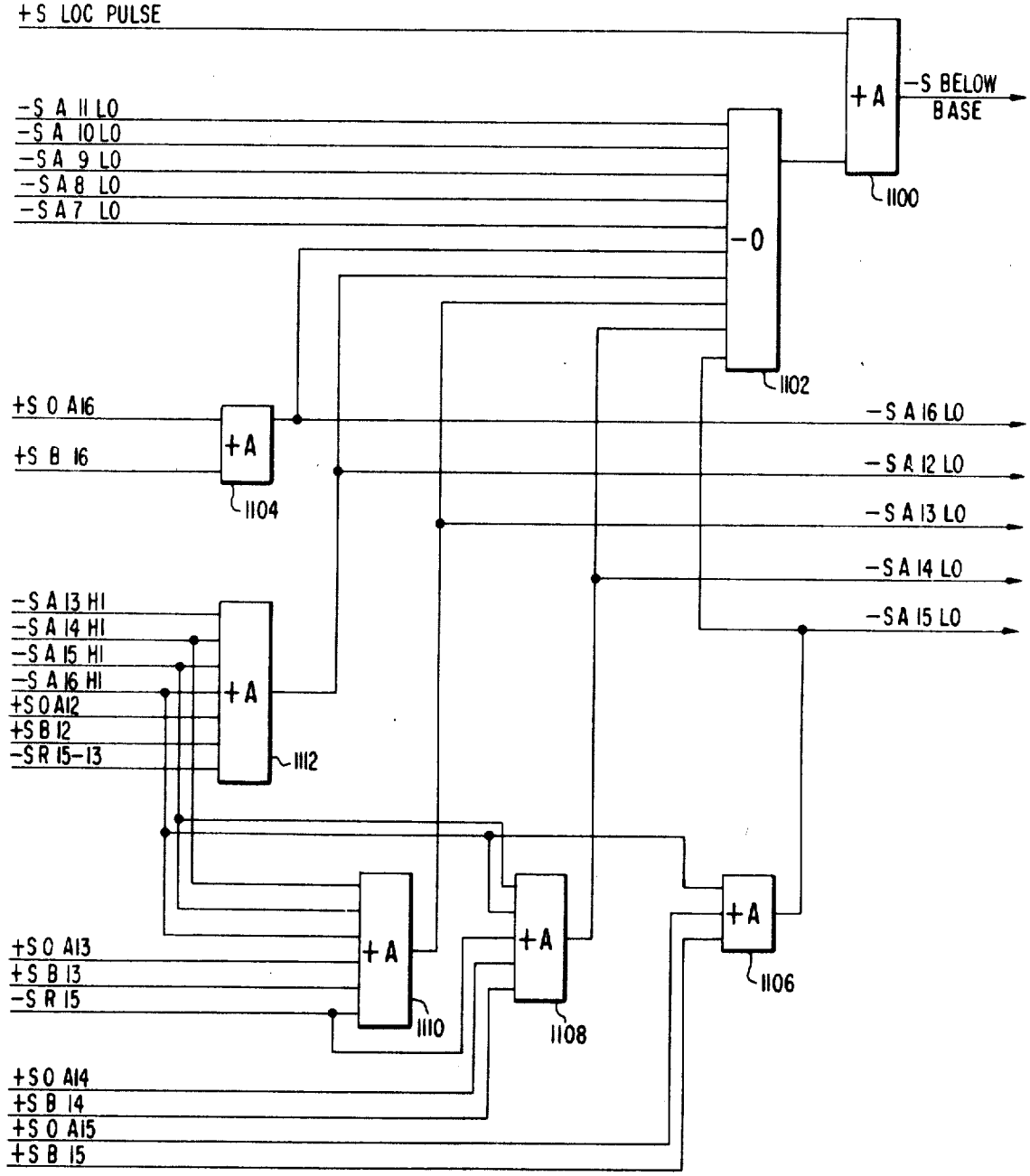
FIGS. 11A to 11H are block diagrams of the address comparing circuits.
Figure 11C:
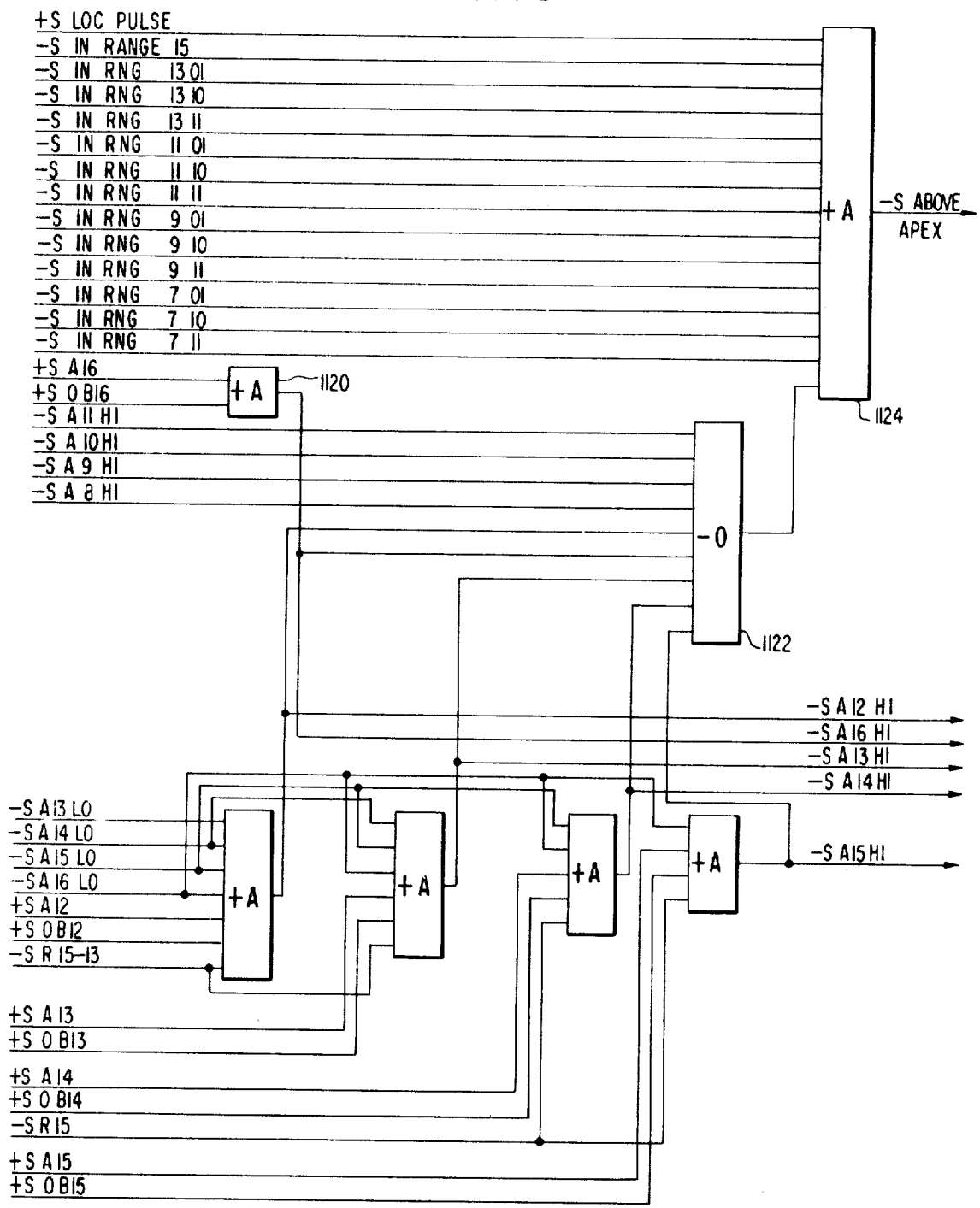
Figure 11D:
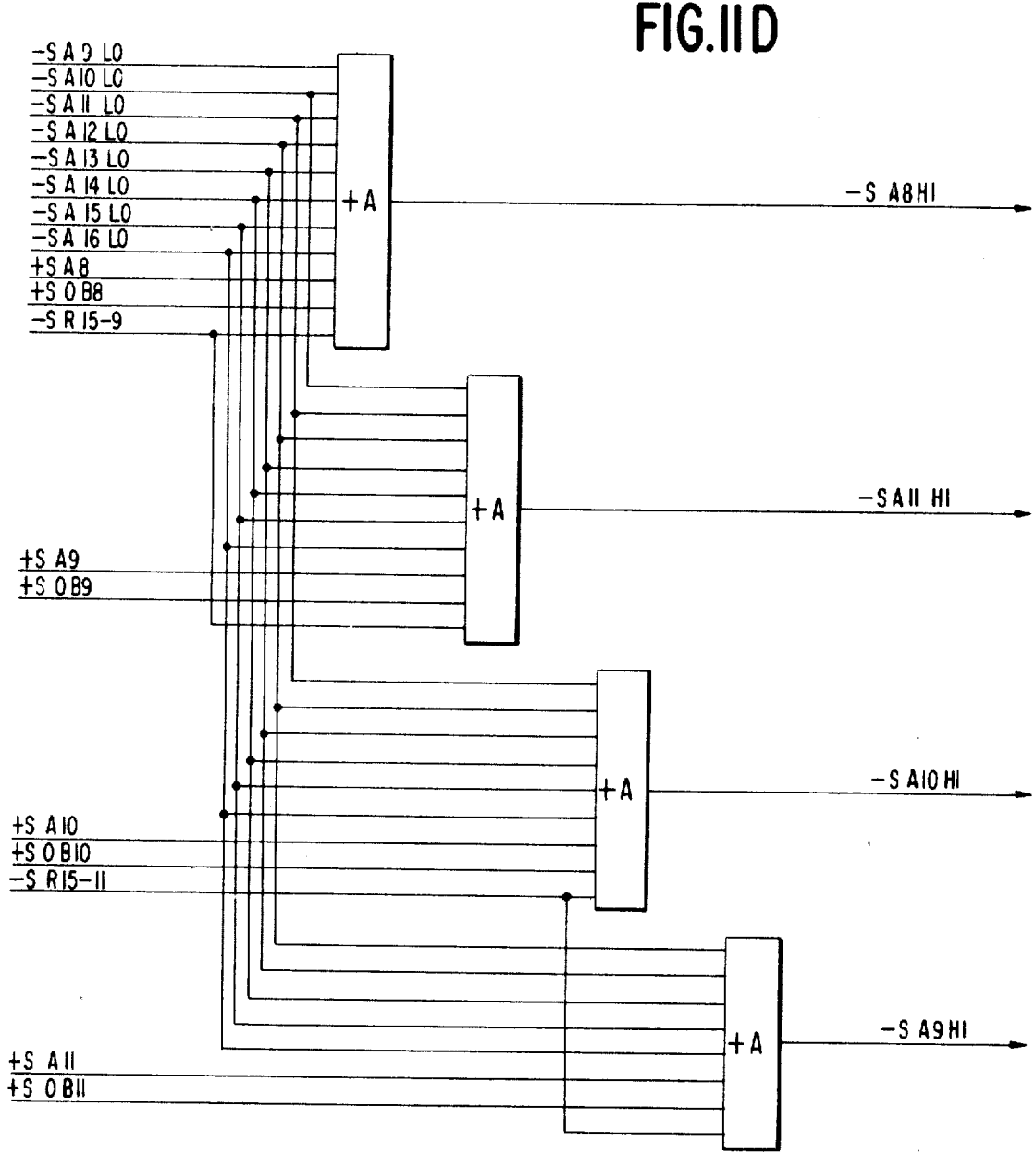
Figure 11F:
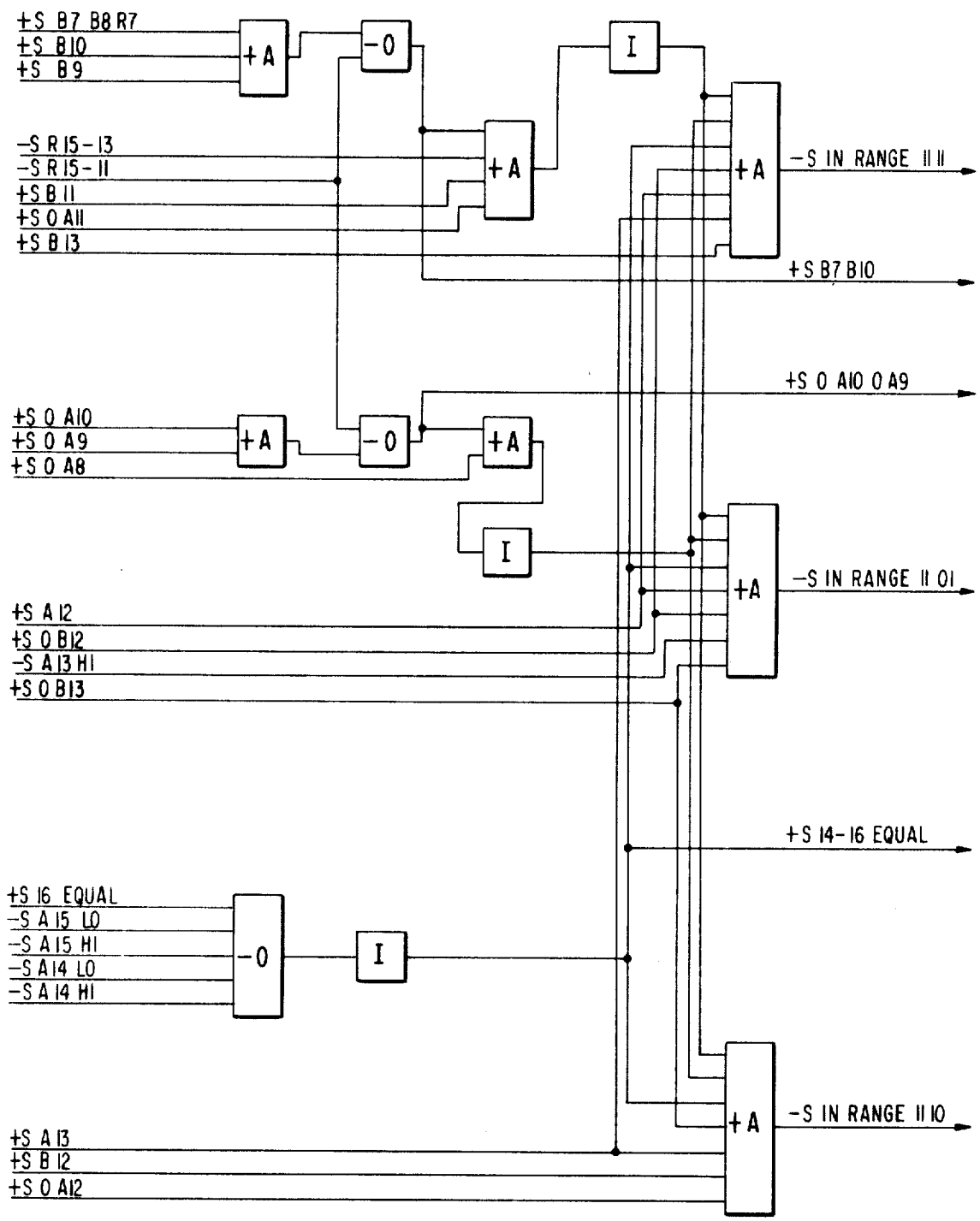
Figure 11G:
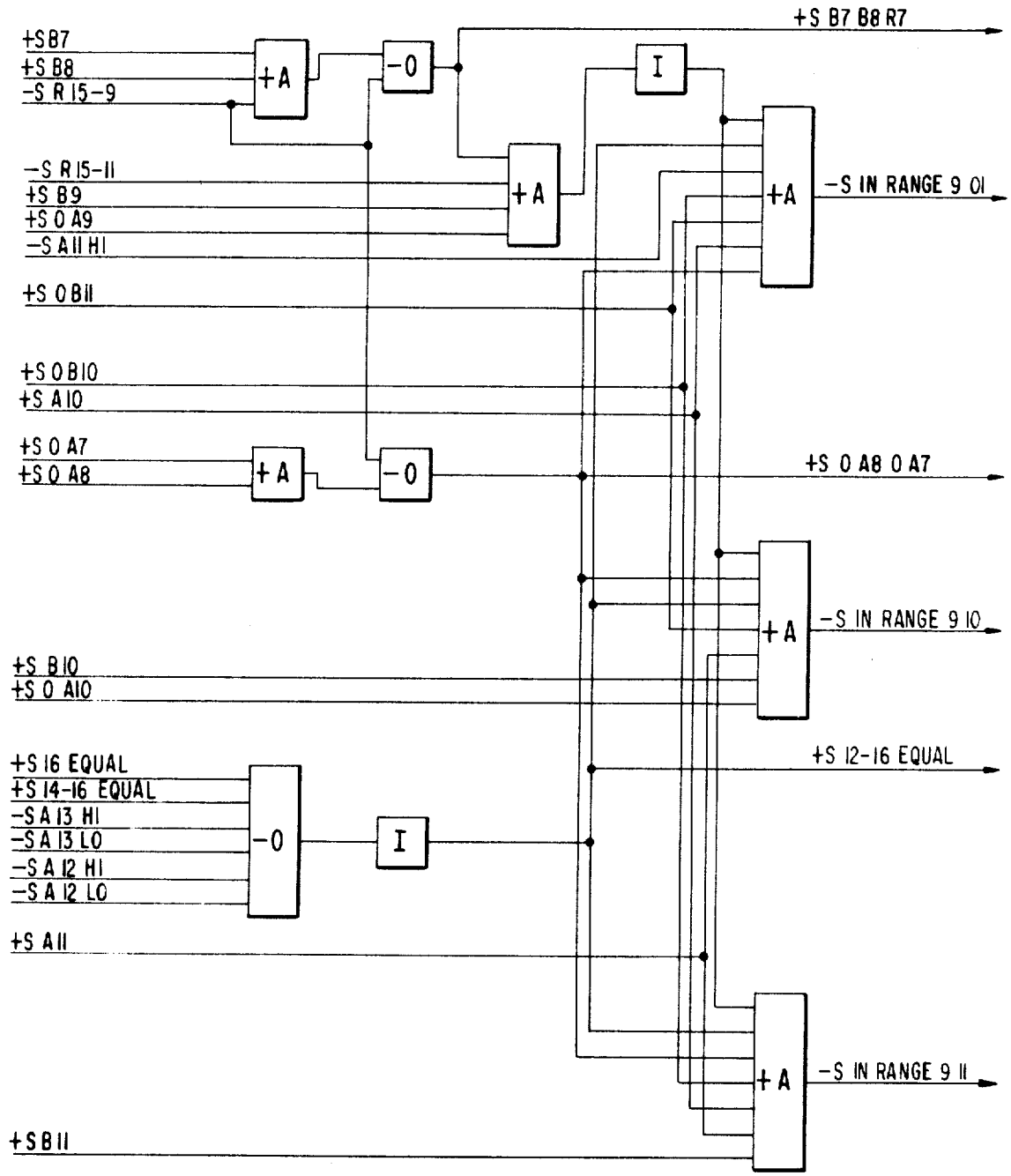
Figure 11H:
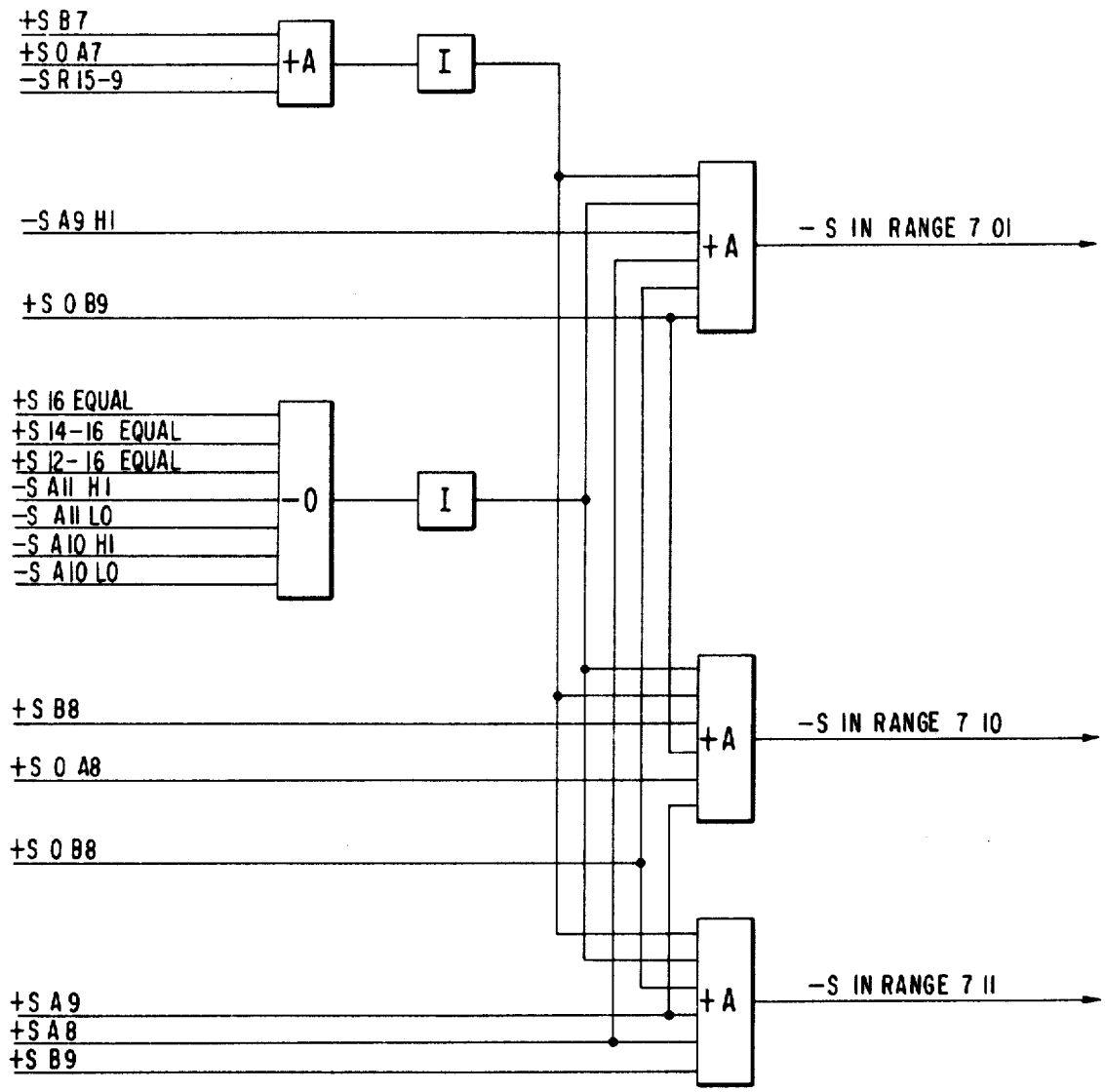

BELOW BASE Signal. In FIG. 11A the +S LOC pulse conditions one input of AND circuit 1100, the other input of which is dependent upon a +S output from a circuit 1102 labeled "—0," meaning an OR circuit requiring a —S input. If both of these inputs to AND circuit 1100 occur a —S BELOW BASE output signal will be generated.

Considering first, the test made at AND circuit 1104, this circuit receives inputs +S0A16 and +SB16. The first of these is derived from the +S0A16 output terminal of main buffer latch 700a (FIG. 7). The second input comes from bit 16 position of the base address switches 14 (FIG. 5). If switch 14a is in the left position it gives the +SB16 input and a 0 in bit 16 of the main buffer will produce a +S0A16. The combination will switch AND gate 1104 and OR gate 1102, producing from AND gate 1100 the —S BELOW BASE signal. Also, from AND gate 1104, will issue a —SA16LO signal, used elsewhere in the circuits of FIGS. 11A–H.

AND gate 1106, pertaining primarily to the bit 15 position, requires a +S0A15 and a +SB15 input; also a not A16HI signal. This signal will be generated at AND gate 1120 (FIG. 11C), if either A16 is 0 or B16 is 1. Either signal would cause the output of AND gate 1120 to be at +S, which is a "not A16HI" signal.

Examination of the inputs to the other AND gates 1108, 1110, and 1112 in FIG. 11A will show the condition necessary to generate a —S pulse from any one of these AND gates, to switch OR gate 1102 and AND gate 1100 and produce the —S BELOW BASE signal.

In a similar way it can be found, by examining the circuits of FIG. 11B, whether any one of the —SA7LO through —SA11LO signals is present, any one of which will cause the —S BELOW BASE signal to issue from AND gate 1100.

ABOVE APEX Signal. The generation of a —S ABOVE APEX signal (FIG. 11C) is more complex. The combination of a 1 in bit position 16 of the main buffer and a 0 in base address switch 14a will cause the +SA16 and +S0B16 inputs to AND gate 1120 and produce therefrom a —S input to OR circuit 1122, which will place a +S condition on the lowest input to AND gate 1124. The other inputs to AND gate 1124 include the +S LOC pulse strobe, and a series of —S IN RANGE inputs derived from circuits in FIGS. 11E to 11H. These are inhibiting pulses, that is, the normal condition of the input is at +S and, unless one of these —S IN RANGE pulses is present the AND circuit 1124 will generate the —S ABOVE APEX signal.

To take a typical case, consider the —S IN RANGE 1310 signal (FIG. 11E). The last four digits designate range 13 with the combination 10 in the two positions just to the left of bit 13, in the actual address, as described with reference to Table V. The requirements for the production of this signal are represented by the following Boolean-type expression, as can be seen by examining the inputs to AND circuit 1150:

$$(R15-13)\overline{(R15)}(B13)(0A13)(B14)(0A14)$$
$$(0B15)A(15)(A16 \text{ equal to } B16)$$

DEFLECTION GATES

Figure 10:
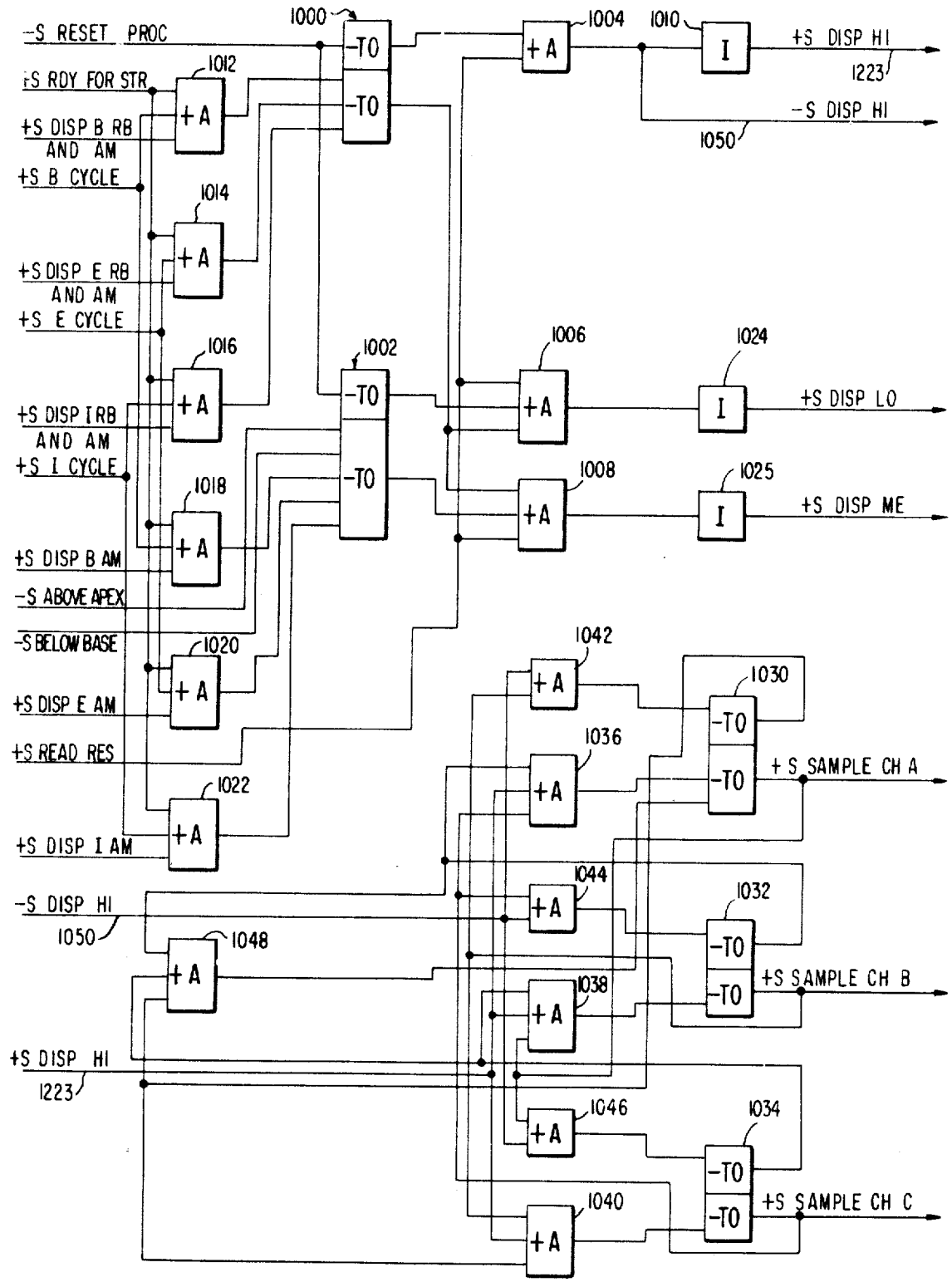
FIG. 10 is a block diagram of the transfer gates and channel sampling ring.

Now referring to FIG. 10, which is a block diagram of the source of signals which control at the Deflection Gates 26, 28, and 30 of FIG. 1, there are shown two latches, 1,000 and 1,002, which constitute the deflection gate control means, and by their combined settings determine whether the display is going to be in the low, medium, or high section of the CRT. At the end of every processing cycle the —S RESET PROC input at the top of FIG. 10 switches both latches 1,000 and 1,002 off. A +S condition at the output of the upper section of latch 1,000 supplies one input to AND circuit 1,004, while the —S output from the lower section of this latch inhibits AND circuits 1006 and 1008. If the two latches remain in this condition at the time the +S READ RESULT pulse arrives, a —S output will issue from AND circuit 1004 and produce the —S DISP HI output, and through inverter 101, the +S DISP HI output.

The switching of the latches 1000 and 1002 to other combinations of settings is controlled by a series of AND gates 1012, 1014, 1016, 1018, 1020 and 1022. Each of the AND gates has a selective input controlled by the group of three switches 50, any of which can be set to either of two active positions, or to an inactive central position. If the I switch is set down, a +S DISP IRB input is applied to AND gate 1016. A second input to this AND gate is the +S I CYCLE (FIG. 8) derived from an I strobe. The third input, which is the same for all of the AND gates, is the +S RDY FOR STR, which is on at the time of the I cycle pulse, but turns off shortly afterward, to prevent any further input to latches 1000 and 1002. The example chosen, which is in response to an I cycle, produces a —S output from AND gate 1016 to the lower section of latch 1000, inhibiting AND gate 1004 and priming AND gates 1006 and 1008 by the +S output from its lower section. From the lower latch 1002 the +S from the upper section prepares AND gate 1006, while the —S output from the lower section inhibits AND gate 1008. When the +S READ RES pulse arrives, an output from AND gate 1006 through inverter 1024 appears as the +S DISP LO. If the I switch 50 had been set to its upper position the +S DISP I AM would have again prepared AND gate 1016 and also AND gate 1022, which would have permitted the +S I CYCLE pulse to switch both of said AND gates, causing a —S input to the lower sections of both latches 1000 and 1002. In this case the +S READ RES pulse would pass through AND gate 1008 and inverter 1020, to issue the +S DISP ME.

From an inspection of FIG. 10, it can be seen that the E cycle or the B cycle pulses can have the same effect on the display signals as that described for the I cycle. While the B cycle in the present case is concerned only with displaying channel status, it could be used for other purposes requiring display of addresses, or the like. In addition to the primary controls of AND gates 1012 to 1022, inputs —S ABOVE APEX, or —S BELOW BASE can modify a setting which would otherwise cause the DISP LO signal, by switching latch 1002, to cause the DISP ME signal to be issued instead.

DEFLECTION REGISTER

The deflection register 24 (FIGS. 12A–E) comprises a series of eleven latches 1200, lettered *a, b, c,* etc., one for the SPACE UP position and one for each of the ten bit positions 10, 9, . . . 1. When any latch is OFF (lower transistor not conducting) the —S output indicates a 0 condition, while the opposite state represents a 1.

Figure 13:
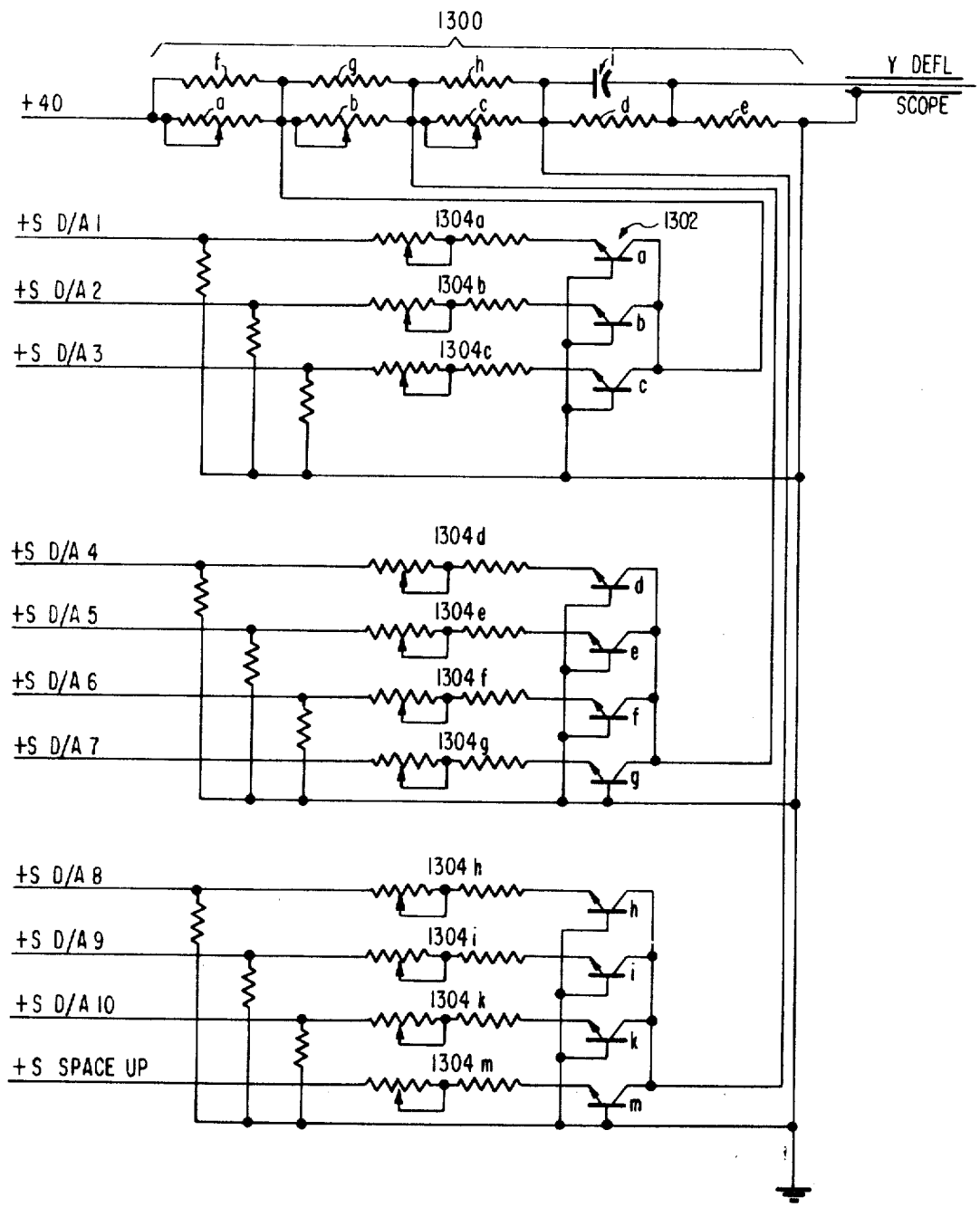
FIG. 13 is a wiring diagram of the vertical digital/analog converter.
Figure 14:
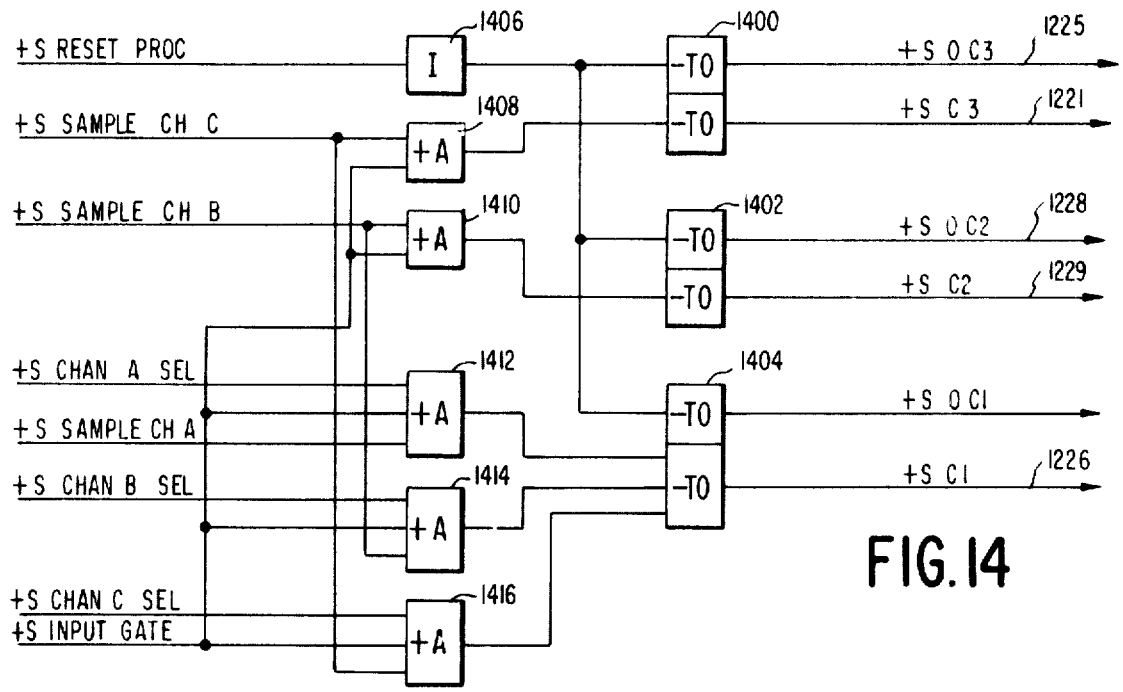
FIG. 14 is a block diagram of the channel input and buffer.

The latches 1200 are controlled by inputs from the DISP HI signal, combined with outputs from the channel buffer 1400, 1402, 1404 (FIG. 14); by the DISP LO signal combined with outputs from the range switch; and the DISP ME signal combined with outputs from the main buffer. The manner in which the inputs control the deflection register latches will be described presently but first will be explained the effect of the outputs of these latches on the vertical D/A converter (FIG. 13).

VERTICAL D/A CONVERTER

In the vertical D/A converter a +40 volt terminal is connected by a network 1300 consisting of resistors *a, b, c, d, e, f, g,* and *h,* and capacitor *i* to the Y deflection terminal of the oscilloscope. The junctions of the resistors are connected to the collectors of groups of transistors 1302, shown in a vertical row. The basis of the transistors are connected to ground, while their emitters are connected through respective resistors 1304a–1304i, 1304k and 1304m, to the output terminals of respective latches of the series 1200 of the deflection register. Each of these latches, when in the 0 condition, applies —S level to the emitter of the corresponding transistor 1302, causing this transistor to conduct and reduce the voltage at the Y deflection terminal of the oscilloscope by an amount dependent upon the binary of ordinal value of that transistor. For example, as stated earlier in the specification, the transistor 1302k, when conducting, causes a drop in the Y deflection voltage of one unit; for transistor 1302i the drop is one-half unit, etc. The SPACE UP transistor 1302m causes a drop in deflection voltage of about two and one-quarter units. When the output from any latch of the series 1200 changes from —S to +S, indicating a 1, the corresponding transistor of the series 1302 is cut off and the Y deflection voltages rises by an amount proportional to the binary ordinal value of the particular transistor. That is to say, with all latches 1200 at 0 all of the transistors 1302a–m are conducting and the Y deflection is at the minimum or 0 level. The occurrence of a 1 in any binary position will lift the Y deflection by an amount corresponding to the ordinal value of that binary position.

DEFLECTION REGISTER CONTROL

Figure 12C:
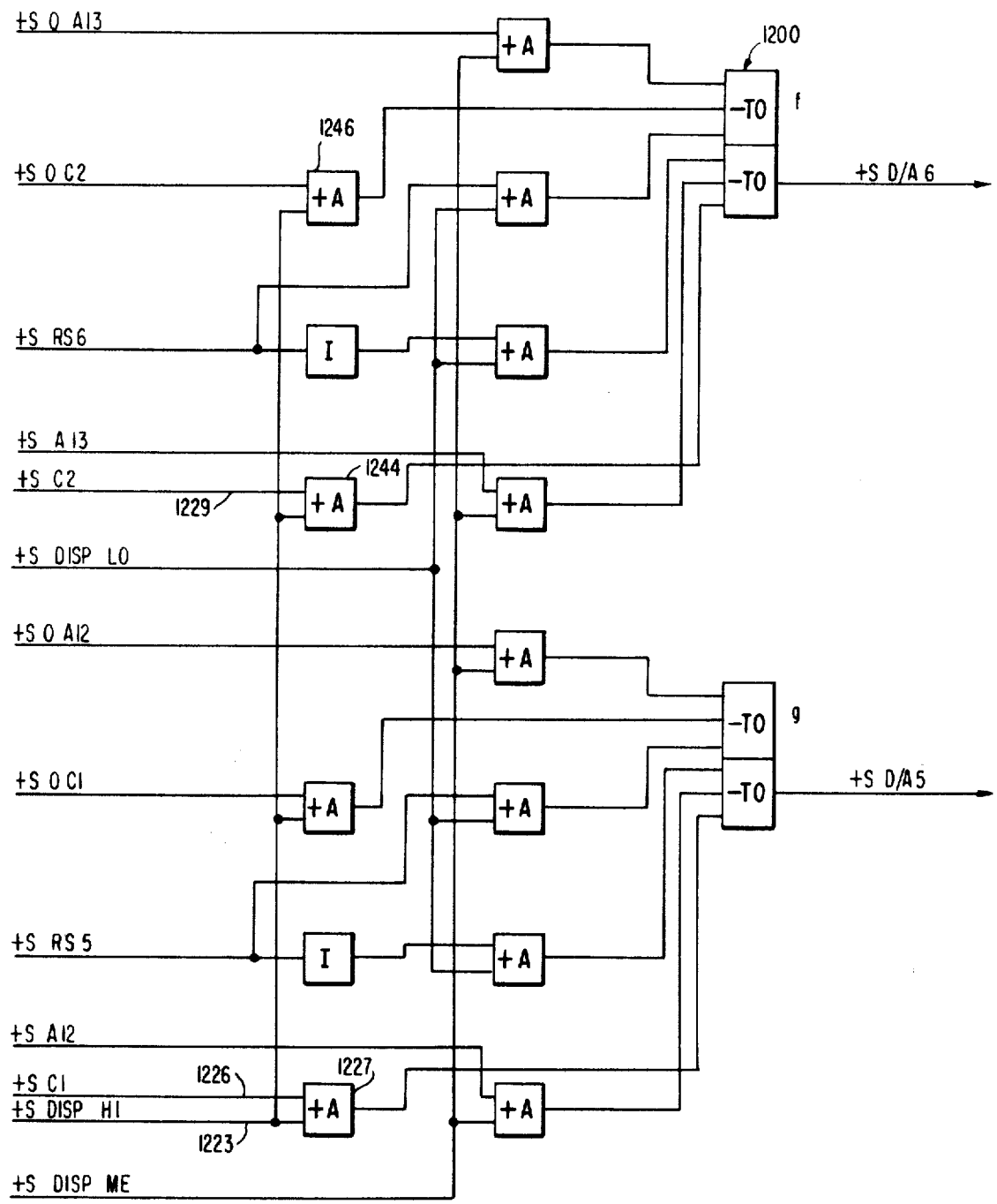
Figure 12D:
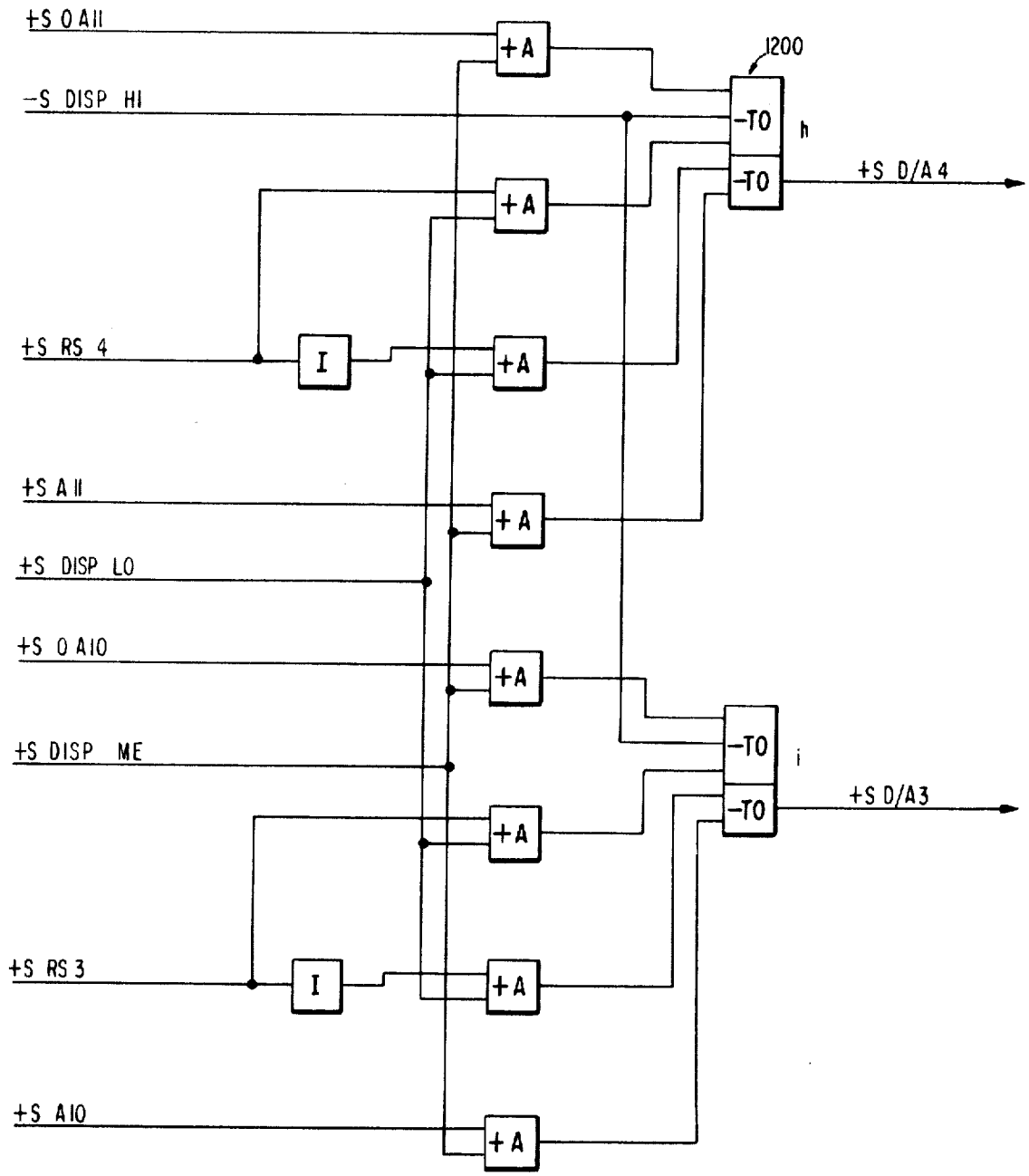

The logic circuits for controlling the deflection register are shown in FIGS. 12A–E. At the top of FIG. 12A is shown the +S DISP LO input, which is inverted at 1202 to switch latch 1200a off, causing a —S SPACE UP signal, which will inhibit the space up stage of the D/A converter.

At the next level down, the +S DISP LO signal primes AND circuit 1206, which is also primed by the +S NON OVERLAP signal and will respond to the +SRS10 input, if present, to switch latch 1200b off, generating a —SD/A10 output from this stage of the deflection register. The reason for this effect is that the +SRS10 input reflects a 0 in the main buffer, since the input from the main buffer bit position to the range switch is from the 0 side. If the input on lead 1207 had been a —S level, the +S output from inverter 1220 would have combined with the +S NON OVERLAP pulse on 1209 and the +S pulse on lead 1201 to switch AND gate 1210. This would result in switching latch 1200b on, producing a +SD/A10 output. In the D/A converter the corresponding transistor would be cut off and the beam deflected by one unit.

Figure 12E:
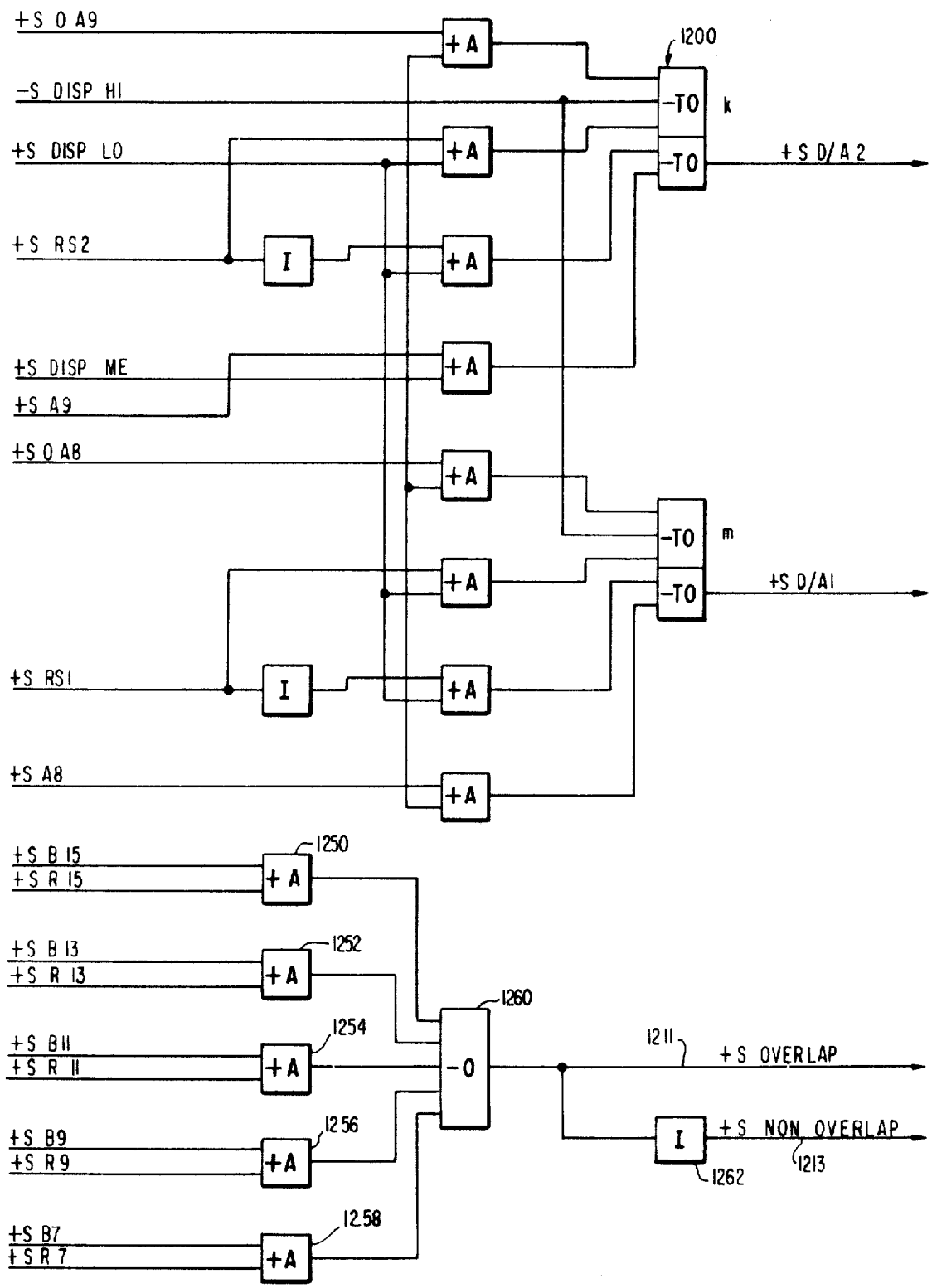

The +S NON OVERLAP signal is generated in the circuit at the bottom of FIG. 12E. A series of AND gates 1250, 1252, 1254, 1256, 1258 compares inputs from respective bit positions of the base register and the range switch +SR7 . . . R15. One of the latter outputs will be at +S, as a result of the range switch setting. If the corresponding B input is also at +S the related AND circuit 1250 . . . 1258 will be switched, causing OR gate 1260 to produce a +S overlap signal on lead 1211. It will be recalled that this condition is known as the overlap condition, as described in the section of the specification under the heading "OVERLAP." If there is no agreement in any of the five AND gates the +S non overlap output will be generated on lead 1213 from inverter 1262.

A +S overlap input on lead 1211 in FIG. 12A will prepare AND circuits 1208 and 1212 instead of AND circuits 1206 and 1210, so that the effect of the range switch inputs on lead 1206 will be the inverse of that described for the non overlap input on lead 1209.

At the lower portion of FIG. 12A there is shown a group of circuits equating the +SRS9 input on lead 1213 with the +SA16 input on lead 1217. Recalling that the +SRS9 input indicates a 0 in the main buffer, in the position connected by the range switch with the RS9 output, it will be seen that a —S input on lead 1213, signifying a 1, will be inverted by inverter 1222 to switch AND gate 1214. the output of which will switch latch 1200c on and produce the +SD/A9 output, AND gate 1214 being conditioned by the +S signal on lead 1201. Similarly, a +S signal on lead 1217, in combination with a +S DISP ME input on lead 1203, will switch AND gate 1218 and latch 1200c to produce the +SD/A9 output. It will be observed that the +S DISP MED on lead 1203 is inverted by 1204 and switches the latch 1200a on and latch 1200b off. This combination, together with the control of latches 1200c through *m* by bits directly from the main buffer, will produce a range of possible deflection one-half of that corresponding to the DISP LO control signal, and positioned slightly more than halfway up the CRT screen.

The —S DISP HI input on lead 1205 has certain direct effects on some of the latches 1200. It will switch the SPACE UP latch 1200a and the D/A10 latch 1200b on, but will switch off the latch 1200c. Similarly, on lead 1219 (FIG. 12b), it will switch on latch 1200d, producing the +SD/A8 output. Likewise, a +SC3 input on lead 1221, combined with the +S DISP HI pulse on lead 1223, will switch AND gate 1232 and shift latch 1200e to the on position, producing the +SD/A7 output, to identify channel 3. The source of this channel identifying signal will be explained later. Conversely if the input relating to channel 3 is a +SOC3, the output from 1200e will be at —S. The remaining controls for the deflection register are believed to be evident from inspection of the figures, in the light of the foregoing description.

HORIZONTAL DEFLECTION

The horizontal deflection of the beam is caused by a horizontal counter, which normally stands in a reset condition, holding the beam at one end of the sweep. The sweep is started by admitting a series of pulses to the counter, which causes it to advance step by step to drive the horizontal D/A converter and thereby advance the position of the beam to the right or to the left, according to the type of operation, as will be described.

Figure 16:
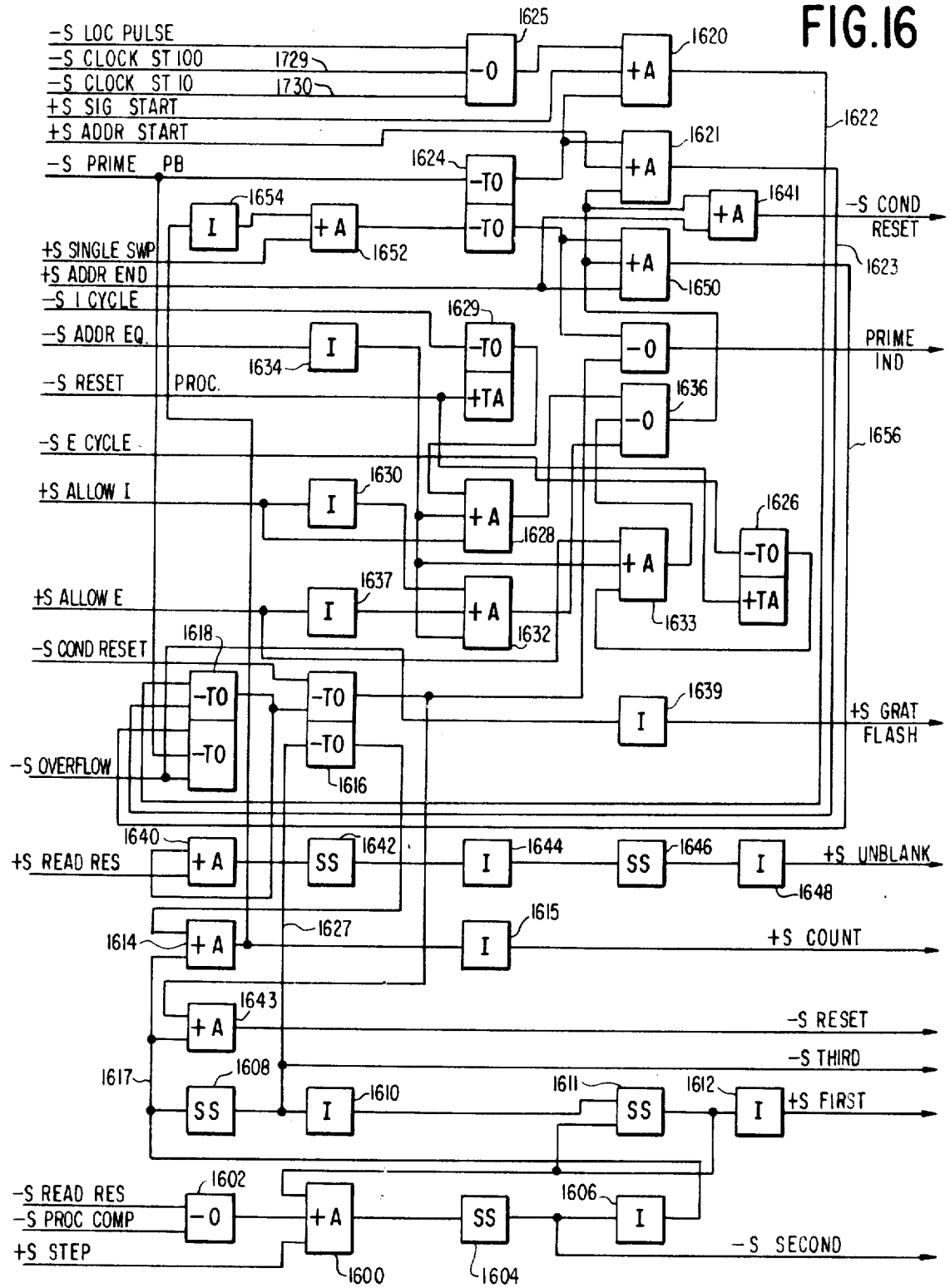
FIG. 16 is a block diagram of the sweep and unblank control circuits.
Figure 17:
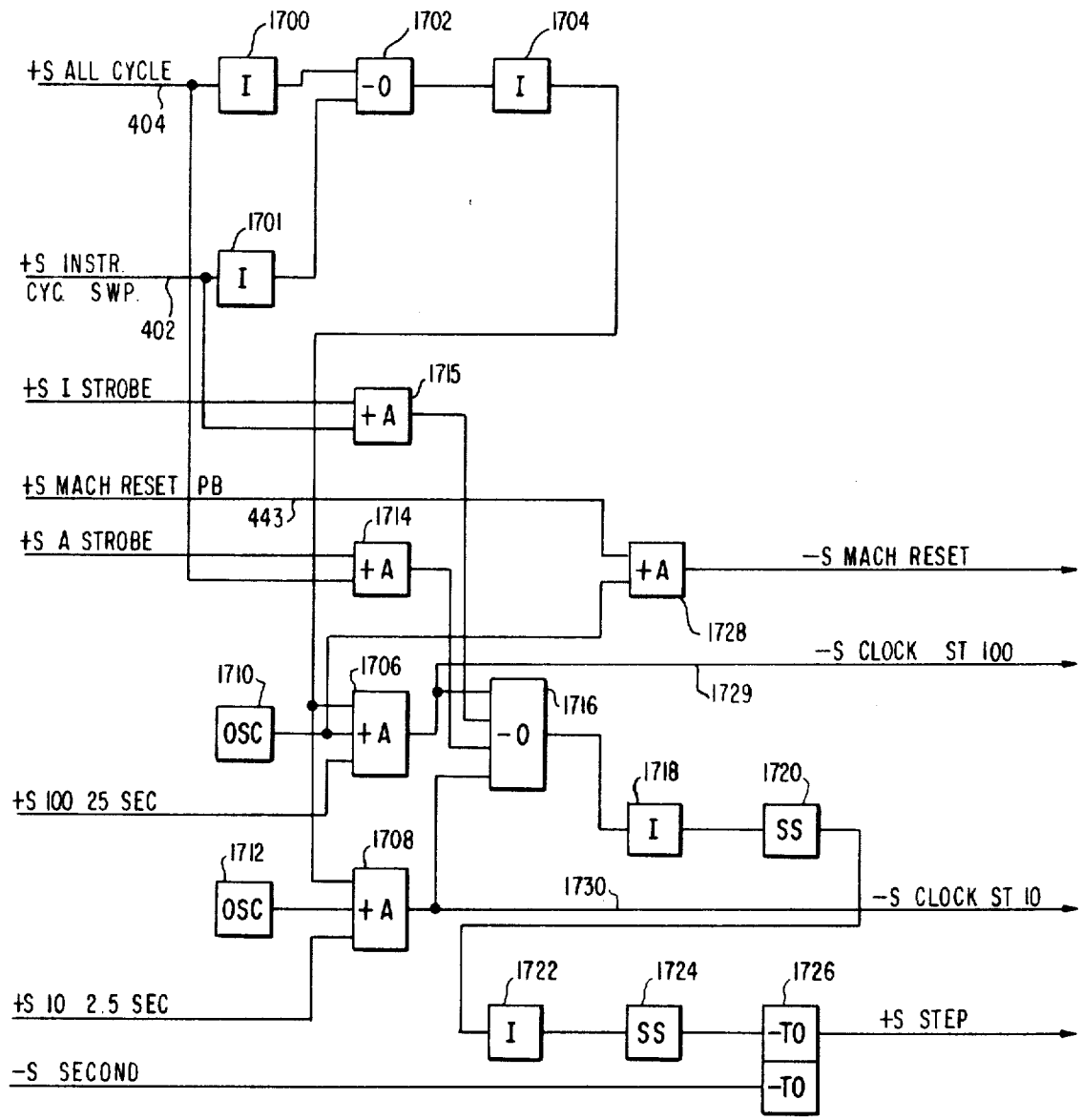
FIG. 17 is a block diagram of the sweep timing control circuit.

The initiation of the sweep is prepared by a circuit shown in FIG. 17, acting upon a circuit shown at the bottom of FIG. 16, which actually generates the counter step timing pulses. For the present it can be assumed that the initial preparation for a sweep begins with the switching on of a latch 1726 (FIG. 17) which had previously been switched off by a —S SECOND pulse, the origin of which will be explained presently. The switching on of the latch 1726 is the result of some selected strobe, as will be described later.

A +S STEP output from latch 1726 is applied to an AND circuit 1600 (FIG. 16), which does not switch immediately, but a little later, in response to a —S READ RES pulse applied to OR switch 1602 (FIG. 22, line $f$). The timing occurs in the following manner: Assume, for the present, the upper input of AND gate 1600 to be at +S. At the beginning of a processing cycle —S READ RES is at +S and —S PROC COMP (line $e$) goes to +S. This condition still exists when +S STEP arrives, so the output of AND gate 1600 remains at +S. The arrival of the —S READ RES removes the remaining inhibition of AND gate 1600, which generates a —S output, triggering SS 1604 (FIG. 22, line $g$) and thus initiating a series of timing pulses controlling sweep start and counter stepping. The output of SS 1604 appears as a —S SECOND pulse which switches off latch 1726, terminating the +S STEP pulse. Latch 1726 has to be switched on again preparatory to each step timing pulse sequence.

The output of SS 1604 is inverted at 1606 and appears as a +S input to AND gate 1614. The —S output of gate 1614 is inverted at 1615 to produce a +S COUNT pulse (FIG. 22, line $h$), which is the first of a series of counter stepping pulses. The trailing edge of the pulse from inverter 1606 triggers SS 1608, generating a —S THIRD pulse (FIG. 22, line $m$). The output of SS 1608 is inverted at 1610 and the trailing edge from the pulse from 1610 triggers SS1611, the output of which is inverted at 1612 to produce a +S FIRST pulse (FIG. 22, line $n$). The action of these last three pulses upon the horizontal counter will now be described.

THE HORIZONTAL COUNTER

The horizontal counter consists of a series of 23 stages, of which only stages 1-4, 5, 8 and 23, plus carry conjunction circuits, are shown. The counter is driven by a series of stepping pulses, +S COUNT, —S THIRD, and +S FIRST, derived from the counter step timing pulse circuits described just above.

The counter is divided into groups of stages, namely, five groups of four stages each and a sixth group of three stages. Each stage comprises (FIG. 18A) two latches CI (CARRY INDICATOR) and CV (COUNTER VALUE). These latches may be of conventional form and have the characteristic that each is composed of a pair of sections, the sections being cross-coupled in such a way that when one section is ON, that is, conductive, the other section is OFF. The CI triggers are considered to be at 0 when the upper section is conducting and its output is at +S; while the CV triggers are considered to be at 0 when the upper section is not conducting so that the output of the lower section is at +S.

The explanation of the operation of the circuit will start with a —S RESET pulse, which has the same time in the processing cycle as the COUNT pulse and performs the function of turning off all CV latches. The RESET pulse is followed by a —S THIRD pulse, which turns off any of the CI triggers which are on. The +S FIRST pulse which follows, is applied to all of the AND gates of the vertical series 1800, which are at this time inhibited by the outputs of the corresponding OR circuits 1802, which outputs are at —S because the latches CV have been reset. The pulse is therefore ineffective on this cycle. (The second input to OR circuits 1802 is normally at +S, as will be explained later.)

On the next processing cycle the RESET pulse is replaced by the first +S COUNT pulse, which is applied to each of the AND gates of the vertical series 1804$a$ and 1804$b$ AND gates, being coupled to the outputs of the upper and lower sections, respectively, of their related CI latches, are primed in complentary mode. At stage 1 the first COUNT pulse finds the AND gate 1804$a$ with a +S condition on its other input terminal because of the 0 in the CI latch, therefore the AND gate issues a —S pulse to the upper section of the stage I CV latch. The output of the lower section of this latch changes to —S, which is inverted by OR circuit 1802, the output of which issues a +S CNT 1 signal.

The THIRD pulse, which follows the first COUNT pulse, has no effect during this processing cycle because the CI latches are all at 0 already. However, the +S FIRST pulse finds the stage 1 AND GATE 1800 primed, through lead 1806, by a +S output from OR gate 1802 and a —S pulse is transmitted from it to the input of the lower section of the CI latch of stage 1, turning this latch to the 1 condition. (The lead 1806 also applies the +S level to AND circuits 1800 of stages 2, 3, and 4, but these AND circuits are inhibited by —S inputs on other leads to be referred to.) This applies a +S level to one input of AND gate 1804$b$ of stage 1 and AND gate 1804$a$ of stage 2; also it applies —S to 1st stage AND 1804$a$ The second COUNT pulse causes a —S pulse to be issued from 1st stage 1804$a$, switching CV to 0 and removing the +S condition from the +S CNT 1 terminal. The second COUNT pulse also causes the 1804$a$ AND gate of stage 2 to issue a —S pulse to the upper section of 2nd stage CV latch, switching this latch to the 1 condition. The —S output from its lower section is inverted by 2nd stage OR circuit 1802 and appears as a +S CNT 2 pulse. The +S condition is also transmitted through lead 1808 to AND gate 1800 of stages 2, 3, and 4. The following THIRD pulse switches off the 1st stage CI latch. The FIRST pulse which follows finds AND gates 1800 of all of stages 1-4 inhibited by the 0 condition of the 1st stage CV latch; therefore, no —S pulse is transmitted to the lower section of latch CI of any of stages 1-4.

The third +S COUNT pulse sets a 1 in the 1st stage CV latch, thus establishing a +S CNT 1, in addition to the already standing +S CNT 2. Also, the 1 condition of the 1st stage CV latch places a +S on lead 1806, so that the AND gate 1800 of both stages 1 and 2 are primed, while those of stages 3 and 4 are still inhibited by —S levels on other inputs. The THIRD pulse has no effect, since the CI latches of both stages 1 and 2 are already at 0, but the following FIRST pulse gated by the AND gate 1800 of both stages 1 and 2, switches the CI latches of each of these stages to the 1 condition, the lower latch placing a +S level on AND gate 1804A of stage 3. The following fourth COUNT pulse thus switches off the CV latches of stages 1 and 2 and switches on the stage 3 CV latch.

The counting continues in a similar way until, as a result of the seventh COUNT pulse CV latches of stages 1, 2 and 3 are all switched to the 1 state, placing +S on leads 1806, 1808, and 1810. At this time the following FIRST pulse will turn on the CI latches of stages 1, 2, and 3. Then the EIGHTH COUNT pulse will turn on the CV latch of stage 4 and turn off the CV latches of stages 1, 2 and 3.

Similarly, after the fifteenth COUNT pulse the CV latches of stages 1-4 will all be on and +S will appear on the 1806, 1808, 1810 and 1812. The fifteenth FIRST pulse will then turn on the CI latches of stages 1-4 and the sixteenth COUNT pulse will thus turn on the CV latch of stage 5 and turn off the CV latches of stages 1-4.

Carry Conjunction Circuits. In order to reduce the inputs to the AND gates 1800 the +S CNT outputs are combined in a carry conjunction circuit shown in FIG. 18*b*. For example, +S CNT 1 to +S CNT 4 are applied to AND gate 1814, which is strobed by the +S FIRST pulse. The output of AND gate 1814 goes to one input of inverter 1816. So long as any one of the +S CNT inputs to AND gate 1814 is at —S the output of this AND gate will be at +S and the output of inverter 1816 will remain at the —S level in spite of the +S FIRST pulse. When all four CNT inputs are +S the output of AND gate 1814 will go to minus when strobed by the +S FIRST pulse and the inverter 1816 output will therefore be +S at this time, signifying a carry 1–4. The carry 1–4 lead 1818 goes to AND gate 1800 of stages 5–8. Thus this single lead takes care of the carry 1–4 condition for stages 5–8. In other respects the carry circuitry of this group is in the same pattern as that of the group of stages 1–4.

AND circuit 1819 receives inputs from +S CNT 1 to +S CNT 8 and is associated with inverter 1820 in the same way as AND gate 1814 inverter 1816 are related. Inverter 1820 produces a +S CARRY 1–8 signal. This signal is applied to AND gates 1822 and 1824, which issue, through inverters 1826 and 1828, +S carry 1–12 and +S carry 1–16 outputs, respectively. The inverters 1826 and 1828 are necessary because of the interposition of AND gates 1822 and 1824 following AND gate 1820. Leads 1830, 1832, and 1834 conduct the +S carry 1–8, +S carry 1–12, and +S carry 1–16, respectively, to AND gates 1800 of the groups of stages 9–12, 13–16, and 17–20, respectively. These groups of stages are not shown in the drawing.

Finally, stage 23 of the counter is shown at the top of FIG. 18*b*. This includes the CI and CV latches, the AND gates 1840*a* and 1804*b*, and at AND gate of the series 1800. The latter AND gate receives an input on lead 1834 for the +S carry 1–16, an input on lead 1844 derived from AND gate 1840 through inverter 1842, which conveys a +S carry 17–20 signal, an input on lead 1846 from the CV latch of stage 22 (not shown), and an input on lead 1848, from the CV latch of stage 21 (not shown). The leads 1834 and 1844 are also shown extending up toward the stages 22 and 21. The final input of AND gate 1800 of stage 23 is from the CV latch of that stage, which, after the appropriate number of COUNT pulses, issues a +S CNT 23 signal and applies +S to AND gate 1800 on lead 1850. A —S overflow signal issues from AND gate 1800 of stage 23 only when all of the +S inputs on leads 1834, 1844, 1846, 1848 and 1850 are at +S, which will occur, of course, at the count of $2^{23}-1$.

Scaling Adjustment of Horizontal Counter. The sweep speed switch 54 (FIGS. 3 and 4) has a provision in its section 54*a* for modifying the scaling factor of the horizontal counter. Segment 460, in the position shown in FIG. 4, grounds all of input terminals 1–5 of the switch section 54*a*, thus placing a +S level on each of the corresponding outputs labeled —S STAGE 3, —S STAGE 5 . . . —S STAGE 9. These leads appear as inputs to the lower sections of certain pairs of CI latches, in the following pattern: the —S STAGE 3 input goes to CI latches of stages 1 and 2; the —S STAGE 5 inputs goes to the CI latches of stages 3 and 4, etc. In the normal setting of the switch 54, with +S on all of these inputs, they have no effect on the operation of the horizontal counter. However, as the switch is moved step-by-step clockwise successive terminals 1, 2, 3, 4, 5 of the section 54*a* of the switch are disconnected from ground and assume the —S voltage level. This has the effect of maintaining the corresponding CI latches on the ON condition; it therefore removes them from the counting, because the lowest order of the counter to respond to the first COUNT pulse following reset is the one next above the highest stage which is forced to the 1 state. Thus, with the switch 54 set to position 2 and stages 1 and 2 of the horizontal counter forced to the 1 condition, the counter will have a capacity of $2^{21}$, instead of $2^{23}$.

In the lower stages of the counter, the only use of the CNT outputs is to prime the AND gates 1800 of higher stages or to prime the counter carry conjunction circuits.

The input on FIG. 18A, —S STAGE 3, also goes to the two OR circuits 1802 of stages 1 and 2, to maintain continuously the +S CNT 1 and +S CNT 2 outputs for this purpose. The —S STAGE 5, etc. inputs have a similar effect on the next lower pairs of stages. In the higher stages, two outputs are required, one for the counter carry conjunction circuits, and one for the horizontal D/A converter. This can be of significance if the adjustment of the sweep speed switch 54, which may include additional positions beyond the five shown in the drawing, is in such a setting as to prevent an actual counting output on a lead connected to the horizontal D/A converter. In this case, the output of each stage, which is unused for counting and which goes to a D/A stage is held at 0. This output is taken directly from CV and assures a fixed starting position of the sweep regardless of the sweep speed switch setting. The second output, which is known as CNT 17LA, for example, must be 1, and is derived from the OR circuit 1802 in the manner described for stages 1 through 8.

Referring to FIG. 4, switch 54 is shown to have two sections, 54*a* and 54*b*. For positions 1 and 2 lead 460 goes to gate 1706 (FIG. 17) controlling the use of oscillator 1710. In section 54*a* the terminals are selectively shunted to ground (+S) by segment 460, as the sweep speed switch is moved clockwise. When the switch is moved from position 1 to position 2 lead 461 transmits the —S STAGE 3 output to the bottom section of the stage 1 and 2 CI latches of the horizontal counter (FIG. 18), thereby scaling the counter to a higher cycling rate. This has the effect of changing the sweep time 100 seconds to 25 seconds, in other words, changing it by a factor of 4, with the use of the same oscillator source. In a similar way a further step of the switch places —S level on lead 462, eliminating stages 3 and 4 from the horizontal counter and enabling AND circuit 1708, effectively substituting the second oscillator 1712 for 1710 as the source of timing pulses. A further step effects a change of the cycling rate once more by a factor of 4, between the third and fourth positions of the switch providing sweeps of 10 and 2½ seconds.

HORIZONTAL D/A CONVERTER

The horizontal D/A converter, FIG. 20, is similar to the vertical D/A converter previously described. In the RESET condition of the horizontal counter, through gating circuits shown in FIG. 19, to be described presently, the inputs at the left of the horizontal D/A converter are all at a fixed value. This fixed value establishes a starting point for the sweep, which is different depending upon which mode of photography is to be used. For still photographs the CRT beam is set to the extreme right position when the counter is in the reset condition, in preparation for a sweep to the left. Because of an inversion in the camera system, the resulting still photograph shows time increasing from left to right.

In moving film photography, the reset position of the beam is at the center of the CRT, and sweeps to the right for a distance one-quarter of that for still photography. The purpose of this arrangement will be discussed in connection with the description of a moving film method of operation. For still photography, on switching to a 1 of any CV latch of the horizontal counter which is coupled to the D/A converter the corresponding +S CNT output is applied to the related transistor circuit of the horizontal D/A converter, producing a step to the left. For moving film photography, the 0 output of each CV latch is coupled to the D/A stage. Because of the progressive operation of the horizontal counter the steps will all be of equal magnitude.

Certain ones of the +S CNT outputs of the horizontal counter are addressed to the horizontal D/A converter, by way of gates shown in FIG. 19 and indicated by block 46 in FIG. 1 as the SIZE-DIR.-SW (size-direction switch).

In FIG. 19 a vertical column of AND gates 1900 are controlled by a +S STILL PHOTO signal delivered by switch 450 (FIG. 4) in its right hand position. When this signal is present the stages of the horizontal D/A converter are coupled in regular order with stages 23–12 of the horizontal counter. In each stage the coupling is through an OR circuit 1904, except at D/A11, where it is through an inverter 1906. In this setting any +S signal from a counter stage corresponds to a 1 and places a +S on the input to the horizontal D/A converter, to deflect the beam proportionally to the ordinal value of that stage of the D/A converter. When switch 450 is shifted to the left the +S MOV PHOTO signal is effective in the circuits of FIG. 19, to control the coupling of the horizontal counter with the D/A converter. This signal primes a column of AND gates 1902 pertaining to the orders of the D/A converter from 1 to 10 and, through OR circuit 1904 and inverter 1906 establishes certain static conditions on stages 12 and 11 of the converter. As seen in FIG. 18B stage 23 of the horizontal counter has, in addition to its +S CNT 23 output, a +S CNT 023 output, taken from the lower section of the corresponding CV latch. The same 0 output is provided in each of stages 14–22 also. It is these 0 outputs of the counter stages which are connected to the AND gates of column 1902, the 023 output being thereby coupled, through OR gate 1904, to stage 10 of the D/A converter. Corresponding connections are continued through the series, down to that of CNT 014, which is connected to D/A 1. Furthermore, a continuous +S level is applied to converter stage 12 through inverter 1908 and OR gate 1904, while a continuous —S level is delivered to stage 11 of the D/A converter through inverter 1906.

The effect of taking the 024 through 014 outputs is to make the beam move in the reverse direction, and the effect of removing the counter output in stages 12 and 11 of the D/A converter is to reduce the sweep to one-quarter size. The fixed bias on these two stages positions the sweep near the center of the CRT.

One other item to be mentioned in connection with FIG. 19 is the horizontal counter indicator lamp circuitry. The lamps of the group 462 in FIGS. 3 and 4, numbered 12, 11 . . . 1, are connected through transistor drivers (not shown) to corresponding +S CNT 023, 022–012 inputs from the horizontal counter at one end and to —S voltage at the other. As a result of this coupling, in the reset position of the counter they are all turned off, but are turned on as the stepping of the counter progresses.

SWEEP CONTROL

Sweep start and sweep end are controlled by the circuits shown in FIGS. 16 and 17, as affected by inputs from the panel switches, shown in FIG. 4. Any one of several different kinds of pulses can be used for stepping the horizontal counter. The examples illustrated are an I strobe, which is a strobe produced by the computer on each instruction cycle, an ALL CYCLE strobe, which is a strobe produced at each machine cycle of the computer, or one of several different rates of clock pulses, two of which are illustrated in the drawing. As seen in FIG. 4, switch 406 can be set to any of three positions. In the right hand position it causes stepping in response to instruction strobes, in the left hand position, in response to ALL CYCLES strobes, in the central position, in response to clock pulses. With the left hand setting of switch 406, a +S ALL CYC SWP output is issued on line 404 and appears in FIG. 17 as an input to an inverter 1700. With the switch in the right hand position a +S INSTR SWP output issues on line 402 and is applied in FIG. 17 to inverter 1701. A-S output from either inverter 1700 and 1701 switches OR 1702, the output of which is inverter at 1704 and applied to two AND circuits 1706 and 1708, inhibiting any pulses from oscillators 1710 or 1712. The +S level on line 404 or 402 is applied to an AND gate 1714 or 1715, respectively, priming either of these circuits for transmission of an A strobe (ALL CYCLE) or an I strobe, to switch OR circuit 1716. The +S output of circuit 1716 is inverted at 1718, to trigger a single shot 1720, the pulse from which is shown at line e of FIG. 23 as being initiated by an I strobe, line d. The trailing end of the pulse from SS 1720, inverted at 1722, triggers a single shot 1724. The leading edge of this last pulse switches a latch 1726, assumed to have been standing in the OFF position as a result of a previous —S second pulse to its lower section, which was referred to earlier. The latch issues from its upper section a +S step pulse, which controls the processing cycle in which a sweep is to start.

If the switch 406 had been set to the T position the AND gates 1706 and 1708 would not have been inhibited by the output of inverter 1704. Thus a +S100 25 SEC input from switch 54B of FIG. 4, in either position 1 or 2; or a +S10 2.5 SEC input from switch 54B in either of positions 3 or 4, would prime the AND circuit 1706, or 1708, respectively, for response to an oscillator 1710, or 1712. AND circuit 1706 produces —S clock strobes on line 1728, labeled "—S CLOCK ST100." AND circuit 1708 generates clock strobes on line 1730 labeled "—S CLOCK ST10." Each clock strobe of either of these lines switches OR circuit 1716, initiating a timing pulse sequence to switch the step latch 1726.

It was mentioned that if the upper input of AND circuit 1640 (FIG. 16) is at +S, a +S READ RES pulse will initiate a timed sequence leading to the UNBLANK signal. The condition of the upper input of AND circuit 1640 is determined by the state of a display latch 1618. This latch can be switched off by, for example, a —S PRIME PB pulse initiated by depression of the prime pushbutton switch 432 of FIG. 4. In the off condition of latch 1618 the output from its upper section is at —S and inhibits AND circuit 1640.

Associated with the display latch 1618 is a sweep start latch 1616, which is switched off by the —S output from latch 1618. A +S level from its upper section pimes AND circuit 1643, so that any counter step timing pulse issuing from SS 1604 will cause a —S RESET pulse, resetting the horizontal counter, or maintaining it in the reset condition. A —S output from the lower section of sweep start latch 1616 inhibits AND circuit 1614, preventing any +S count pulse from being generated through inverter 1615 while the latch 1616 is off.

The sweep can be started by any one of various control means shown in the upper part of FIG. 16. Through either of two AND gates 1620 or 1621, an output may go on lead 1622 or 1623 to the upper section of display latch 1618, to turn it on. Both AND gates 1620 and 1621 are partially prepared by a +S signal from the upper section of a latch 1624, which, if it is in off condition, can be switched on by a —S PRIME PB signal. AND gate 1620 is further prepared by a +S SIG START signal from switch 420 (FIG. 4), when in its right hand position, to generate a +S level on its lead 1426. The AND gate 1620 can then be switched by an input on any one of the three —S leads, namely, LOC PULSE, CLOCK ST100, or CLOCK ST10. Any one of these will switch OR gate 1625 and generate a —S output from AND gate 1620 on lead 1622. When display latch 1618 is switched on, the output to AND gate 1640 goes to +S and the next +S READ RES pulse after that will initiate the UNBLANK sequence.

Sweep start does not occur immediately on switching of display latch 1618, but is delayed to allow the first spot to be displayed before the counter steps out of the reset position. The same —S READ RES pulse which initiated the UNBLANK sequence also switches OR gate 1602 and produces an output from AND gate 1600, which starts the step timing pulse sequence, at the time of the —S THIRD pulse, which is delayed from the READ RESULT pulse by the amount shown in FIG. 22 at lines f and m. This pulse on lead 1627 switches sweep start 1616 on. AND gate 1614 is primed and AND gate 1642 is inhibited, by the respective outputs of latch 1616. Thus the next step timing pulse to appear on lead 1617 will generate a COUNT pulse from AND gate 1614. Thereafter the counter will continue to step in response to each count pulse, until latch 1618 is switched off, for example in response to a —S overflow pulse from the highest stage of the horizontal counter. On resetting of the counter the sweep start will be initiated again by the same sequence of switching of latches 1618 and 1616, so that each time the first spot of the new sweep will be recorded in horizontal position 0.

If the sweep is to be started by an address start setting, the address may be either an I or an E address. The address is set up on the start address register switches and switch 420 (FIG. 4) is set to its left position, tranmitting a +S ADDR START output to AND gate 1621 (FIG. 16), which will control the sweep start under the conditions of the problem. Another input to this AND gate is from the uppe rsection of a latch 1624, switched on, that is, with a +S level at its upper output, by a —S PRIME PB input from the prime push-button switch 432 of FIG. 4, operation of which initiated the run. The remaining condition for turning on AND gate 1621 is the arrival of the selected address in the main buffer, this address being determined, for example, by the setting of the 14 and 13 bit toggle switches of the start address register 16 to the ON condition and the other switches to the OFF or 0 condition.

Since the computer may be transmitting to the Execution Plotter both I and E addresses, it is generally necessary to filter the addresses in the main buffer so that only the specified address, either I or E, will be operative to start the sweep. However, as will be seen presently, it is possible to adjust the circuit so that either an I or an E address, which matches the start address register setting, will start the sweep. Effective in this control are two latches 1629 and 1626, the former pertaining to I cycles and the later to E cycles. Both of these latches are turned OFF each processing cycle by the —S RESET PROC input from the process timing circuit, FIG. 9. Which one of the latches 1629 or 1626 will be operative to start the sweep depends upon the setting of switch 52 (FIGS. 1 and 4). In the present case assume it is set to the I position, causing a +S ALLOW I input to AND gate 1628. An inverter 1630 produces an inhibiting —S input to AND gate 1632, to be referred to presently.

Figure 15:
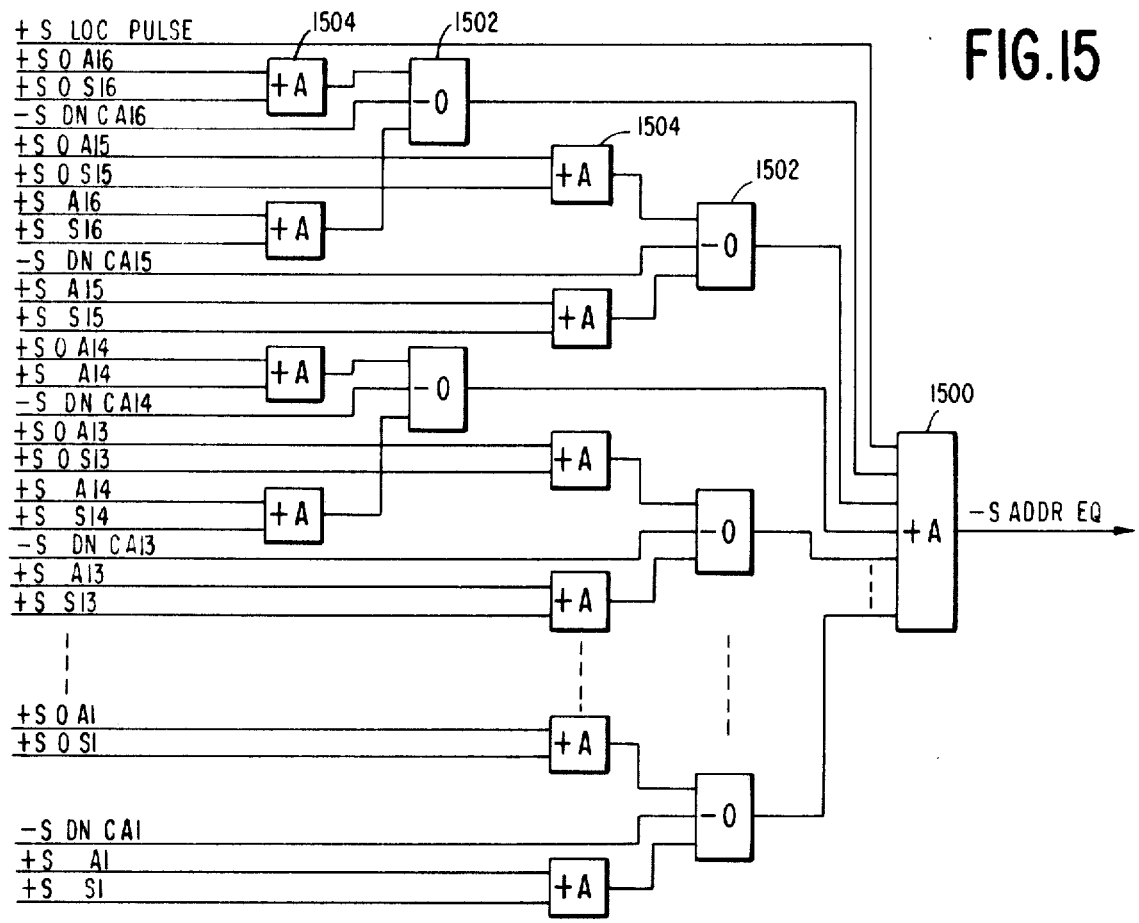
FIG. 15 is an abbreviated block diagram of the start address comparator.

On any I cycle a —S I cycle input will switch latch 1629 ON, applying +S to the second input of AND gate 1628. The third input is the —S ADDR EQ generated by the address comparator 36 (FIG. 1), when the equal condition is found in all bit positions, except those in which the address start register is set to the DN CA (don't care) position. As shown in FIG. 15, this decision is made in an AND circuit 1500, which is strobed by a +S LOC PULSE and has inputs from OR circuits 1502. Each of these OR circuits can be directly switched by a —S DN CA input in the related bit position of the start address register, or by agreement in AND circuits 1504 pertaining to each bit position, when both the main buffer and the start address register have either a 1 or a 0 in the particular bit position.

When the —S ADDR EQ SIGNAL arrives, it is inverted at 1634 to apply +S to AND circuit 1628 and AND circuit 1632. In this case only AND circuit 1628 responds, transmitting a —S pulse to OR circuit 1636, which applies +S to AND gate 1621. This switches the AND gate and transmits through lead 1623 a —S pulse delivered to the upper section of latch 1618.

Before the arrival of the I strobe which preceded with the address equal signal, the strobe gate had been responding to all strobes from the computer separated by more than the minimum time required for a single process timing cycle and generating a new timing cycle for each such strobe, as shown at line c (FIG. 21). However, referring to FIG. 16, the —S PRIME PB pulse which started the operation of the Execution Plotter was delivered to the bottom section of the display control latch 1618, turning that latch off and generating from its output at the upper stage a —S level to inhibit AND gate 1640, thereby blocking any display, as will be explained presently. The same —S pulse from latch 1618 turned off sweep-on latch 1616. A +S output from the upper section of latch 1616 primes AND gate 1642, which will insure that, for the present, any pulse from SS 1604 (FIG. 22, line g) through inverter 1606, on lead 1616, will generate from AND gate 1642 a —S RESET pulse, maintaining the horizontal counter reset. A complementary output from the lower section of latch 1616 to AND gate 1614 inhibits +S COUNT pulses.

DISPLAY OF FIRST POINT OF PROGRAM

The arrival of the —S display pulse on lead 1623 to switch display latch 1618 ON places +S on the upper input of AND gate 1640. The +S READ RES pulse generated during the first process timing cycle in which the start address was found, triggers SS 1642 (FIG. 23, line b) thus starting a delay during which the vertical D/A converter is settling into its new value. At the same time the horizontal counter may be being reset and the horizontal D/A settling to a new value. At the end of the pulse from SS1642 the inverted output from circuit 1644 triggers SS 1646 (FIG. 23, line c), which generates from inverter 1648 +S UNBLANK pulse.

At the end of the delay pulse from SS 1604 (FIG. 22, line g) 1608 is triggered, generating the —S THIRD pulse and switching sweep-start latch 1616 on. The outputs from its upper and lower sections inhibit AND gate 1642 and prime AND gate 1614, respectively. On the next cycle of the step pulse timing circuit a +S count pulse will be delivered, rather than a —S reset pulse. The first step of the horizontal counter was delayed, in order to display the first program step at the 0 position of the sweep. Following each additional strobe of whatever type is being used to prepare a sweep step, the horizontal counter will be stepped until some condition occurs to terminate the sweep which is in progress. This may result from an overflow signal from the horizontal counter, from an address end signal, or from a —S PRIME PB signal, any of which will switch off latch 1618 and thereby latch 1616.

The termination of the sweep in response to an address end signal may be effected by a —S COND RESET from AND gate 1641. This occurs whenever a signal issues from OR gate 1636, indicating a match between the address in the main buffer and the address setup on the start address register. The —S COND RESET pulse goes directly to the upper section of latch 1616 and turns it off, without affecting latch 1618. The next pulse on lead 1617 then resets the horizontal counter, following which latch 1616 is reset and a new sweep started by the next count pulse.

If both switches 418 and 422 are set to the left position the sweep will stop for an indefinite time when the address set in the start address register is recognized in the main buffer. The +S SINGLE SWP output from switch 422 appears as an input to AND gate 1652, preparing that gate for response to the first count pulse to issue from AND gate 1614 after the sweep start. This pulse is inverted at circuit 1654, switches gate 1652, and resets latch 1624, inhibiting AND gate 1621 and partially enabling AND gate 1650. The latter AND gate is switched in response to the next signal issuing from OR gate 1636, when the same address which started the sweep reappears. The output of AND gate 1650 is carried by lead 1656 to switch off display latch 1618. Since, with this set up on the panel, there is nothing to restart the sweep until the PRIME push button is operated once more the display terminates.

It is evident that an E address could have been used instead of an I address to start the sweep. Switch 52 would have been placed in the right hand position generating the +S ALLOW E input on FIG. 16, to prime AND gate 1633 and inhibit AND gate 1632. A —S E CYCLE input would then switch latch 1626, further preparing AND circuit 1633, so that it would respond to the —S ADDR EQ input through inverter 1634, to switch OR gate 1636, producing through AND gate 1626 the —S level on lead 1623 to switch on display latch 1618.

If switch 52 is set in the neutral position, I or E, AND gate 1632 is prepared by +S outputs through inverters 1630 and 1637, and responds to the —S ADDR EQ pulse to switch OR gate 1636.

CONCURRENT CHANNEL DISPLAY

If a display control toggle switch of the group 50 is set to the neutral (center) position and its corresponding strobe is received (see line b, FIG. 21), latch 1000, which was reset off by the —S RESET PROC pulse, will remain off and the DISP HI signal will be generated, showing a channel sample. The differential deflection for the channel display is provided by three latches 1400, 1402, and 1404 in FIG. 14. The upper two latches identify the particular channel which is being sampled, while the lower latch designates the on or off status of the channel sampled. Reference to FIGS. 2A and 2B will show, in the upper section, displays of the three channels A, B, and C. Channel A is continuous, showing that it was not on at any time when it was sampled. Channel B shows, in FIG. 2A, two portions elevated above the main line of the channel B trace, indicating that the channel was on during the sampling times extending between the extremities of the raised portions of the trace. Channel C illustrates a larger number of raised sections, indicating the time during which the channel was on when sampled.

All three latches, 1400, 1402, and 1404, are reset to the off position by a +S RESET PROC input, converted to a —S by inverter 1406, which is applied to the upper section of each of the latches. Latch 1400 is turned on by the combination of a +S SAMPLE CH C input to an AND gate 1408 and a +S INPUT GATE from the process timing circuit. Similarly, latch 1402 is turned on by a +S SAMPLE CH B pulse applied to AND gate 1410, which is likewise strobed by a +S INPUT GATE. If AND gate 1400 is switched on a +S C3 output from its bottom section goes on line 1221 to AND gate 1232 (FIG. 12B), where it is combined with the +S DISP HI input on line 1223 to switch latch 1200e on and generate a + SD/A7 output. If the latch 1400 is not switched on the +S0C3 output on line 1225 to AND gate 1234 generates a signal to switch latch 1200e off, eliminating the +SD/A7 output to the vertical D/A converter. The combination of +S SPACE UP, D/A10, and D/A7 will, by themselves, produce a vertical deflection to the lower off level of channel C in FIG. 2A. This may be combined with a +SD/A5 signal to generate the deflection to the upper on level of channel C. The last mentioned input may be generated from latch 1404. AND gate 1416, if it receives inputs from +S CHAN C SEL, and +S SAMPLE CH C, in addition to the +S INPUT GATE will generate an output to switch latch 1404 on, causing it to produce the +SC1 on lead 1226. This, combined with a +S DISP HI input on line 1223 in FIG. 12C, will switch AND gate 1227, producing a pulse to switch latch 1200g on. This latch will then generate a +SD/A5 signal, which, combined with the +S SPACE UP, D/A10, and D/A7, will produce the vertical deflection to the channel C on level.

In a similar way latch 1402, pertaining to channel B, controls AND gates 1244 and 1246 (FIG. 12C) to generate or inhibit the +SD/A6 output. With latch 1402 on a signal on lead 1229 combines with a +S DIP HI signal on lead 1223 to switch latch 1200f on and generate the +SD/A6 output, deflecting the beam to the off level of channel B in FIG. 2A. If an output from latch 1404 on lead 1226 is added the beam is deflected to the on level of channel B.

If neither the +SD/A6 or 7 signals is present, but only the +S SPACE UP and +SD/A10 inputs to the horizontal D/A converter the beam will be deflected to the off level of channel A in FIG. 2A, as shown by the solid line at that level. If a +SD/A5 input from latch 1404 is added this will lift the beam to the on level of channel A.

CHANNEL SAMPLING RING

The +S SAMPLE CHA B and C inputs to AND gates 1412, 1414, and 1416 are derived from a channel sampling ring (FIG. 10), comprising three latches 1030, 1032, and 1034. These, in turn, are selectively turned on by a series of three AND gates 1036, 1038, and 1040, all strobed by a +S DISP HI pulse on lead 1223, and are selectively turned off by a series of three AND gates 1042, 1044, and 1046, all strobed by a +S pulse on —S DISP HI line 1050, when the +S READ RES pulse which caused the +S DISP HI pulse terminates and the outputs of AND gate 1004 and inverter 1010 revert to their normal condition opposite to that indicated in FIG. 10.

The channel sample ring operates in the following manner: Assume that the ring starts in a condition to be generating a +S SAMPLE CH A output, the other two outputs being at —S. In this condition latch 1030 is on, that it, it is conducting at its lower secion and the other two latches are off. The +S output of latch 1030 is applied to one input of each of AND circuits 1038 and 1046. The upper input of AND gate 1038 is also at +S, because the latch 1034 is off. Now, when a +S DISP HI pulse arrives AND gate 1038 is switched and its —S output turns latch 1032 on, generating the +S SAMPLE CH B output. The same output goes to one input of AND gate 1042, which is switched by the reversal of polarity on the —S DISP HI line at the end of the +S READ RES pulse, to issue a —S output switching latch 1030 off. The next pair of pulses on the strobe lines cause the latch 1034 to be turned on and the +S SAMPLE CH C output to be generated, and the latch 1032 to be turned off. The following pair of pulses will restore a +S SAMPLE CH A output and remove the channel C output.

It is possible for the three latches 1030, 1032, and 1034, to be in an abnormal state when the circuit is first turned on. All of the latches may be off or two or more of them may be on. If they are all off three inputs to AND gate 1048 will all be at +S and its —S output will switch latch 1030 on. If all three latches are on all three AND gates 1042, 1044, and 1046 will be primed and the first +S pulse on the —S DISP HI line will turn them all on. This deprimes all AND gates 1042, 1044, and 1046, and allows the —S output of AND gate 1048, which appears when all of the latches are turned off, to set latch 1030 on, so that +S SAMPLE CH A output is on initially. If latches 1030 and 1032 are both on AND gate 1042 will be primed by the +S output of latch 1032 and the normal +S input on line —S DISP HI will turn off latch 1030. In general, if any two latches are on the logic of the circuit will cause the earlier one of the two to be turned off.

The effect of the channel sample ring is to sample the channels in sequence on successive DISP HI pulses. In this way a record of the status of three channels can be made concurrently with the program pattern.

Wave diagrams a, b, and c in FIG. 21 and g, h, and i in FIG. 23 illustrate a sequence of three processing cycles resulting in three different kinds of display. The first cycle is initiated by an I STROBE, FIG. 21, line a, which produces an input to gate 806 (FIG. 8), as shown by FIG. 21, line c, and an I CYCLE output from inverter 810. At READ RESULT time a +S DISP LO signal issues from AND gate 1006 and inverter 1024 (FIG. 10), as shown by line g in FIG. 23.

The next cycle is initiated by an E STROBE, line *b* of FIG. 21. On this cycle as a result of the setting of the E switch of the group of switches 50 to the neutral position, gate 1014 is not switched and latches 1000 and 1002 remain in the reset position, causing a +S DISP HI signal to issue, as shown by line *h* in FIG. 23.

The third cycle is started by another I STROBE, but this time it is assumed that the address was out of range. The I cycle pulse is again generated and produces an output from AND gate 1016 to switch latch 1000, but the —S ABOVE APEX or —S BELOW BASE signal, because the address was out of range, switches also latch 1002. The READ RESULT pulse therefore switches AND gate 1008 and generates from inverter 1025 a +S DISP MED pulse, as shown by line *i* of FIG. 23.

During the second processing cycle just described the display HI signal would be combined with whatever SAMPLE CHANNEL +S signal is currently in effect, resulting in a recording of the condition of that channel. In successive cycles of the same type, those resulting from an E STROBE in the present case, the three channels will be sampled successively and a concurrent record of the status of all three channels will be made, as shown in FIGS. 2A and B.

The lock-out circuits can be hung up, particularly when the Execution Plotter is first turned on. This condition is indicated by a panel lamp 440 (FIGS. 3 and 4), which is on only during the PROC COMP condition. In this condition latch 802 (FIG. 8) is off, that is, the output of its upper section is at —S. An inverter 830 changes this to a +S, applying voltage to lamp 440, as seen in FIG. 4.

When the process indicator lamp is observed to be continuously off the operator presses the MACH RESET PB switch 61, generating a +S MACH RESET PB output on line 443, which appears as an input to AND circuit 1728 in FIG. 17. The next pulse from oscillator 1710 which strobes AND circuit 1728 will generate a —S MACH RESET pulse, which is applied to single shot 900 (FIG. 9) and initiates a process timing cycle, by-passing the lock-out circuits.

CAMERA TECHNIQUES

In the illustrative embodiment of the invention a Beattie-Coleman Oscillotron was used for the photography. This was modified by cutting a hole in the bottom of the case holding a dichroic mirror and adding a graticule holder and illumination source. With this arrangement the lens of the camera sees the oscilloscope by a reflection in the dichroic mirror and the graticule by transmission through the mirror. The graticule position is adjusted so that it appears to overlie the trace in exactly the same plane. Different graticules are used, depending on the photographic technique.

For still-photography switch 450, FIGS. 3 and 4, is thrown to the position marked POL in FIG. 3, and to the right in FIG. 4, to generate the +S STILL PHOTO output, which primes AND gates of the column 1900 in FIG. 19. In this setting all twelve bits of the horizontal D/A stages are connected to the horizontal counter stages 23–12. The sweep is from right to left on the CRT, and, as previously stated, is inverted in the camera to appear to be from left to right. The graticule is flashed at the end of the sweep, by the —S overflow pulse, which is inverted at 1639 (FIG. 16) to produce the +S GRAT FLASH. The image of the graticule is superimposed on the CRT image.

In the moving film technique, set up by throwing switch 450 to its opposite position, a +S MOV PHOTO signal primes AND gates of the column 902 of FIG. 19, and also supplies the fixed output through OR circuit 1904 and inverter 1906 to stages 12 and 11, respectively, of the horizontal D/A converter.

The moving film technique relies on the film motion to produce a time base. It employs a short-displacement time base in the oscilloscope, parallel to the film motion, and in such a direction as to foreshorten the recorded image along the film. During the sweep retrace time a gap occurs on the film. Because of the discrete nature of the sweep and its ability to retrace within one step, the gap represents zero time and continuous film coverage is obtained.

Because the sweep is precisely timed, the gaps provide accurate markers which are not dependent upon the accuracy of the film motion. Variations in film speed will only affect the interpolated recording between gaps. The gaps also provide a space for recording the graticule and framing for convenience in viewing.

With the moving photo input on FIG. 19, the two high order bits of the horizontal D/A converter are disconnected from the counter and the remaining D/A stages are connected to the high order counter outputs. This provides a sweep of 10 bit precision, but with one-fourth the full length. The polarity of the counter output is also taken oppositely to that used for still-photography, so that the sweep moves from left to right and its image opposes the film motion. The effect of the continuous inputs to the two highest orders of the D/A converters, which are relatively inverted, is not only to shorten the trace to one-quarter of the full length sweep, but to place it in the second quarter of the sweep.

Two vertical lines on the graticule mark the beginning and end of one sweep. If the sweep appears to be precisely between these lines to the eye, the recording on the moving film will be precisely outside these lines, that is, from the right-most line of one flash to the left-most line of the next. This provides a visual basis for adjustment and also precise time markers, even if no trace is displayed. Calibration data appears between the two lines of the graticule and thus is recorded in the gap on the film.

What is claimed is:

1. Apparatus for displaying a pattern representing the execution of a computer program in a general purpose digital computer, said computer having a main address register which stores digital addresses of steps in said computer program, comprising:
    (a) an oscilloscope including a cathode ray tube having a screen, means for generating a beam of electrons to produce a trace on the screen, and means for deflecting the beam on first and second coordinate axes,
    (b) means for driving said beam deflecting means on said first coordinate axis to produce a timed step-by-step displacement of said beam for a chosen portion of said computer program, and
    (c) means responsive to said digital addresses stored in said main address register for driving said beam deflection means to produce concurrent discrete displacements of said beam on said second axis, said discrete displacements having magnitudes proportional to the digital values of the addresses of the steps in said computer program.

2. Apparatus as described in claim 1 wherein said second beam deflection driving means comprises a digital/analog converter and means coupling said converter to the main address register of the computer, said digital/analog converter generating driving signals proportional to addresses said main address register.

3. Apparatus as described in claim 2, further including means for controlling said second beam deflection driving means to trace patterns on different sections of the screen of said oscilloscope in dependence upon different characteristics of the information to be displayed, said controlling means comprising:
    (a) a base address register for storing a predetermined standard,
    (b) comparing means for comparing addresses from said main address register with said predetermined standard, to generate a signal designating whether the address agrees with, or disagrees with, the standard, and (c) gating means responsive to the signal generated by said comparing means for causing selected portions of said program to be displayed in different sections of the screen in which a display is to be generated.

4. Apparatus as described in claim 3, wherein said comparing means includes means responsive to said base address register for testing an address delivered from the main address register of said computer to determine whether it is within a given range of addresses including, as one limit, said predetermined standard.

5. Apparatus as described in claim 4, further including means to adjust the range for the display of the addresses of one said selected portions of said computer program.

6. Apparatus as described in claim 5, including means for inverting the response of said second deflection driving means to the addresses from the main address register of the computer, in dependence upon the setting of the predetermined standard in said base address register, so as to deflect the beam to a lesser degree for certain addresses than for others.

7. Apparatus as described in claim 3, including means for modifying the deflection of the beam in one of said different screen sections in accordance with different scales of magnification.

8. Apparatus as described in claim 7, further including a main buffer for receiving addresses from the main address register of the computer, said addresses being represented in the binary radix, said deflection modifying means including a range switch comprising input terminals connected to said main buffer and output terminals connected to said second beam deflection driving means and switch means for connecting different groups of said input terminals with said output terminals.

9. Apparatus as described in claim 8, including means controlled by said range switch for modifying the number of bit positions of the address in said main buffer taken into account by said comparing means.

10. Apparatus as described in claim 8, including means controlled by said comparing means for gating the bits of the address in said main buffer either through said range switch, or directly from said main buffer to said second deflection means, in dependence upon the signal generated by said comparing means designating an in-range or out-of-range address, respectively.

11. Apparatus as described in claim 3, wherein said gating means includes means to drive said second beam deflection driving means on said second axis to display a pattern in any one of at least three different sections of the screen of said oscilloscope, the pattern displayed in either one of two of said sections being dependent upon comparison of the address in said main address register and a different pattern being displayed in the third section of the screen in dependence upon channel information from the computer.

12. Apparatus as described in claim 4, wherein said standard includes a range of addresses and said means for displaying certain information on one of said screen sections includes means for causing information outside of said range to be displayed in one section of said screen and means for displaying information within said range on a larger scale in another section of said screen, the means for displaying information on said one section of said screen being scaled to permit all of the information from the entire range of the computer main address register to be displayed within the limits of said one section.

13. Apparatus as described in claim 23, wherein said stepping means includes means for discriminating between different classes of pulses from the computer, said last means being settable to respond only to pulses of a predetermined type.

14. Apparatus as described in claim 13, including means to delay the start a sweep along said second axis, and means for starting said sweep in response to a selected input from the computer.

15. Apparatus as described in claim 14, wherein said starting means includes means for examining addresses in said main buffer, and means for starting the sweep upon occurrence of a particular address.

16. Apparatus as described in claim 15, including means for filtering addresses compared by said last mentioned comparing means, to eliminate addresses not pertaining to a particular one of the said classes.

17. Apparatus as described in claim 1, wherein said means for advancing the beam along said first axis includes pulse counting means adapted to advance the beam step-wise cumulatively in response to pulses from the computer.

18. Apparatus as described in claim 17, wherein said pulse counting means is provided with means to issue a reset pulse on accumulating a given number of pulses, to restore the beam along said second axis of the starting position.

19. Apparatus in accordance with claim 18, wherein means are provided to synchronize the stepping of the beam along said first axis with the change of the beam position along said second axis.

20. Apparatus as described in claim 19, wherein the first step of the beam along said first axis is delayed until after the display of a change in beam deflection along said second axis, so that said last mentioned display is made in the 0 position of the first axis.

21. Apparatus as described in claim 1, wherein said means for deflecting the beam along said first coordinate axis includes means for generating uniformly time-spaced pulses.

22. Apparatus as described in claim 21, wherein said means for generating uniformly time-spaced pulses includes means for changing the pulse rate.

23. Apparatus as described in claim 1, wherein said means for deflecting the beam along said first coordinate axis includes means selectively responsive to various computer cycle pulses from the computer for stepping the beam progressively along said first axis.

24. Apparatus as described in claim 1, wherein separate means are provided for selecting particular types of pulses from said computer for independently controlling the driving means for the beam deflecting means pertaining to the two different coordinate axes.

25. Apparatus as described in claim 2, comprising a main buffer, gating means connecting said main buffer bit-by-bit with corresponding bit positions of the main address register of the computer, and lock-out means controlling said gating means, to disconnect said main buffer from said main address register during a processing cycle.

26. Apparatus as described in claim 1, wherein said means responsive to said main address register for driving said beam deflecting means on said second coordinate axis comprises circuit means for generating a series of process timing pulses for carrying out a processing cycle, and means responsive to a strobe from the computer for initiating an operation of said process timing pulse circuit means.

27. Apparatus as described in claim 26, wherein said means for initiating an operation of said process timing pulse circuit means includes a gate responsive to strobes from the computer, and lock-out means for inhibiting said gate during a processing cycle.

28. Apparatus as described in claim 26, wherein said means for deflecting the beam along said first coordinate axis includes means responsive to pulses from the computer for stepping the beam progressively along said second axis, sweep start means settable to either of two conditions, for enabling the stepping of the beam along said first axis in one of said conditions and for inhibiting the stepping in the other of said conditions, and means responsive to one of said process timing pulses for switching said sweep start means to said second condition, to synchronize the stepping along the first axis with the deflection of the beam along said second axis.

29. Apparatus as described in claim 28, including means for blanking and unblanking the beam of the cathode ray tube, and means controlling said blanking and unblanking means to unblank the beam after a specific time delay following the response of said stepping means to the process timing pulse.

30. Apparatus as described in claim 3, including
(a) a start address register for storing a second predetermined standard,
(b) second comparing means for comparing addresses received from the main address register of the computer with said second predetermined standard, and
(c) means responsive to an equal condition of said second comparing means for initiating a stepping of the beam along said first axis.

31. Apparatus as described in claim 1, comprising channel sampling means including a ring counter for sampling a plurality of channels in successive cycles, said second driving means being responsive to the on or off condition of each channel as it is sampled for driving the deflection means on said second axis.

32. Apparatus as described in claim 31, including means for alternating control of said beam deflecting means pertaining to said second coordinate axis between said channel sampling means and addresses in the main address register of the computer.

33. Apparatus as described in claim 32, wherein said beam deflection driving means for said second axis includes means for causing the beam to be deflected to different sections of the screen for displaying channel status and addresses, respectively.

34. Apparatus as described in claim 23, comprising means for initiating a sweep of the beam along the said first axis, and means for terminating the display on the screen of the cathode ray tube at the end of a single sweep.

35. Apparatus as described in claim 34, wherein said sweep ending means includes means responsive to the occurrence of a particular address from the main address register of the computer.

36. Apparatus as described in claim 35, including means to start and stop said single sweep upon the occurrence of a particular address from the main address register of the computer.

References Cited

UNITED STATES PATENTS

| | | | |
|---|---|---|---|
| 3,098,219 | 7/1963 | Voigt et al. | |
| 3,179,883 | 4/1965 | Farrow | 324—73 |
| 3,205,344 | 9/1965 | Taylor et al. | 340—324 |
| 3,248,650 | 4/1966 | Bralkowski et al. | 340—324 |
| 3,307,169 | 2/1967 | Beck | 340—324 |
| 3,325,802 | 6/1967 | Bacon | 340—324 |
| 3,355,714 | 11/1967 | Culler | 340—172.5 |
| 3,375,509 | 3/1968 | Mullarkey | 340—324 |

THOMAS B. HABECKER, Primary Examiner

M. M. CURTIS, Assistant Examiner

U.S. Cl. X.R.

235—151.3; 340—212

UNITED STATES PATENT OFFICE
CERTIFICATE OF CORRECTION

Patent No. 3,522,597     Dated August 4, 1970

Inventor(s) Robert W. Murphy

It is certified that error appears in the above-identified patent and that said Letters Patent are hereby corrected as shown below:

| | |
|---|---|
| Column 2, line 4 | "varies" should be --various-- |
| Column 4, line 51 | "engaged" should be --enlarged-- |
| Column 4, line 73 | "As" should be --At-- |
| Column 5, line 69 | "converted" should be --converter-- |
| Column 7, line 35 | no comma after "operating" |
| Column 8, line 41 | "heretofore" should be --therefore-- |
| Column 13, line 64 | A+SA16 should be --A +SA16-- |
| Column 16, line 34 | A(15) should be --(A15)-- |
| Column 16, line 52 | "inverter 101" should be --inverter 1010-- |
| Column 16, line 59 | There should be a space between I and RB |
| Column 20, line 22 | "GATE" should be --gate-- |
| Column 20, line 58 | 1804A should be --1804a-- |
| Column 21, line 36 | "1840a and 1804b" should be --1804a and 1840b-- |
| Column 21, line 70 | "on the" should be --in the-- |
| Column 23, line 38 | "024" should be --023-- |
| Column 23, line 73 | "A-S" should be --A -S-- |
| Column 23, line 75 | "inverter" should be --inverted-- |
| Column 25, line 23 | "uppe" should be --upper-- |
| Column 26, line 32 | "a" ommitted after 1648 |
| Column 26, line 34 | "SS" omitted before 1608 |
| Column 27, line 73 | "DIP" should be --DISP-- |
| Column 28, line 29 | "secion" should be --section-- |
| Column 30, line 62 | "in" omitted after --addresses-- |
| Column 31, line 44 | "driving" omitted after --deflection-- |
| Column 31, line 73 | "of" omitted after --start-- |
| Column 32, line 17 | "axis of" should be --axis to-- |

SIGNED AND SEALED
NOV 17 1970

(SEAL)
Attest:

Edward M. Fletcher, Jr.
Attesting Officer

WILLIAM E. SCHUYLER, JR.
Commissioner of Patents